United States Patent
Kitaura et al.

(10) Patent No.: US 7,720,308 B2
(45) Date of Patent: May 18, 2010

(54) 3-D IMAGE DISPLAY UNIT, 3-D IMAGE RECORDING DEVICE AND 3-D IMAGE RECORDING METHOD

(75) Inventors: Ryuji Kitaura, Sakura (JP); Hiroyuki Katata, Chiba (JP); Toshio Nomura, Hachioji (JP); Norio Ito, Chiba (JP); Tomoko Aono, Chiba (JP); Maki Takahashi, Chiba (JP); Shinya Hasegawa, Chiba (JP); Tadashi Uchiumi, Urayasu (JP); Motohiro Ito, Chiba (JP); Masatoshi Tsujimoto, Chiba (JP); Hiroshi Kusao, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1158 days.

(21) Appl. No.: 10/528,999

(22) PCT Filed: Sep. 26, 2003

(86) PCT No.: PCT/JP03/12301

§ 371 (c)(1),
(2), (4) Date: Jan. 17, 2006

(87) PCT Pub. No.: WO2004/030376

PCT Pub. Date: Apr. 8, 2004

(65) Prior Publication Data

US 2006/0126919 A1     Jun. 15, 2006

(30) Foreign Application Priority Data

| Sep. 27, 2002 | (JP) | ............................ 2002-283850 |
| Oct. 31, 2002 | (JP) | ............................ 2002-318883 |
| Oct. 31, 2002 | (JP) | ............................ 2002-318895 |
| Oct. 31, 2002 | (JP) | ............................ 2002-318971 |
| Oct. 31, 2002 | (JP) | ............................ 2002-319059 |
| Nov. 15, 2002 | (JP) | ............................ 2002-332829 |

(51) Int. Cl.
G06K 9/00 (2006.01)
G06T 15/00 (2006.01)
H04N 5/66 (2006.01)
G03B 21/60 (2006.01)

(52) U.S. Cl. ........................ 382/285; 345/419; 348/739; 359/462

(58) Field of Classification Search ................. 382/154, 382/285, 305, 312; 345/156, 204, 419, 589, 345/664, 665; 348/42, 46, 54, 739; 359/462, 359/464

See application file for complete search history.

(56) References Cited

U.S. PATENT DOCUMENTS 5,582,173 A * 12/1996 Li .............................. 600/443

(Continued)

FOREIGN PATENT DOCUMENTS

EP     0 817 123 A1     1/1998

(Continued)

*Primary Examiner*—Kanji Patel
(74) *Attorney, Agent, or Firm*—Birch, Stewart, Kolasch & Birch, LLP

(57) ABSTRACT

Disclosed herein is a 3-D image display unit that can be controlled flexibly to protect the user from eyestrain and operated easily. The 3-D image display unit includes measuring means for measuring a display time of a 3-D image, parallax adjusting means for instructing 3-D image forming means to adjust the parallax of the 3-D image. In the case where the 3-D image display time measured by the measuring means exceeds a predetermined time, the parallax adjusting means instructs the 3-D image forming means to reduce the parallax of the 3-D image to be formed, thereby the display means comes to display a 3-D image having a small parallax. The user can thus be protected from eyestrain.

34 Claims, 28 Drawing Sheets

U.S. PATENT DOCUMENTS

| | | | | |
|---|---|---|---|---|
| 5,675,377 A | * | 10/1997 | Gibas | 348/47 |
| 5,751,479 A | * | 5/1998 | Hamagishi et al. | 359/464 |
| 5,907,312 A | * | 5/1999 | Sato et al. | 345/31 |
| 5,936,767 A | * | 8/1999 | Favalora | 359/462 |
| 6,023,277 A | * | 2/2000 | Osaka et al. | 345/419 |
| 6,137,456 A | * | 10/2000 | Bhagavatula et al. | 345/7 |
| 6,198,484 B1 | * | 3/2001 | Kameyama | 345/419 |
| 6,392,690 B1 | * | 5/2002 | Fujii et al. | 348/59 |
| 6,429,861 B1 | * | 8/2002 | Hossack et al. | 345/419 |
| 6,816,158 B1 | * | 11/2004 | Lemelson et al. | 345/419 |

FOREIGN PATENT DOCUMENTS

| | | |
|---|---|---|
| EP | 0 963 122 A2 | 12/1999 |
| JP | 6-333479 A | 12/1994 |
| JP | 7-16351 A | 1/1995 |
| JP | 7-46631 A | 2/1995 |
| JP | 9-18894 A | 1/1997 |
| JP | 9-84057 A | 3/1997 |
| JP | 9-252478 A | 9/1997 |
| JP | 9-275578 A | 10/1997 |
| JP | 10-28274 A | 1/1998 |
| JP | 10-83460 A | 3/1998 |
| JP | 11-355808 A | 12/1999 |
| JP | 2000-134642 A | 5/2000 |
| JP | 2002-232913 A | 8/2002 |
| JP | 2002-252833 A | 9/2002 |

* cited by examiner (a) I=1    (b) I=2

3-D IMAGE DISPLAY UNIT, 3-D IMAGE RECORDING DEVICE AND 3-D IMAGE RECORDING METHOD

TECHNICAL FIELD

The present invention relates to a 3-D image display unit for observing electronic images as 3-D images.

BACKGROUND ART

Conventionally, each 3-D image display unit, which uses a CRT (Cathode Ray Tube), LCD (Liquid Crystal Display), or the like to display 3-D images, has shifted two images in the eye-width direction to obtain a parallax between those images, then display those shifted images on the screen so as to be recognized by the right and left eyes of the user separately. The user thus comes to recognize a 3-D image configured by those two images.

The patent document 1 (official gazette of Unexamined Published Japanese Patent Application No. 16351/1995) discloses a 3-D display game machine that changes over 3-D images to ordinary 2-D images forcibly in the case where a preset 3-D view allowable play time is reached. The patent document 2 (official gazette of Unexamined Published Japanese Patent Application No. 333479/1994) discloses an image display unit that has an internal timer used to turn off the unit power forcibly in the case where the first predetermined time is reached after the unit is powered. After that, the unit is not powered until the second predetermined time is reached. This is to prevent the unit from a long continuous time use.

DISCLOSURE OF THE INVENTION

However, the technique disclosed by the patent document 1 continues 3-D display with no adjustment of parallax even when the user's parallax sensitivity goes down due to long time observation, thereby he/she gets eyestrain. In other words, the unit cannot cope with carefully thought-out adjustment, for example, adjustment for easing the user's eye burden by reducing the parallax step by step in such a case. On the other hand, the technique disclosed by the patent document 2, in the case where the unit power is turned off, cannot turn on the power until a predetermined time is reached. For example, in case of a display unit that can display images by switching between 2-D display and 3-D display properly, the unit cannot satisfy the user's intention for turning off its power only when 3-D images are displayed long time to protect the user from eyestrain. And, once the power is turned off forcibly, 2-D display that will require less burden on the user's eyes is disabled until a predetermined time is reached.

Furthermore, in the case where 3-D images are to be broadcast digitally, for example, none of the conventional techniques has permitted that a broadcasting station sets a limit time for displaying 3-D images continuously according to the intention of a contents creator or contents provider.

The degree of 3-D effect intensity generally differs among 3-D images. This is why it is not considered to be proper to apply the same allowable playing time to both high 3-D effect intensity images and low 3-D effect intensity images to limit the 3-D view. And, this is because the burden on the user's eyes is determined by the degree of such 3-D effect intensity. Each of the above conventional techniques has also confronted with a problem that no examination has been done for how to limit watching of 3-D images when the user observes those 3-D images having different 3-D effect intensity values continuously by changing the channels of the receiver.

In case of the techniques disclosed by the above patent documents 1 and 2, the user's device has a timer for measuring an elapsed time of each 3-D image display. And, in the case where the measured time reaches a predetermined limit time, the user's device switches 3-D images to 2-D images automatically. Consequently, images are switched regardless of the intention of the 3-D image data creator, broadcasting station, contents provider, or the like.

Under such circumstances, it is an object of the present invention to provide a 3-D image display unit that can control 3-D images easily and flexibly to protect the user from eyestrain.

In order to achieve the above object, according to the first aspect of the present invention, the 3-D image display unit displays a 3-D image configured by a plurality of images. The display unit includes an input part for inputting control information required to display the 3-D image. The control information includes information for denoting 3-D effect intensity of the 3-D image.

According to the second aspect of the present invention, the 3-D image display unit is expanded from that in the first aspect so that the display unit further includes a computing part and a display controlling part. The computing part computes accumulative intensity that increases together with a time according to the 3-D effect intensity while the display controlling part makes a predetermined display operation in the case where the accumulative intensity exceeds the first threshold value.

According to the third aspect of the present invention, the 3-D image display unit is expanded from that in the second aspect so that the display unit enables the above-described display operation to include display of a warning message.

According to the fourth aspect of the present invention, the 3-D image display unit is expanded from that in the second aspect so that the display unit enables the above-described display operation to include an adjustment operation for reducing the parallax of the 3-D image.

According to the fifth aspect of the present invention, the 3-D image display unit is expanded from that in the second aspect so that the display unit enables the above-described display operation to include an operation for forming a 2-D image from the 3-D image to display the 2-D image instead of the 3-D image.

According to the sixth aspect of the present invention, the 3-D image display unit of the present invention is expanded from that in the fifth aspect so that the display unit enables the above-described display operation to include an operation to resume the display of the initial 3-D image instead of the 2-D image in a predetermined time.

According to the seventh aspect of the present invention, the 3-D image display unit is expanded from that in the fifth aspect, the display unit enables the computing part to compute accumulative intensity that decreases with a display time of the 2-D image and the above-described display operation to include an operation to resume the display of the initial 3-D image instead of the 2-D image in the case where the accumulative intensity goes down to the second threshold value.

According to the eighth aspect of the present invention, the 3-D image display unit is expanded from that in any of the first to fifth aspects so that the 3-D image display unit further includes an input part for inputting an external signal. The external signal includes a request signal for switching the display between 3-D image display and 2-D image display and switches the display operation between 3-D image display and creating a 2-D image from the 3-D image to display the 2-D image instead of the 3-D image.

According to the ninth aspect of the present invention, the 3-D image display unit is expanded from that in any of the sixth and seventh aspects so that the display unit further includes an input part for inputting an external signal. The external signal includes a request signal for switching the display between 3-D image display and 2-D image display. The request signal is invalidated between the 2-D image display performed in the above-described display operation and the operation performed to resume the initial 3-D image display.

According to the tenth aspect of the present invention, the 3-D image display unit is expanded from that in any of the first to ninth aspects so that the display unit enables the first threshold value to be included in the control information.

According to the eleventh aspect of the present invention, the 3-D image display unit is expanded from that in the sixth aspect so that the display unit enables the predetermined time to be included in the control information.

According to the twelfth aspect of the present invention, the 3-D image display unit is expanded from that in the sixth aspect so that the display unit enables the second threshold value to be included in the control information.

According to the thirteenth aspect of the present invention, the 3-D image display unit displays a 3-D image configured by a plurality of images and includes an input part for inputting control information required to display the 3-D image and a display controlling part for controlling the display of the 3-D image. The display controlling part forms a 2-D image from the 3-D image according to the predetermined first condition and displays the 2-D image instead of the 3-D image and displays the 3-D image instead of the 2-D image according to the predetermined second condition.

A 3-D image recording unit of the present invention, which records a 3-D image configured by a plurality of images in a predetermined recording area, includes the predetermined recording area that includes at least one of an image recording region for recording the 3-D image, an audio recording region for recording audio data, and a sub-code recording region for recording associated information.

The 3-D image recording unit of the present invention, which records a 3-D image configured by a plurality of images, includes a recording part for recording control information required to control the display of the 3-D image in a predetermined recording area. The control information includes information for denoting 3-D effect intensity of the 3-D image and the recording area includes at least one of an image recording region for recording the 3-D image, an audio recording region for recording audio data, and a sub-code recording region for recording associated information.

The 3-D image recording unit of the present invention, which records a 3-D image configured by a plurality of images in a predetermined recording area, includes a recording part for recording control information required to control the display of the 3-D image and the control information includes a threshold value related to a accumulative value that increases together with a 3-D display time. The recording area includes at least one of an image recording region for recording the 3-D image, an audio recording region for recording audio data, and a sub-code recording region for recording associated information.

The 3-D image recording unit of the present invention, which records a 3-D image configured by a plurality of images in a predetermined recording area, includes a recording part for recording control information required to control the display of the 3-D image and the control information includes information for denoting a limit time for limiting the display of the 3-D image. The recording area includes at least one of an image recording region for recording the 3-D image, an audio recording region for recording audio data, and a sub-code recording region for recording associated information.

The 3-D image recording method of the present invention, which records a 3-D image configured by a plurality of images in a predetermined recording area, uses the recording area that includes at least one of an image recording region for recording the 3-D image, an audio recording region for recording audio data, and a sub-code recording region for recording associated information.

The 3-D image recording method of the present invention, which records a 3-D image configured by a plurality of images in a predetermined recording area, includes a recording step of recording control information required to control the display of the 3-D image in the predetermined recording area and the control information includes information for denoting 3-D effect intensity of the 3-D image and the recording area includes at least one of an image recording region for recording the 3-D image in the recording region, an audio recording region for recording audio data, and a sub-code recording region for recording associated information.

The 3-D image recording method of the present invention, which records a 3-D image configured by a plurality of images in a predetermined region, includes a recording step of recording control information required to control the display of the 3-D image and the control information includes a threshold value related to an accumulative value that increases together with a 3-D display time and the recording area includes at least one of an image recording region for recording the 3-D image, an audio recording region for recording audio data, and a sub-code recording region for recording associated information.

The 3-D image recording method of the present invention, which records a 3-D image configured by a plurality of images in a predetermined region, includes a recording step of recording control information required to control the display of the 3-D image and the control information includes information for denoting a limit time required to limit the display of the 3-D image while the recording area includes at least one of an image recording region for recording the 3-D image, an audio recording region for recording audio data, and a sub-code recording region for recording associated information.

In order to achieve the above objects, the 3-D image display unit of the present invention, which displays an image for each of the right and left eyes of the user separately, includes 3-D image forming means for forming a 3-D image from a plurality of images and parallax adjusting means for adjusting the parallax of the 3-D image for the 3-D image forming means. And, the parallax adjusting means, in the case where the first predetermined time is reached, reduces the parallax of the 3-D image for the 3-D image forming means.

According to this configuration, the 3-D image display unit can adjust the parallax of the 3-D image displayed according to the degree of the eyestrain of the user, thereby the user's eyes can be protected with a simple configuration of the display unit.

The 3-D image display unit may also include a storage means for storing the parallax of the 3-D image so that the parallax adjusting means restores the initial parallax of the 3-D image for the 3-D image forming means according to the parallax stored in the storage means in the case where the second predetermined time is reached after the parallax of the 3-D image formed by the 3-D image forming means is reduced by the parallax adjusting means.

According to another aspect of the present invention, the 3-D image display unit includes 3-D image forming means for forming a 3-D image from a plurality of images, warning display controlling means for forming a warning message for the 3-D image forming means and the warning display controlling means forms the warning message for the 3-D image forming means in the case where the display time of the 3-D image exceeds the first predetermined time.

According to this configuration, the 3-D image display unit displays a warning message in the case where 3-D images are displayed long time, so that the user can receive the "excessively long observation" warning earlier, thereby the user can be protected from eyestrain.

The warning message should preferably be displayed as a 3-D image. It is also possible to display other items than the warning message as 2-D images while the warning message is displayed as a 3-D image. The warning message may also be displayed as a 3-D image at the very limit position where the user can recognize the message as a 3-D image with difficulty. Consequently, the user will be able to recognize the warning message earlier, thereby the user is protected from eyestrain.

According to still another aspect of the present invention, the 3-D image display unit includes 3-D image forming means for forming a 3-D image from a plurality of images, a 2-D image forming means for forming a 2-D image from a plurality of images, and a display means for displaying the 3-D image formed by the 3-D image forming means or 2-D image formed by the 2-D image forming means. In the case where the 3-D image display time exceeds the first predetermined time, the 3-D image display unit shuts off the power including at least that of the display means automatically. And, in the case where the power is restored before the 3-D image display off-time exceeds the second predetermined time, the 2-D image formed by the 2-D image forming means is displayed on the display means.

In the case where the power is not restored even after the 3-D image display off-time exceeds the second predetermined time, the power of the whole unit is turned off. Consequently, in the case where the power is turned on when the 3-D image display off-time exceeds the second predetermined time, the 3-D image display unit returns to the normal state to display the initial 3-D image.

According to this configuration, the power to the 3-D image display unit is turned off forcibly in the case where 3-D images are displayed continuously for a long time and the 3-D image display is inhibited and the inhibition is not reset until a predetermined time is reached even when the user makes an attempt to turn on the power. Thus, the user is surely protected from eyestrain. And, even when the user turns on the power before the predetermined time is reached, 2-D image display that will require less burden on the user's eyes is enabled, thereby the 3-D image display unit can be used continuously.

The 3-D image display unit of the present invention may also include 3-D image decoding means for decoding 3-D image format data and separating means for separating 3-D image data decoded by the 3-D image decoding means into right-eye image data and left-eye image data. The format of the 3-D image format data may include at least a single piece of 3-D image identification information for denoting whether or not the object data is for 3-D image display, at least a single piece of 3-D image control information that includes at least one of first and second predetermined times, and at least a single piece of image data. The image data may be compressed. The 3-D image decoding means may have 3-D image control information analyzing means for analyzing the 3-D image control information of the 3-D format data and image data part decoding means for decoding the 3-D image data of the 3-D image format data.

According to this configuration, the 3-D image display unit decodes the user's appreciation time of 3-D images and information for denoting a 3-D image continuous application time without changing the parallax, thereby adjusting the appreciation time for each data having 3-D image control information without reducing the parallax and the continuous 3-D appreciation time respectively. For example, those two times can be changed according to whether or not the data requires a large parallax and a heavy burden on the user's eyes, so that the user's eyestrain is eased.

Furthermore, according to the 3-D image format data described above, in the case where the 3-D image format data is to be transmitted, information for denoting an user's 3-D image allowable appreciation time and a continuous 3-D image allowable appreciation time without changing the parallax according to whether or not the parallax is large and the data requires a heavy burden on the user's eyes can be recorded by the user before it is transmitted. Consequently, the user can be provided with data that prevents long time appreciation so that the user is protected from eyestrain.

Furthermore, according to the 3-D image format data, the information for denoting an user's 3-D image appreciation allowable time and a continuous 3-D image appreciation allowable time without changing the parallax can be included in the 3-D image control information of the 3d image format data, thereby the information can be transmitted together with image data. The 3-D image display unit is thus very easy to operate.

The 3-D image recording method of the present invention, which records a 3-D image configured by a plurality of images, includes a recording step of recording control information required to display the 3-D image and the control information includes at least display information that takes at least two values and the display information may denote that a 3-D image is displayed as a 2-D image in the case where the display information takes the first value and a 3-D image is displayed as a 2-D or 3-D image in the case where the display information takes the second value.

The 3-D image recording method of the present invention, which records each 3-D image consisting of a plurality of images, includes a recording step of recording control information required to display the 3-D image and the control information contains at least display information that takes at least two values and the display information may denote that a 3-D image is displayed as a 2-D image if the display information takes the first value and a 3-D image is displayed as a 2-D or 3-D image if the display takes the second value.

The 3-D image display unit of the present invention, which displays a 3-D image configured by a plurality of images, includes an input part for inputting control information required to display the 3-D image and the control information includes display information that takes at least two values. The display information may denote that a 3-D image is displayed as a 2-D image in the case where the display information takes the first value and a 3-D image is displayed as a 2-D or 3-D image in the case where the display information takes the second value.

The 3-D image recording method of the present invention, which records a 3-D image configured by a plurality of images, includes a recording step of recording control information required to display the 3-D image and the control information includes a threshold value related to an accumulative value that increases together with a 3-D image display time and the threshold value, in the case where it is a predetermined value, denotes that a 3-D image is displayed as a 2-D image while a 3-D image is displayed as a 2-D or 3-D image in the case where the threshold value is not the predetermined value.

The 3-D image transmission method of the present invention, which transmits a 3-D image configured by a plurality of images, includes a recording step for recording control information required to display the 3d image and the control information includes a threshold value related to an accumulative value that increases together with a 3-D image display time and the threshold value, in the case where it is a predetermined value, denotes that a 3-D image is displayed as a 2-D image while a 3-D image is displayed as a 2-D or 3-D image in the case where the threshold value is not the predetermined value.

The 3-D image display unit of the present invention, which displays a 3-D image configured by a plurality of images, includes an input part for inputting control information required to display the 3-D image and the control information includes a threshold value related to an accumulative value that increases together with a 3-D display time and the threshold value, in the case where it is a predetermined value, may denote that a 3-D image is displayed as a 2-D image while the threshold value, in the case where it is not the predetermined value, may denote that a 3-D image is displayed as a 2-D or 3-D image.

BEST MODE FOR CARRYING OUT THE INVENTION

Hereunder, the embodiments of the present invention will be described with reference to the accompanying drawings.

Figure 1:
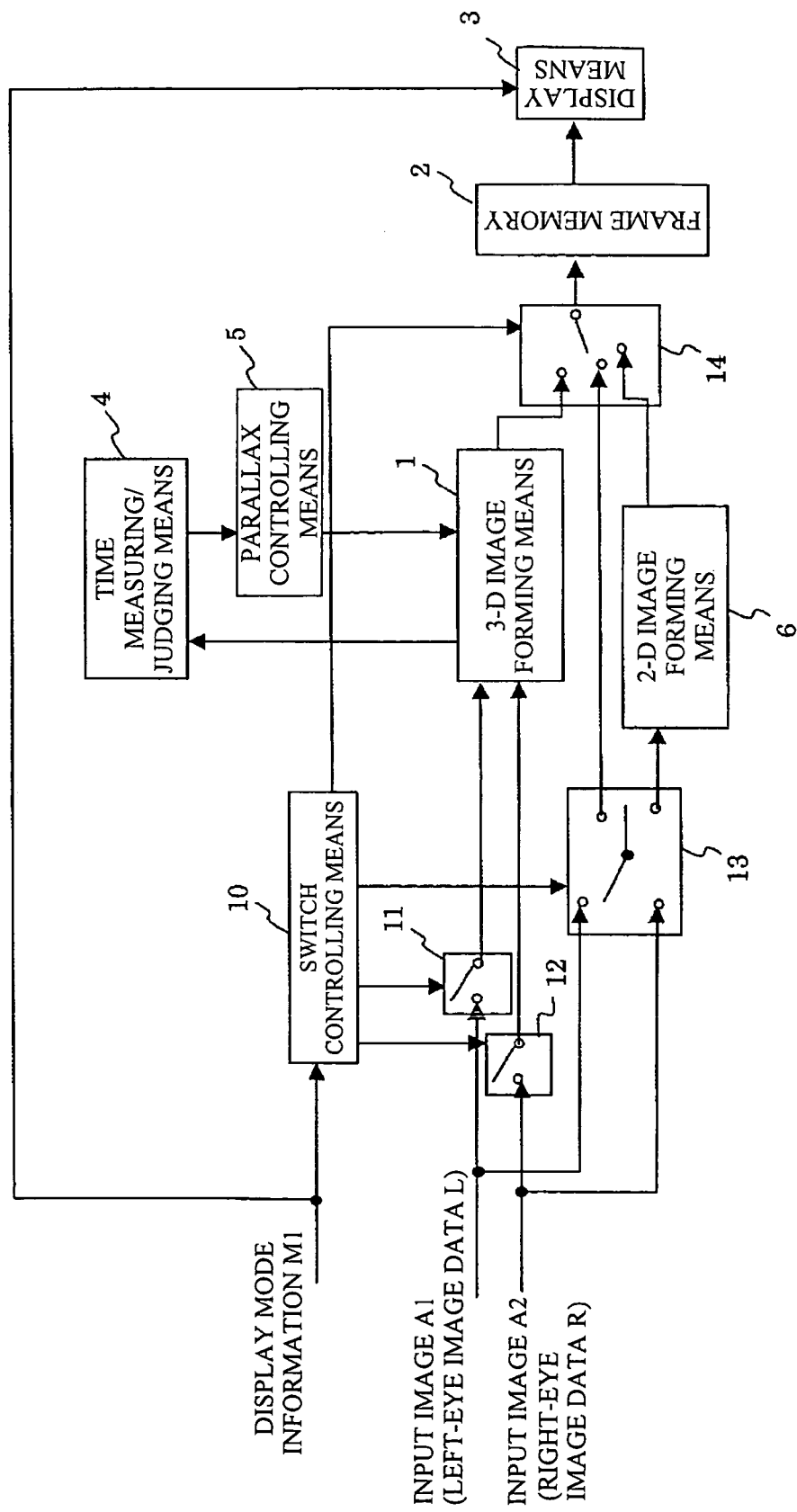
FIG. 1 is a block diagram of a 3-D image display unit in the first embodiment of the present invention.

FIG. 1 shows a block diagram of a 3-D image display unit in the first embodiment of the present invention.

At first, a description will be made for the 3-D image display unit that handles two input images.

The 3-D image display unit in the first embodiment comprises 3-D image forming means 1 for forming a 3-D image from the images of both right and left eyes, 2-D image forming means 6 for forming a 2-D image from one of the right-eye and left-eye images, switches 11 to 14 for switching among input/output images, a switch controlling means 10 for controlling each of the above switches in accordance with the display information M1 for denoting whether to enable 3-D display or 2-D display with use of the image of each eye (L . . . left eye image data, R: right eye image data), a frame memory 2 for storing each image formed by the 3-D image forming means 1 or 2-D image forming means 6 or input image as is, display means 3 for displaying two images in the frame memory 2 as a 3-D image or 2-D image according to the display mode information M1, time measuring/judging means 4 for measuring the display time of each 3-D image, and parallax controlling means 5 for instructing the 3-D image forming means to form a 3-D image by adjusting the parallax of each of the right-eye image and the left-eye image in the case where the 3-D image display time exceeds a predetermined time. The display mode information M1 will be described later.

The display means 3 is assumed to be a two-eye type one for displaying both of the right-eye and left-eye images separately (images of two viewpoints).

Hereinafter, the first embodiment of the present invention will be described in detail.

At first, left-eye image data L and right-eye image data R are inputted as input images A1 and A2 to the 3-D image display unit from external respectively. Then, display mode information M1 is inputted to the switch controlling means 10 from the external. There are four types for the display mode information M1; 3-D image display mode (or 3-D display mode), left-eye 2-D image display mode (left-eye 2-D display mode), right-eye 2-D image display mode (right-eye 2-D display mode), and input image through display mode (through display mode). This 3-D image display unit switches among the 3-D image display, the 2-D image display using a left-eye image, the 2-D image display using a right-eye image, and the input image through display for displaying an input 2-D image as is in accordance with the inputted display mode information M1. Table 1 summarizes the values of the display mode information M1, mode names, and images to be displayed in those modes.

TABLE 1

| Display Mode Information M1 | Mode Name | Display Image |
|---|---|---|
| 1 | 3-D image display mode | 3-D images |
| 2 | Left-eye 2-D image display mode | 2-D image formed with left-eye 2-D image of each 3-D image |
| 3 | Right-eye 2-D image display mode | 2-D image formed with right-eye 2-D image of each 3-D image |
| 4 | Input image through display mode | Input images |

At first, a description will be made for the operation of the display unit in the case where the input image through display mode is set in the display mode information M1. In that case, for example, the display unit displays the input image A1 as is.

The switch controlling means 10 then turns off the switches 11 and 12 and turns on/off the switches 13 and 14 so that the input image A1 is inputted to the frame memory 2 through those switches 13 and 14 as is. The input image A1 is thus written in the frame memory 2 through the switches 13 and 14. The input image A1 is then inputted to the display means 3 from the frame memory 2. And, the display means displays the input image A1 as a 2-D image. At that time, the input image A1 may be replaced with the input image A2; whether to use the input image A1 or A2 can be set freely.

Next, a description will be made for the operation of the display unit in the case where the left-eye 2-D image display mode is set in the display mode information M1. The switch controlling means 10 turns off the switches 11 and 12 and turns on/off the switches 13 and 14 so that the left-eye image data L is inputted to the 2-D image forming means 6 and the 2-D image forming means 6 is connected to the frame memory 2 respectively. The left-eye image data L is thus inputted to the 2-D image forming means 6 through the switch 13. Then, the 2-D image forming means 6 forms 2-D image data using the left-eye image, then the formed image is written in the frame memory 2 through the switch 14. After that, the 2-D image data is inputted to the display means 3 from the frame memory 2. The display means 3 thus displays the inputted 2-D image data.

Figure 2:
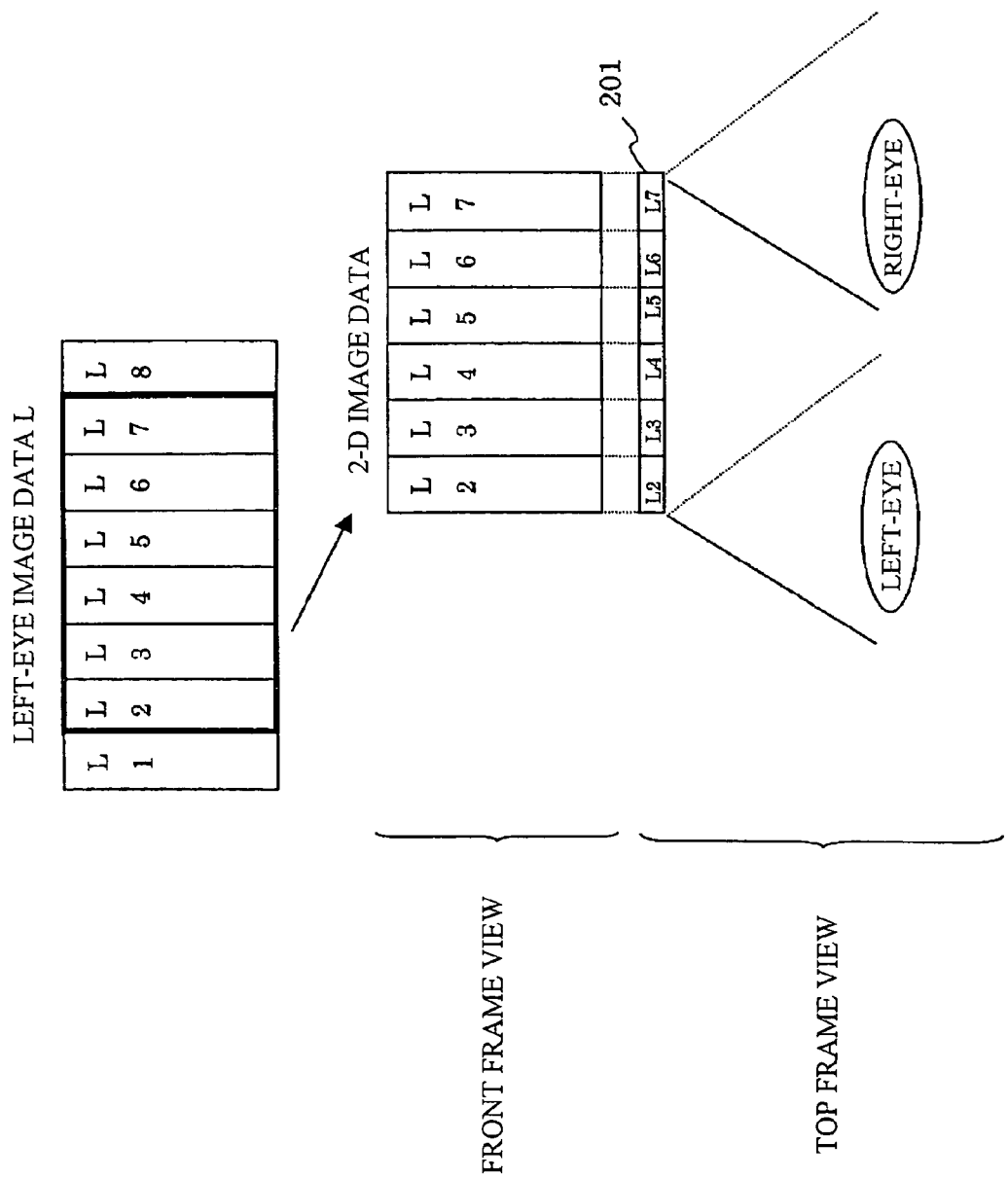
FIG. 2 is a 2-D image data structure and its display method used for the 3-D image display unit in the first embodiment of the present invention.

FIG. 2 shows a structure of data formed by the 2-D image forming means 6 and a method for displaying the data in the case where the display mode information M1 denotes a mode for displaying a left-eye image L as a 2-D image. In the case where it is assumed that the left-eye image data L is decomposed to strip images L1 to L8 in the vertical direction, part of the left-eye image data L (in the thick frame of the left-eye image data L shown in FIG. 2) is used as is for the 2-D image data formed by the 2-D image forming means 6. Here, L2 to L7 are assumed to be displayed. In FIG. 2, two frame views, that is, front view and top view are shown. In the top frame view, no slit (to be described in detail later) used in the 3-D display mode is shown to simplify the drawing. As to be understood in FIG. 2, 2-D image data 201 L2 to L7 are observed by the left eye of the user. The user can thus observe the image formed from the left-eye image data L as a 2-D image.

Figure 3:
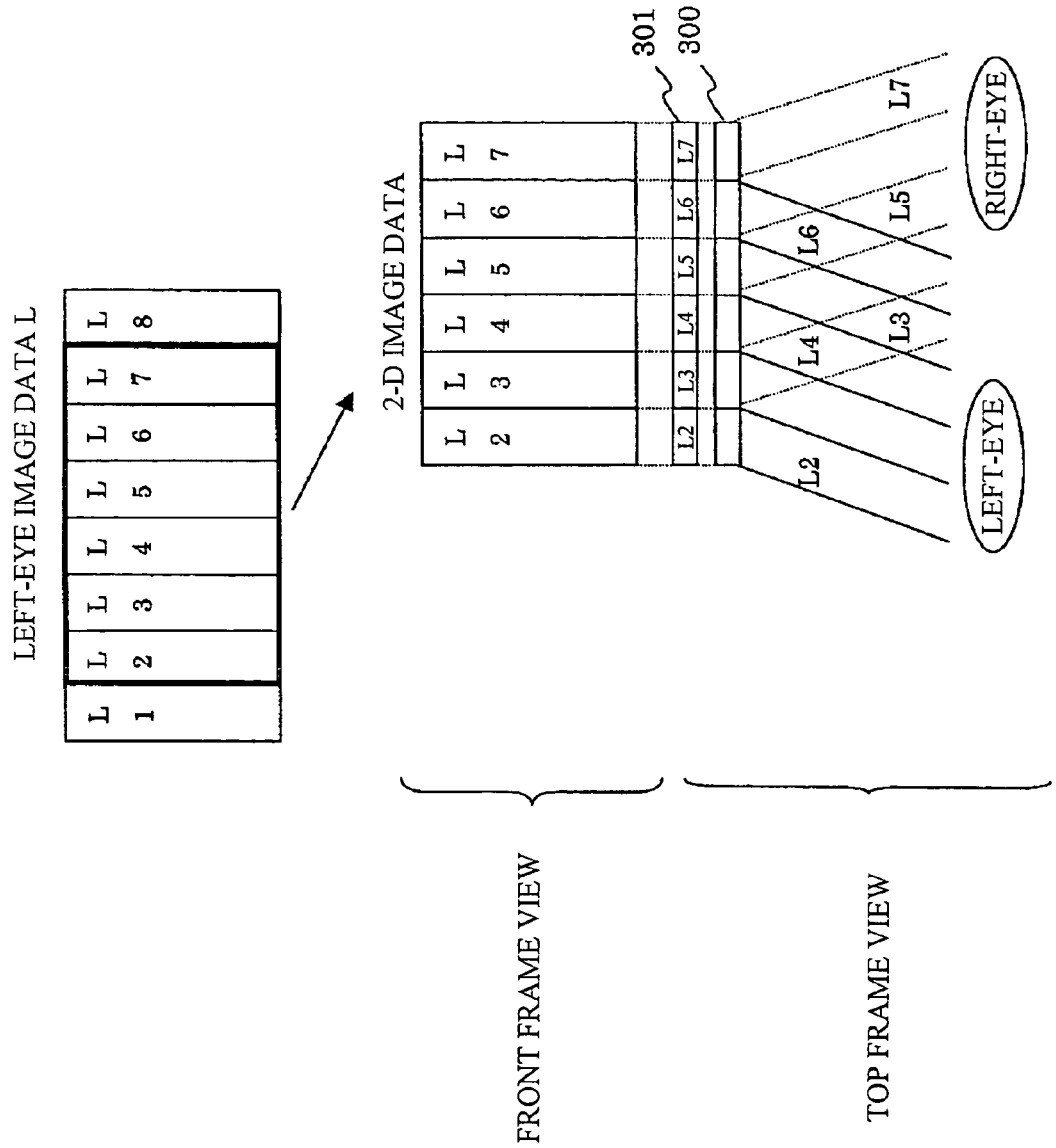
FIG. 3 is an example of how to form 3-D image data and how to display the same when the display means 3 is just enabled for 3-D display in the 3-D image display unit in the first embodiment of the present invention.

As described above, while the display means 3 is enabled for both of 3-D display and 2-D display, the means 3 may be enabled just for 3-D display. FIG. 3 shows an example of how the 2-D image forming means 6 forms data and how the data is displayed in the case where the display mode information M1 denotes a mode for displaying the left-eye image data L as a 2-D image. And, it is assumed here that the display means displays the same image as that described with reference to FIG. 2. The display means 3 has a screen on which slits 300 are provided. The slip-like images L2, L4, and L6 displayed in the frames 301 are sent to the left eye of the user and the slit-like images L3, L5, and L7 are sent to the right eye of the user respectively, so that the user can observe the images formed from the left-eye image data L as a 2-D image. The slits on the screen of the display means 3 may be replaced with lenses.

In the case where the right-eye 2-D image display mode is set in the display mode information M1, a 2-D image is formed from a right-eye image and displayed on the screen just like in the left-eye 2-D image display mode.

Next, a description will be made for the operation of the display unit when the 3-D image display mode is set in the display mode information M1. In the case where the display mode information M1 specifies the 3-D image display mode, the switch controlling means 10 turns on the switches 11 and 12 and controls the switch 14 so that the 3-D image forming means 1 is connected to the frame memory 2. Thus, the left-eye image data L and the right-eye image data R are inputted to the 3-D image forming means 1 from external through the switch 11 and the switch 12 respectively. The 3-D image forming means 1 thus forms 3-D image data and writes the formed data in the frame memory 2. The 3-D image data is then inputted from the frame memory 2 to the display means 3. Finally, the display means displays the inputted 3-D image data as a 3-D image.

Figure 4:
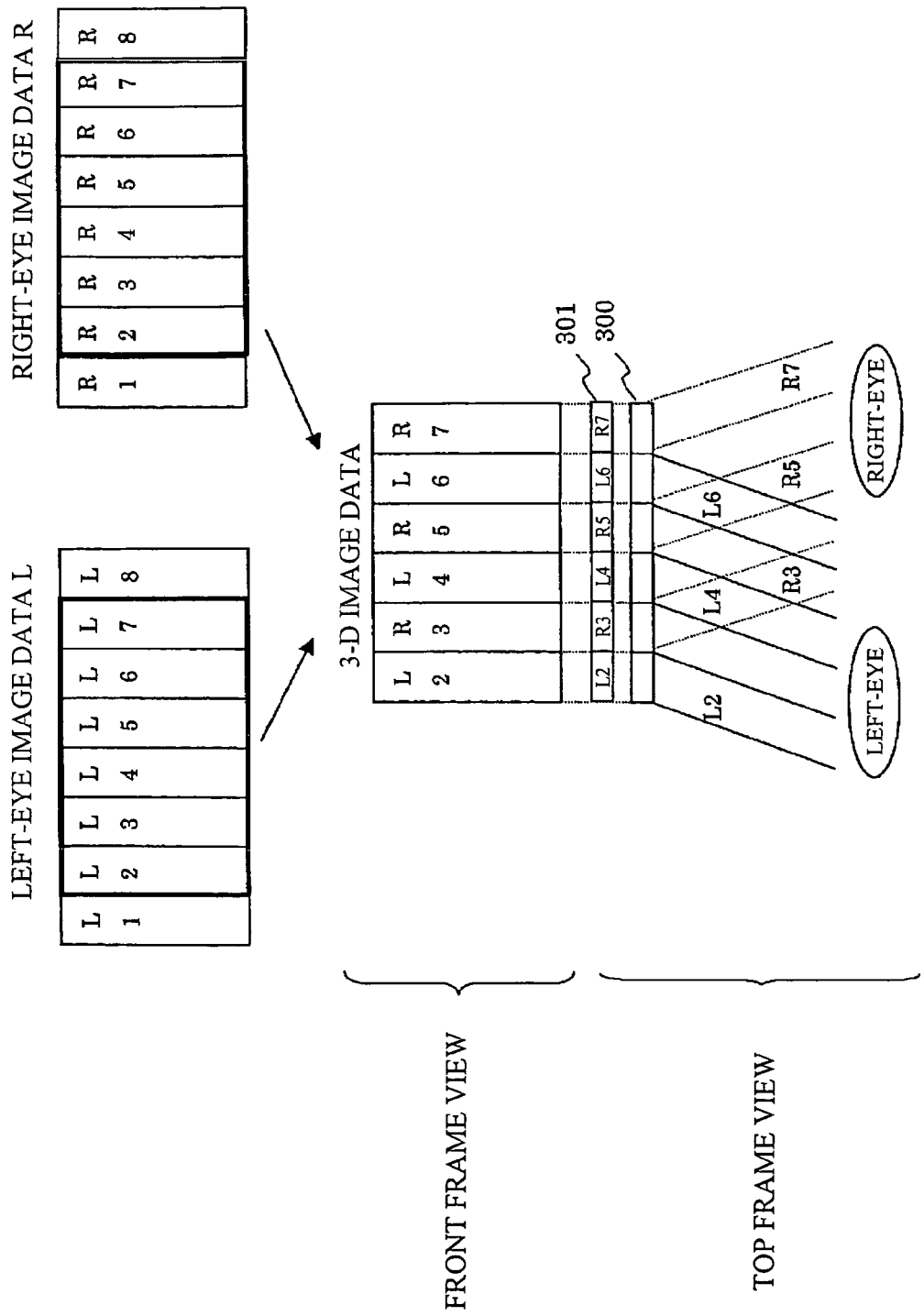
FIG. 4 is an example of how to form 3-D image data and how to display the same with use of the 3-D image display unit in the first embodiment of the present invention.
Figure 5:
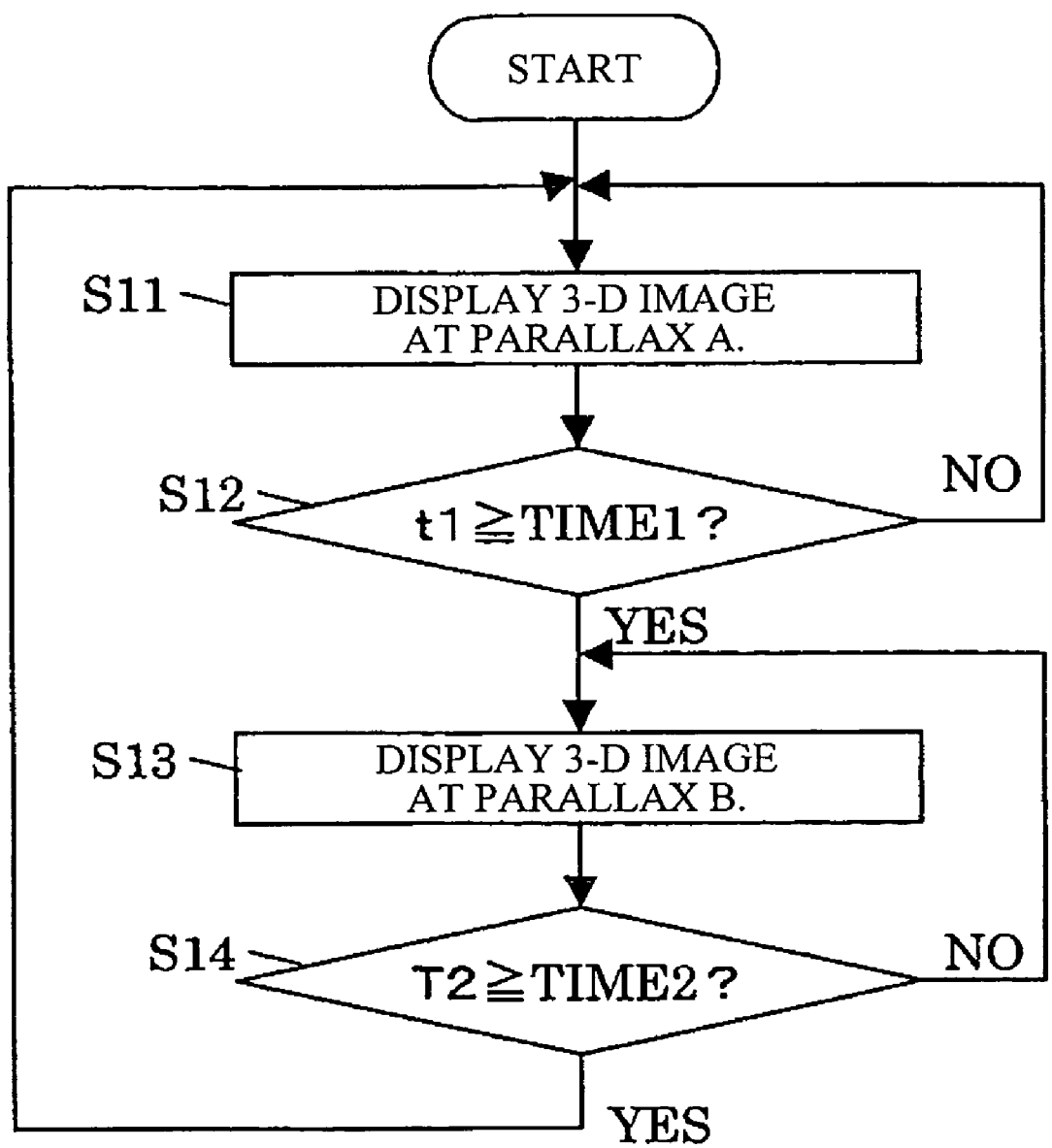
FIG. 5 is a flowchart of the processings to display a 3-D image with use of the 3-D image display unit in the first embodiment of the present invention.

FIG. 4 shows an example of how 3-D image data is formed and how the image data is displayed. It is assumed here that slip-like images L1 to L8 are obtained by decomposing the left-eye image data L in the vertical direction and slip-like images R1 to R8 are obtained by decomposing the right-eye image data R in the vertical direction respectively. The size of the images to be displayed in the horizontal direction is assumed to be smaller than the size of both of the left-eye image data L and the right-eye image data R in the horizontal direction. For example, in the case where the images within the thick frame among the right-eye images and the left-eye image data shown in FIG. 4 are to be displayed actually, the 3-D image data is formed using the slip-like images L2, R3, L4, R5, L6, and R7 as shown in FIG. 4. And, because slits 300 or lenses are provided on the screen of the 3-D image display unit, the slip-like images L2, L4, and L6 displayed in the 3-D image data 301 are sent to the left eye of the user while the slip-like images R3, R5, and R7 displayed in the 3-D image display unit are sent to the right eye of the user, thereby the user can observe the 3-D image.

In the example shown in FIG. 4, how to form (combine) 3-D image data by thinning out and combining inputted image data is described. While the 3-D image forming means 1 shown in FIG. 1 may do both thinning and combining such way, the thinning may be done by an external device and only the combining may be done by the 3-D image forming means 1. In the latter case, the left-eye image data L and the right-eye image data R inputted to the 3-D image forming means 1 from external come to be configured by only L2, L4, L6, and L8 and only R1, R3, R5, and R7 respectively.

In this embodiment, an adjustment is made so that the 3-D image parallax is reduced in the case where 3-D image display is continued for a predetermined time. Next, how the 3-D image parallax is handled and how each 3-D image is seen will be described with reference to FIG. 18.

Figure 18:
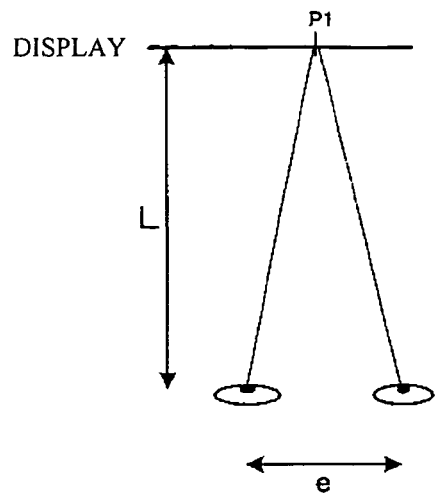
FIGS. 18A to 18C are examples of how the parallax of a 3-D image is and how the 3-D image is seen.
Figure 18:
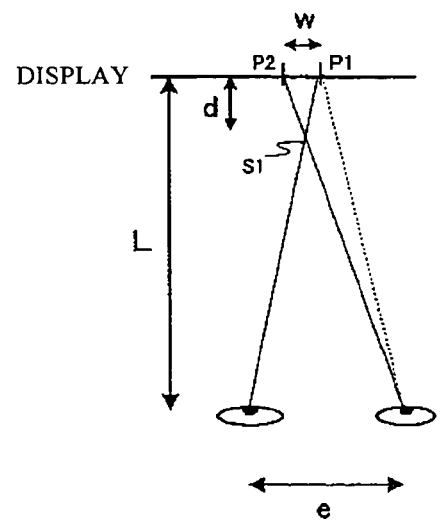
Figure 18:
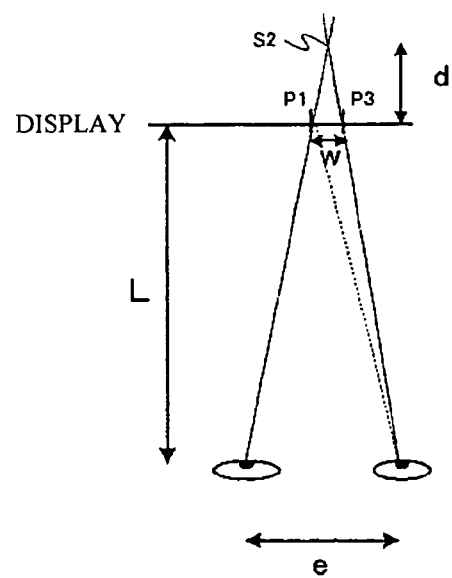

In FIG. 18, the distance between the left and right eyes of the user is assumed as "e" and the distance between the user and the display screen is assumed as "L". And, in FIG. 18A, both of the right-eye image and the left-eye image are positioned at the same point (P1) on the screen. At that time, the user recognizes the image as if the image were on the display screen.

After that, as shown in FIG. 18B, the image observed by the right eye is moved by a distance of "w" from the P1 to the left. The right-eye image comes to the position of P2. At that time, the image is observed as if it were positioned at S1, thereby the user recognizes the image as if it came out of the screen by a distance of "d" toward the user.

After that, as shown in FIG. 18C, the right-eye image is moved by a distance of "w" from the P1 to the right. The right-eye image thus comes to the position of P3. At that time, the image is observed as if it were positioned at S2. The user thus recognizes the image as if it drew back from the display screen by a distance of "d".

Generally, the parallax of a 3-D image differs among pixels. The 3-D image impression of the user received from the entire image is referred to as "parallax" here. The parallax is adjusted by changing the relative positions of the left-eye and right-eye images in the horizontal direction as to be described later.

Next, a description will be made for how the 3-D image display unit shown in FIG. 1 displays 3-D images.

In the initial state, the 3-D image display unit displays a 3-D image at a predetermined parallax A (S1'). The time measuring/judging means 4 then measures the 3-D image display time at the parallax A. In that case, the means 4 starts the time measurement when the 3-D image display begins. The 3-D image forming means 1, while the 3-D image is displayed, sends a 3-D image display notice signal to the time measuring/judging means 4. Receiving the 3-D image display notice signal, the time measuring/judging means 4 starts measuring the time t1.

The time measuring/judging means 4 then judges whether or not the measured time t1 exceeds a predetermined time TIME1 (S12). In the case where the judgment result is NO (not exceeds), control goes to step 11 in which the time measuring/judging means 4 continues the display of the 3-D image at the parallax A. In the case where the judgment result is YES (exceeds), the time measuring/judging means 4 outputs a time measurement end signal T1 to the parallax controlling means 5.

The parallax controlling means 5, when receiving a time measurement end signal T1, instructs the 3-D image forming means 1 to form a 3-D image by reducing the parallax. The 3-D image forming means 1 then reduces the parallax and forms a 3-D image. At the same time, the means 1 sends a reset signal to the time measuring/judging means 4. The 3-D image forming means 1 thus stores the original parallax (parallax A). Consequently, the display means displays a 3-D image having a parallax B that is smaller than the parallax A (S13).

The "parallax information" to be stored here is represented by a relative position of the right-eye image data R with respect to the left-eye image data L positioned on the 3-D image data, for example, when the 3-D image data is formed. And, the 3-D image forming means 1 stores the position of each of the right-eye image and the left-eye image corresponding to the coordinates (x, y) at the top left of the thick frame shown in FIG. 4.

In the case where the top left point of the image is defined as the origin (0,0) in FIG. 4, the horizontal direction is defined as "x", and the vertical direction is defined as "y", then both of the right and left positions of the thick frame become (1,0) respectively.

At that time, when reducing the parallax of a 3-D image that looks as if it were at the front of the display screen, the 3-D image is reformed so as to be moved back closer to the display screen. Concretely, the right-eye image data R is just shifted to the right in the horizontal direction with respect to the left-eye image data L. When increasing the parallax, the 3-D image is reformed so as to be moved to the front of the display screen. Concretely, the right-eye image data R is just shifted to the left in the horizontal direction with respect to the left-eye image data L.

When reducing the parallax of a 3-D image that looks as if it were at the back of the display screen, the 3-D image is reformed so as to be moved forward and closer to the display screen. When increasing the parallax, the 3-D image is reformed so as to be moved back of the screen.

At that time, the right-eye image data R is shifted in the opposite direction of that when the 3-D image looks as if it were at the front of the display screen.

Next, a description will be made for an example of how to form a 3-D image by shifting the left-eye image data L in the horizontal direction to adjust the parallax of the object 3-D image with reference to Table 2.

TABLE 2

|  | Required left-eye image data L | Required right-eye image data R |
|---|---|---|
| When moving a 3-D image to the front of the current display position | Arrange the image data in order of L and R, then use the outer (left) side portion. | Arrange the image data in order of L and R, then use the outer (right) side portion. |
| When moving a 3-D image to the back of the current display position | Arrange the image data in order of L and R, then use the inner (right) side portion. | Arrange the image data in order of L and R, then inner (left) side portion. |

When moving a 3-D image to the front of the current display position while the image is formed with part of each of the left-eye image data L and the right-eye image data R, the image data is arranged in the order of L and R, then the object 3-D image is reformed with the outer region of each of L and R. When moving the 3-D image to the back of the screen, the image data is arranged in the order of L and R, then the inner region of each of L and R is used to reform the 3-D image. For example, when moving a formed 3-D image to the front of the screen while the coordinates (1,0) are set for both of the top left and top right corners of the thick frame shown in FIG. 4, the top left corner coordinates are set at (0,0) and the top right corner coordinates are set at (2,0) to reform the 3-D image. When moving the 3-D image to the back of the screen, the top left corner coordinates are set at (2,0) and the top right corner coordinates are set at (0,0) to reform the 3-D image.

Figure 6:
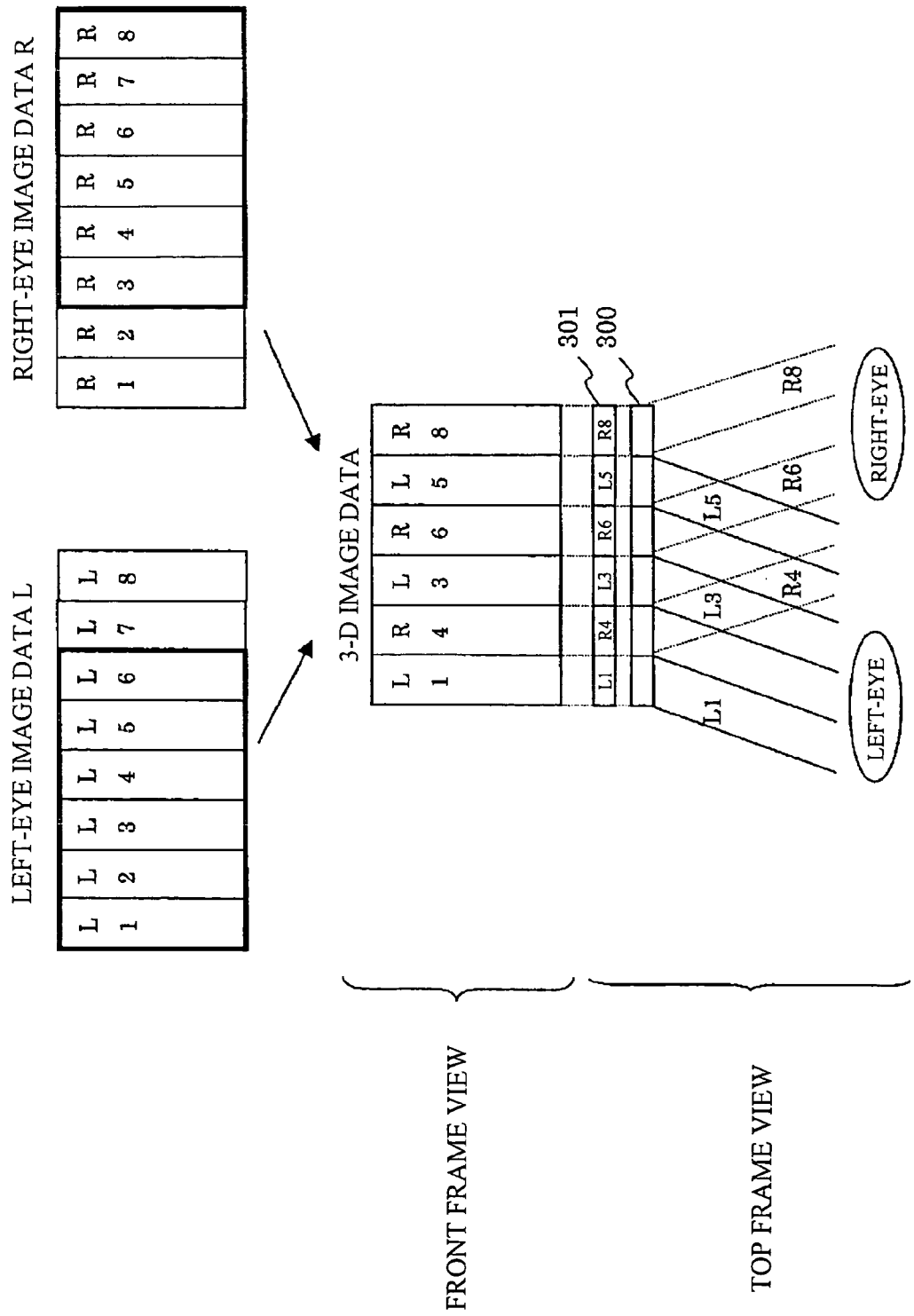
FIG. 6 is an example of how to form 3-D image data and how to display the same with use of the 3-D image display unit in the first embodiment of the present invention.

Next, how to form 3-D image data by reducing the parallax will be described with reference to FIG. 6. FIG. 6 shows an example of how to form 3-D image data and how to display the same by reducing the parallax so that the 3-D image looks as if it were at the front of the screen. For example, the 3-D image data shown in FIG. 4 is used to display a 3-D image that looks as if it were at the front of the screen. At that time, when displaying a 3-D image by reducing the parallax, the 3-D image is just reformed so that it is moved to the back of the screen. In other words, as described in Table 2, the top left corner coordinates of the thick frame shown in FIG. 6 is just set at (0,0) for the left-eye image data L and (2,0) for the right-eye image data R.

The L1, L3, and L5 of the left-eye image data L are set at the positions of L2, L4, and L6 of the 3-D image data shown in FIG. 4. Similarly, the R4, R6, and R8 of the right-eye image data R are set at the positions of the R3, R5, and R7 of the 3-D image shown in FIG. 4. The L1, L3, and L6 of the 3-D image are observed by the left eye while the R4, R6, and R8 are observed by the right eye, thereby the user can recognize the 3-D image data as a 3-D image.

When reducing the parallax of a 3-D image, the thick frame shown in FIG. 4 is shifted to the left for the left-eye image data L and to the right for the right-eye image data R to form the object 3-D image. When increasing the parallax of the 3-D image, the thick frame is shifted in the opposite direction to form the object 3-D image data.

In the case where a 3-D image having a parallax A is modified to be displayed with a smaller parallax B, since its display time exceeds a predetermined time TIME1 such way, the time measuring/judging means 4 resets the current measuring time and starts measuring of the time t2 at which the 3-D image is displayed with the new parallax B.

After that, the time measuring/judging means 4 compares the measured time t2 with a predetermined time TIME2 (S14). In the case where the time t2 does not reach the TIME2 yet, control returns to step 13 in which the time measuring/judging means 4 continues the display of the 3-D image having the smaller parallax B. In the case where the measured time t2, that is, the display time of the 3-D image having the parallax B reaches the predetermined time TIME2, the time measuring/judging means 4 outputs a time measuring end signal T2 to the parallax controlling means 5. Receiving the signal T2, the parallax controlling means 5 outputs a signal for restoring the parallax stored in the 3-D image forming means 1 to the 3-D image forming means 1. Receiving the signal, the 3-D image forming means 1 restores the original parallax to form the object 3-D image and sends a reset signal to the time measuring/judging means 4. At that time, the time measuring/judging means 4 may restore the original parallax A immediately or form a 3-D image to be displayed so that the parallax increases step by step.

As described above, in the case where the parallax of a 3-D image is changed to another, the 3-D image forming means 1 outputs a reset signal to the time measuring/judging means 4. Receiving the reset signal, the time measuring/judging means 4 resets the measuring time to 0, then starts time measuring again. As described above, the time measuring/judging means 4 measures the 3-D display time at a predetermined parallax and adjusts the parallax according to the result of the time measurement to form the object 3-D image.

Next, a description will be made for signals to be exchanged among the 3-D image forming means 1, the time measuring/judging means 4, and the parallax controlling means 5 with reference to Table 3.

TABLE 3

| | Signal Name | | |
|---|---|---|---|
| State | Signals output to time measuring/judging means 4 from 3-D image forming means 1 | Signals output to parallax controlling means 5 from time measuring/judging means 4 | Signals output to 3-D image forming means 1 from parallax controlling means 5 |
| [1-1] | 3-D image display notification signal | None | None |
| [1-2] | Reset signal | Time measurement end signal T1 for notifying that a predetermined time TIME1 is reached | Signal for instructing forming of a 3-D image by reducing the parallax |
| [1-3] | 3-D image display notification signal | Time measurement end signal T2 for notifying that a predetermined time TIME2 is reached | Signal for instructing forming of a 3-D image by restoring the original parallax |
| [1-4] | Reset signal | None | None |

The state [1-1] denotes that time measurement is started by the time measuring/judging means 4. In that state, the 3-D image forming means 1 outputs a 3-D image display notification signal to the time measuring/judging means 4. The signal denotes that the display unit is displaying a 3-D image.

The state [1-2] denotes that the measurement time of the time measuring/judging means 4 reaches a predetermined time TIME1. In that state, the time measuring/judging means 4 outputs a time measurement end signal T1 for denoting that the time TIME1 is reached to the parallax controlling means 5, thereby the parallax controlling means 5 outputs a signal for instructing the 3-D image forming means 1 to form a 3-D image by reducing the parallax. Receiving the signal, the 3-D image forming means 1 outputs a reset signal for resetting the time measuring/judging means 4 to the time measuring/judging means 4.

The state [1-3] denotes that the measurement time of the time measuring/judging means 4 reaches a predetermined time TIME2. In that state, the time measuring/judging means 4 outputs a time measurement end signal T2 for denoting that the time TIME2 is reached to the parallax controlling means 5. And accordingly, the parallax controlling means 5 outputs a signal for instructing the 3-D image forming means 1 to form a 3-D image by restoring the original parallax. At the same time, the 3-D image forming means 1 outputs a 3-D image display notification signal to the time measuring/judging means 4.

The state [1-4] denotes that the original parallax is restored for forming an object 3-D image. In that state, the 3-D image forming means 1 outputs a reset signal to the time measuring/judging means 4.

As described above, because the 3-D image display unit of the present invention can display each 3-D image by reducing the parallax even when the user is observing 3-D images for a long time, thereby his/her parallax sensitivity goes down due to his/her eyestrain. The user can thus be protected from eyestrain. And, when the user restores his/her original parallax sensitivity due to his/her recovery from the eyestrain, the display unit starts displaying the 3-D image with the original parallax, so that the user can observe 3-D images again with less feeling of indifference. The TIME1 and TIME2 described above can be stored as preset values in the memory provided in the 3-D image display unit.

Each of TIME1 and TIME2 may not be only one value. For example, a plurality of values may be set for TIME1/TIME2 according to the number of combinations of parameters set for a screen size of input images, as well as such a full replay time as items related to the eyestrain in the case where the input images are for video data. The TIME1/TIME2 may also be set or changed by the user.

Figure 7:
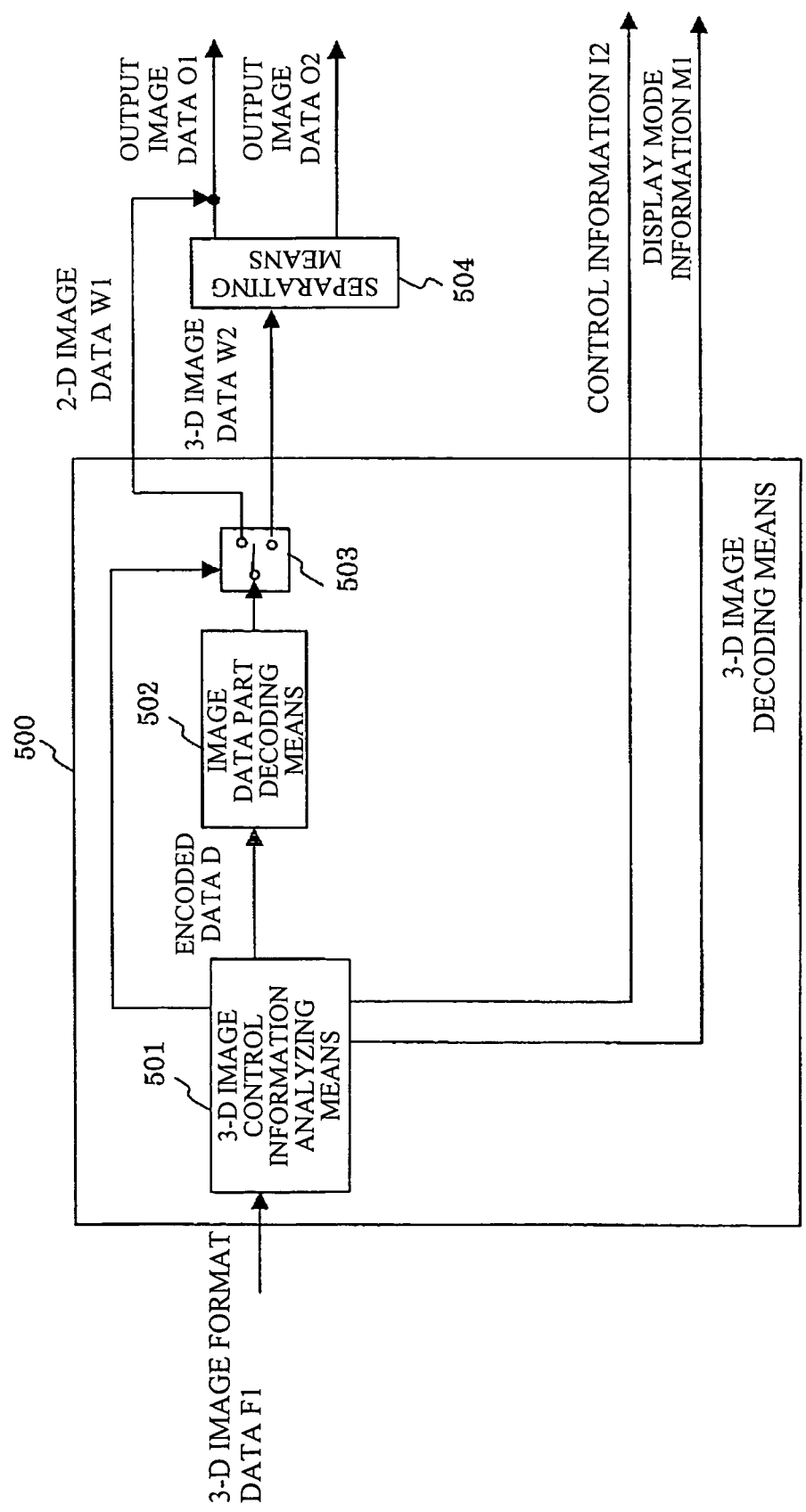
FIG. 7 is an example of 3-D image decoding means 500 for decoding 3-D image format data F1 in the first embodiment of the present invention.

The 3-D image display unit may also include 3-D image decoding means 400 for decoding the 3-D image format data F1 as shown in FIG. 7 and separating means 504 for separating 3-D image data decoded by the means 500 into right-eye image data and left-eye image data. In that connection, the 3-D image format data F1 may include values equivalent to the above-described TIME1 and TIME2 stored beforehand in itself so that those values are substituted for the TIME1 and TIME2 in the 3-D image display unit. Hereinafter, the operation of the 3-D image decoding means 500 will be described. The 3-D image decoding means 500 includes 3-D image control data analyzing means 501, image data decoding means 502, and a switch 503 and decodes the 3-D image format data F1.

Figure 8:
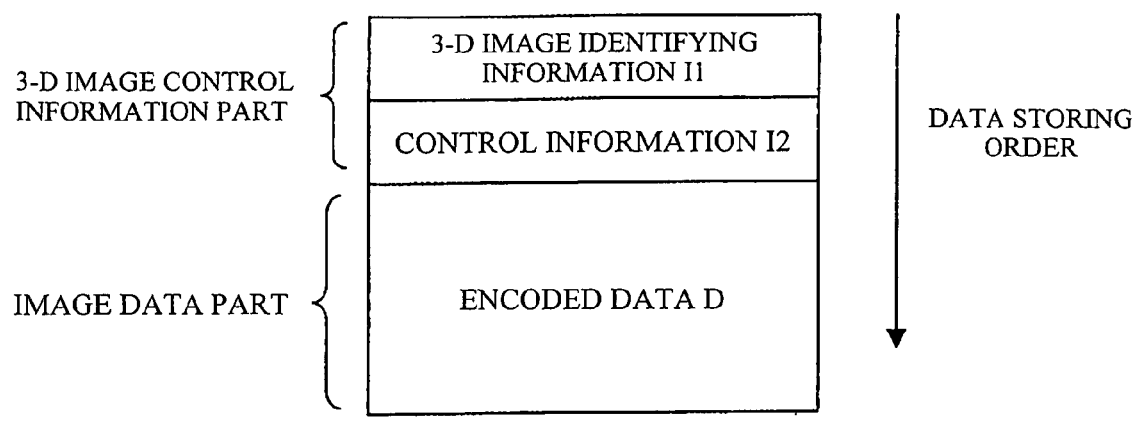
FIG. 8 is an example of the 3-D image format data F1 in the first embodiment of the present invention.

Next, the 3-D image format data F1 will be described. FIG. 8 shows an example of the 3-D image format data F1. The 3-D image format data F1 shown in FIG. 8 is configured by a 3-D image control information part and an image data part. The 3-D image control information part is configured by 3-D image identification information I1 for denoting whether or not the 3-D image format data F1 is 3-D image display data, as well as control information I2. The image data part is configured by encoded data D. The control information I2 denotes the above described TIME1 and TIME2. The encoded data in the image data part may be encoded with such an encoding method as JPEG, MPEG, or the like from an image in which the corresponding left-eye image data L and right-eye image data R are arranged side by side horizontally. In the 3-D image format data F1, data is stored in the order of I1, I2, and D.

The 3-D image control data analyzing means 501 analyzes the 3-D image control information and judges whether or not the 3-D image format data F1 is 3-D image display data. In the case where the judgment result is YES, the 3-D image control data analyzing means 501 outputs the control information I2 that denotes the values of both TIME1 and TIME2 and the 3-D image display mode set in Table 1, which denotes the display mode information M1 to the 3-D image display unit, then controls the switch 503 to connect the image data decoding means 502 to the separating means 504. At the same time, the 3-D image control data analyzing means 501 outputs the decoded data D to the image data decoding means 502. The image data decoding means 502 decodes the encoded data D to generate 3-D image data W2 to be output to the separating means 504. The separating means 504 separates the inputted 3-D image data W2 into left-eye image data L and right-eye image data R, then outputs both L and R to the 3-D image display unit as output image data O1 and O2. The output data O1 and O2 are inputted to the 3-D image display unit shown in FIG. 1 as input images A1 and A2.

The values stored in the control information I2 provided in the 3-D image format data F1 may be any one of TIME1 and TIME2. And, a preset value may be used for any data that is not stored in the control information I2.

The values stored in the control information I2 provided in the 3-D image format data F1 may be any one of TIME1 and TIME2. And, a preset value may be used for any data that is not stored in the control information I2.

For example, when reproducing 3-D image format data F1 in which only TIME1 is stored, the 3-D image display is controlled so as to reduce the parallax when the 3-D image display time reaches the TIME1. After that, however, the display is assumed to be controlled for each reproducing apparatus freely. In other words, when the 3-D image display time reaches TIME1, the following processings are enabled.

(i) The 3-D image display is continued with a reduced parallax until the power is turned off next.

(ii) The subject reproducing apparatus sets a time equivalent to TIME2 and restores the original parallax as described above.

(iii) The subject reproducing apparatus sets a predetermined time and changes over the 3-D image display to 2-D image display when the 3-D image display time reaches a predetermined time.

Although the parallax of a 3-D image is reduced when the measured value of the 3-D display time reaches TIME1 in the above example, 3-D image display may be changed over to 2-D image display when TIME1 is reached. Consequently, the intention of the contents creator of the 3-D image is affected in the display and the user can be recovered from eyestrain earlier.

In the case where the 3-D image identification information I1 denotes that the 3-D image format data F1 is not 3-D image display data, the 3-D image control data analyzing means 501 does not output the control information I2. Instead, the 3-D image control data analyzing means 501 outputs information for denoting the input image through display mode to the 3-D image display unit as display mode information M1. At the same time, the 3-D image control data analyzing means 501 changes over the switch 503 so that the image data decoding means 502 outputs image data O1. At the same time, the 3-D image control data analyzing means 501 outputs encoded data D to the image data decoding means 502. The image data decoding means 502 then decodes the data D. The decoded data is assumed as 2-D image data W1 and output as output image data O1, which is then inputted to the 3-D image display unit shown in FIG. 1 as an input image A1.

The image data stored in the 3-D image format data F1 described above may not be encoded. For example, the data may not be compressed.

And, although the display mode information M1 is obtained from the 3-D image control information I1 in the above description, the M1 may be inputted from external and such an inputted external value may be used with priority. However, it is only when the 3-D image control information I1 denotes that the 3-D image format data F1 is not 3-D image display data that the value in the display mode information M1 specifies the input image through display mode forcibly.

Figure 9:
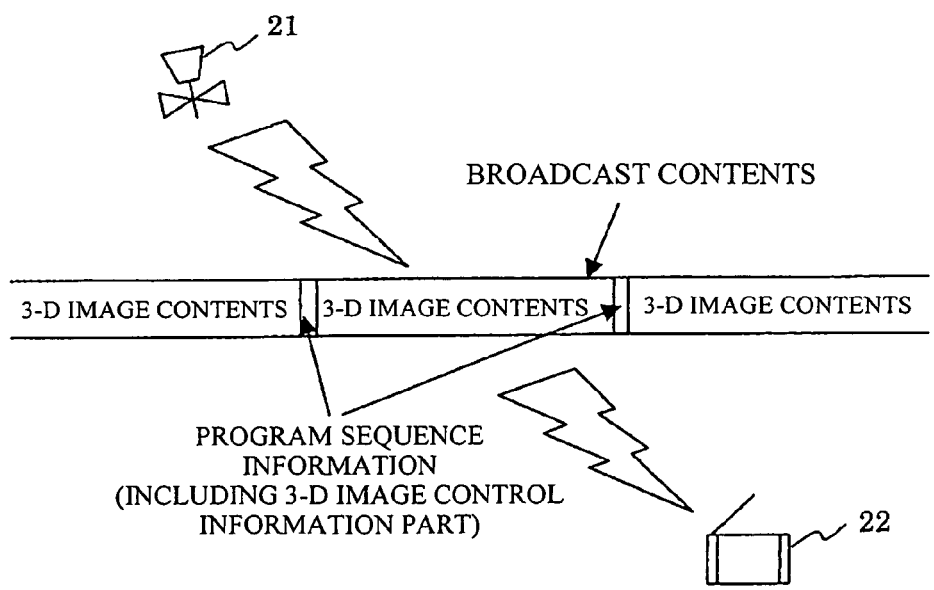
FIG. 9 is an example of how to receive 3-D image contents broadcast in the first embodiment of the present invention.

Furthermore, the 3-D image control information part of the 3-D image format data F1 described above may be inserted repetitively in the data F1. FIG. 9 shows an example of how to receive broadcast 3-D image contents. For example, a mobile receiving terminal 22 receives the waves of 3-D image contents broadcast from a broadcasting satellite 21. In that connection, the broadcast contents are configured by a plurality of pieces of program arrangement information and 3-D image contents. The 3-D image control information part may be inserted in the program arrangement information as part of the information.

In the 3-D image format data F1, the 3-D image control information part may be inserted in the image data part. For example, in the case where the data in the image data part is encoded with MPEG-4, the 3-D image control information part may be inserted in a predetermined position ruled in the MPEG-4 encoded data.

Although the time measuring/judging means 4 starts time measurement just when 3-D image display begins in the above description, the time measuring/judging means 4 may start the measurement just when data is received from the 3-D image control information part for the first time after receiving the broadcast contents begins or when the program arrangement information is received for the first time in the case where the 3-D image control information part data is included in the program arrangement information. And, in the case where the necessary time information for reproducing a program is included in the above program arrangement information received for the first time, the time measuring/judging means 4 may start time measurement just when the 3-D image is formed with the information.

Although the 3-D image format data F1 is broadcast in the above example, such a network as the Internet may be used to send the F1. The F1 may also be recorded in such a recording medium as a hard disk, an optical disk, or the like instead of the above sending method.

Figure 10:
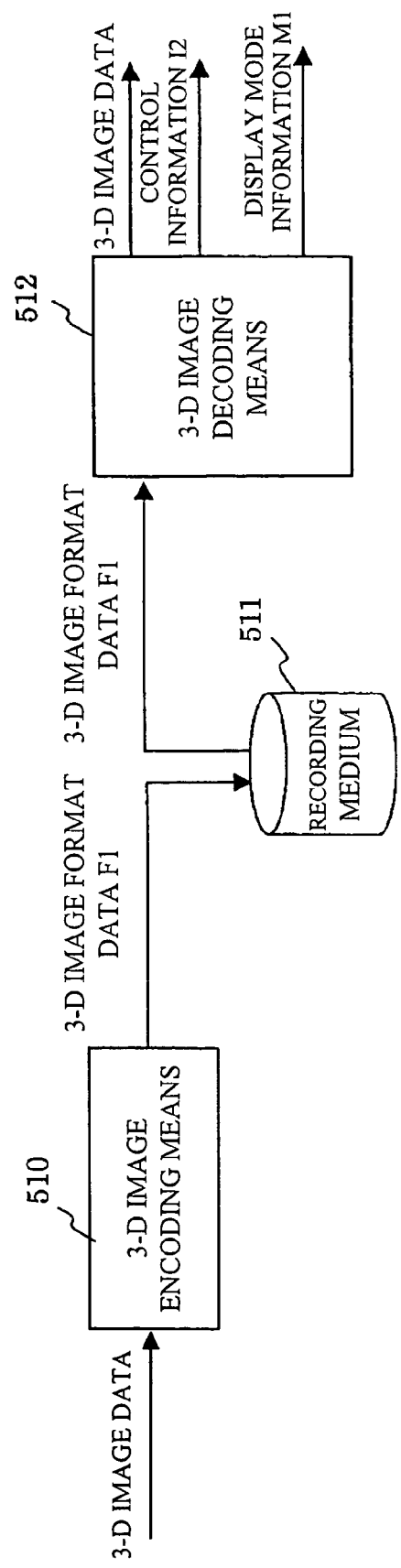
FIG. 10 is an example of a flow of 3-D image format data F1 when a recording medium is used as a transmission path for the data F1 in the first embodiment of the present invention.

FIG. 10 shows an example of a flow of 3-D image format data F1 recorded and used on a recording medium. Assume now that 3-D image data is inputted to the 3-D image encoding means 510. The 3-D image encoding means 510 then encodes the inputted 3-D image data and forms the 3-D image format data F1, then outputs the formed 3-D image format data F1 to the recording medium 511. The recording medium 511 may be a hard disk, optical disk, or the like and can record inputted digital data. The 3-D image format data F1 is output from the recording medium 511 to the 3-D image decoding means 512. The 3-D image decoding means 512 then decodes the 3-D image format data F1 similarly to the 3-D image decoding means 500 described above, then outputs the control information I2, the display mode information M1, and the 3-D image data.

Figure 11:
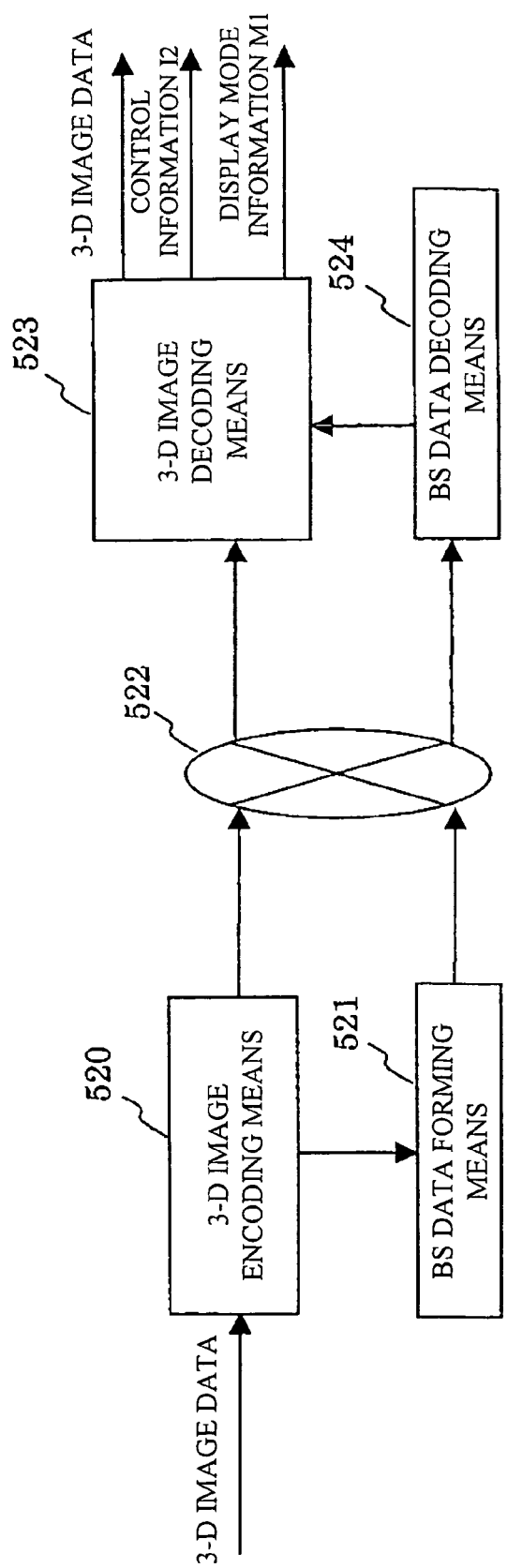
FIG. 11 is an example of a flow of 3-D image format data F1 when a network is used as a transmission path for the data F1 in the first embodiment of the present invention.

FIG. 11 shows an example of a flow of the 3-D image format data F1 when a network is used as a F1 transmission path. For example, 3-D image data is inputted to the 3-D image encoding means 520. The 3-D image encoding means 520 then encodes the inputted 3-D image data to form the 3-D image format data F1. The 3-D image format data F1 is transmitted to the 3-D image decoding means 523 through the network 522. The 3-D image decoding means 523 decodes the 3-D image format data F1 similarly to the 3-D image decoding means 500 and outputs the control information I2, the display mode information M1, and the 3-D image data respectively.

The 3-D image format data F1 to be transmitted may be transformed to data usable for the BS, CS, and other broadcasting systems. For example, 3-D image data may be inputted to the 3-D image encoding means 520. The 3-D image encoding means 520 encodes the inputted 3-D image data, forms the 3-D image format data F1, then outputs the formed format data F1 to the BS data forming means 521. The BS data forming means 521 then forms BS data using the 3-D image format data F1, then outputs the formed BS data to the BS data decoding means 524 through the network 522. The BS data decoding means 524 decodes the inputted BS data to form the 3-D image format data F1, then outputs the F1 to the 3-D image decoding means 523. The 3-D image decoding means 523 then decodes the 3-D image format data F1 similarly to the 3-D image decoding means 500, then outputs the control information I2, the display mode information M1, and the 3-D image data respectively.

Such way, the 3-D image display unit can obtain TIME1 and TIME2 from the values set in the control information I2 so as to be used for object processings. The display unit can set TIME1 and TIME2 according to the object data to be displayed as a 3-D image conveniently.

Figure 12:
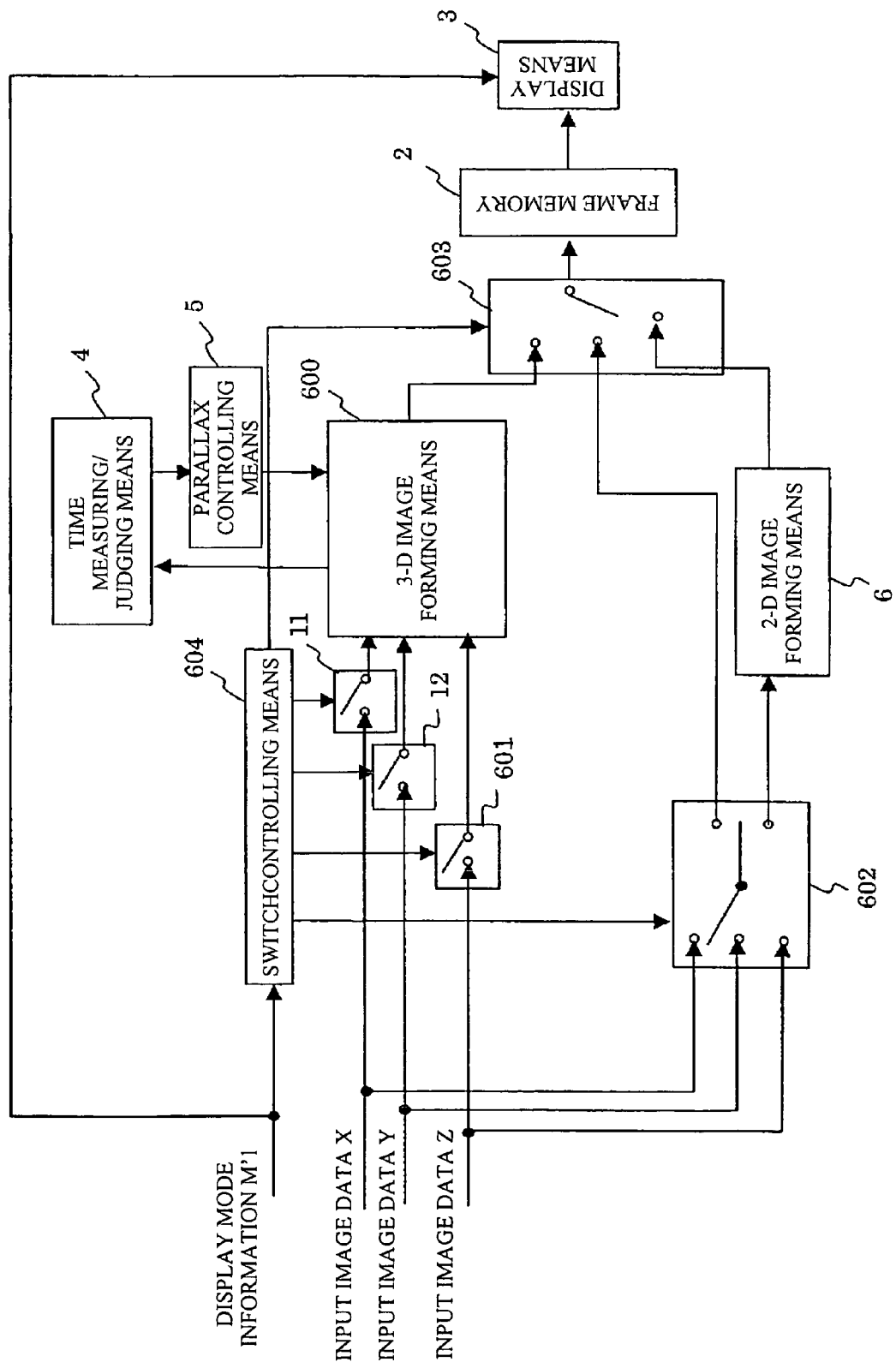
FIG. 12 is a block diagram of the 3-D image display unit in the first embodiment of the present invention in the case where there are three input images handled in the unit.

Next, a description will be made for a case in which there are three input images to be handled. FIG. 12 shows a block diagram of the 3-D image display unit in the first embodiment when the display unit handles those three input images.

This 3-D image display unit comprises 3-D image forming means 600 for forming 3-D image data with an input of multiple-viewpoint image data (input images X, Y, and Z) photographed from three viewpoints, then outputting the 3-D image data to a frame memory 2, 2-D image forming means 6 for forming a 2-D image from any one of the multiple-viewpoint images, switches 11, 12, 601 to 603 for switching among input/output image data, switch controlling means 604 for controlling those switches in accordance with display mode information M'1 for denoting whether to make 3-D or 2-D display using the multiple-viewpoint image data, a frame memory 2 for storing images formed by the 3-D image forming means 600 or 2-D image forming means 6 or input images as are, display means 3 enabled for both 3-D display and 2-D display and to display the image data stored in the frame memory 2 as 3-D images or 2-D images according to the display mode information M'1, time measuring/judging means 4 for measuring a 3-D image display time when displaying the 3-D image, and parallax controlling means 5 for instructing the 3-D image forming means 600 to form a 3-D image by adjusting the parallax of each multiple viewpoint image in case where the 3-D image display time reaches a predetermined time.

The display mode information M'1 will be described later.

The operations of the frame memory 2, the display means 3, the time measuring/judging means 4, the parallax controlling means 5, the 2-D image forming means 6, and switches 11 and 12 are all the same as those of the 3-D image display unit in the first embodiment when the display unit handles two input images, so that the same numerals/characters will be used for those shown in FIG. 12. Hereinafter, the first embodiment of the present invention will be described with reference to FIG. 12 when the display unit handles three input images.

At first, the display mode information M'1 is inputted to the switch controlling means 604 from external. There are eight types for the display mode information M'1; 3-D image display modes 1 to 4, 2-D image display modes 1 to 3, and an input image through display mode. The 3-D image display unit switches among the 3-D image display modes using two or three input images, the 2-D image display modes using any one of input images, and the input image through display mode that displays each input 2-D image as is.

Table 4 summarizes a relationship among the values of the display mode information M'1, the mode names, and the images displayed in those modes.

TABLE 4

| Display Mode Information M'1 | Mode Name | Display Image |
|---|---|---|
| 1 | 3-D image display mode | 3-D images (2 viewpoints) formed with input images X and Y |
| 2 | 3-D image display mode | 3-D images (2 viewpoints) formed with input images Y and Z |
| 3 | 3-D image display mode | 3-D images (2 viewpoints) formed with input images X and Z |
| 4 | 3-D image display mode | 3-D images (3 viewpoints) formed with input images X, Y, and Z |
| 5 | 2-D image display mode | 2-D images formed with an input image X |
| 6 | 2-D image display mode | 2-D images formed with an input image Y |
| 7 | 2-D image display mode | 2-D images formed with an input image Z |
| 8 | Input image through display mode | Input image X (any one of input images X, Y, and Z) |

In the 3-D image display mode 1, input images X and Y are used to form a 3-D image (2 viewpoints) to be displayed. In the 3-D image display mode 2, input images Y and Z are used to form a 3-D image (2 viewpoints) to be displayed. In the 3-D image display mode 3, input images X and Z are used to form a 3-D image (2 viewpoints) to be displayed. In the 3-D image display mode 4, input images X, Y, and Z are used to form a 3-D image (3 viewpoints) to be displayed.

In the 2-D image display mode 1, an input image X is used to form a 2-D image to be displayed. In the 2-D image display mode 2, an input image Y is used to form a 2-D image to be displayed. In the 2-D image display mode 3, an input image Z is used to form a 2-D image to be displayed. In the 2-D image through display mode, any one of input images X, Y, and Z is displayed as a 2-D image as is.

Hereinafter, the operation of the 3-D image display unit in each of the above 8 display modes will be described. At first, a description will be made for the operation of the display unit when any of the 3-D image display modes 1 to 3 is set in the display mode information M'1.

At first, any one of the display modes 1 to 3 is inputted to the switch controlling means 604. The switch controlling means 604 then turns off the switch 602 and controls the switches 11 and 12 with reference to Table 4 so that image data (any two of the input images X, Y, and Z) required to form 3-D image data in the selected mode are inputted to the 3-D image forming means 600 and controls the switch 603 so that the 3-D image forming means 600 is connected to the frame memory 2. After that, the 3-D image forming means 600 forms 3-D image data (2 viewpoints) similarly to the 3-D image display mode set in the display mode information M1 as described in the case when the display unit handles two input images, then outputs the formed image data to the frame memory 2. Finally, the 3-D image data are inputted to the display means 3 from the frame memory 2. The display means 3 thus displays the inputted 3-D image data (2-viewpoint image data) as a 3-D image.

The parallax controlling means 5 executes the same operation as that in the above case in which the display unit handles two input image data to display a 3-D image by adjusting the parallax.

Although the display means 3 is a two-eye type one for displaying each of the right-eye and left-eye images (2-viewpoint images), the means 3 may be multiple-eye one for displaying 3-viewpoint images. In that connection, the 3-D image display mode 4 may be selected.

Next, the operation of the display unit when the 3-D image display mode 4 is set in the display mode information M'1 will be described.

At first, the 3-D image display mode 4 is inputted to the switch controlling means 604. The switch controlling means 604 then turns off the switch 602 and controls the switches 11 and 12 with reference to the Table 4 so that image data (input images X, Y, and Z) required to form a 3-D image in the selected mode are inputted to the 3-D image forming means 600 and controls the switch 603 so that the 3-D image forming means 600 is connected to the frame memory 2. After that, the 3-D image forming means 600 forms 3-D image data (3-viewpoint images), then writes the formed image data into the frame memory 2. Finally, the 3-D image data are inputted to the display means from the frame memory 2. The display means 3 thus displays the inputted 3-D image data (3 viewpoint images) as a 3-D image.

Figure 13:
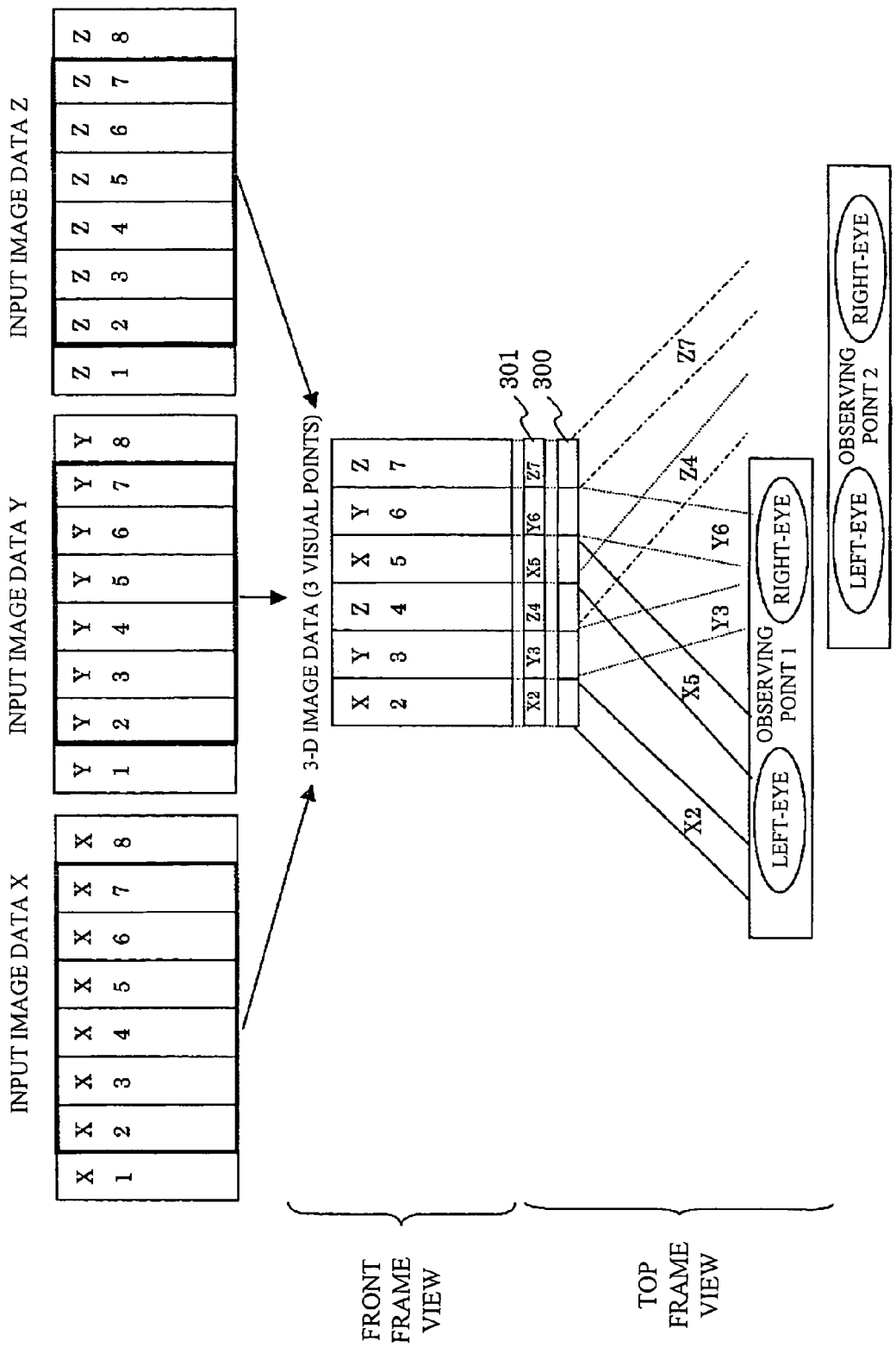
FIG. 13 is an example of how to form 3-D image data and how to display the same in the first embodiment of the present invention in the case where there are three input images handled in the display unit.

Next, the 3-D image data (3-viewpoint images) formed by the 3-D image forming means 600 will be described with reference to FIG. 13. FIG. 13 shows an example of how to form 3-D image data and how to display the same when the display unit handles three input images.

Assume now that each of input image data X, Y, and Z is divided in the vertical direction into slip-like images X1 to X8, Y1 to Y8, and Z1 to Z8 respectively. In that connection, it is assumed that the size of each of the display image data X, Y, and Z in the horizontal direction is smaller than that in the horizontal direction.

For example, in the case where the input image data X, Y, and Z in the thick frames shown in FIG. 13 are to be displayed actually, 3-D image data (3 viewpoints) are formed with X2, Y3, Z4, X5, Y6, and Z7 as shown in FIG. 13. As described above, the 3-D image display unit has slits 301 on its screen and the X2 and X5 images displayed on the screen are sent to the left eye and the Y3 and Y6 images are sent to the right eye of the user respectively, thereby the user can observe the 3-D image at the position 1. And, when the user moves to the right, the Y3 and Y6 images are sent to the left eye and the Z4 and Z7 images are sent to the right eye of the user respectively, thereby the user comes to observe the 3-D image at the position 2.

The parallax adjustment is made as follows at that time; among the images of more than 3 viewpoints, the parallax between images of two viewpoints that are recognized by the user is adjusted in the same way as that of the above case in which the display unit handles two input image data items.

For example, at first, the parallax at the observation point 1 is adjusted. Concretely, the thick frames of the input image data X and Y are moved respectively to form an object 3-D image, thereby the parallax at the observation point 1 is adjusted. In that connection, the thick frame of the input image data Z is moved by the same distance as that of the input image data Y at an adjacent viewpoint and disposed there to form the object 3-D image. And, the parallax at the observation point 1 is changed while the parallax at the observation point 2 remains the same.

After that, the parallax at the observation point 2 may be adjusted. For example, as described in the adjustment of the parallax at the observation point 1, the thick frame of the input image Z is moved by the same distance as that of the thick frame of the input image data Y, then the thick frame of the input image Z is further moved to form the object 3-D image, thereby the parallax at the observation point 2 is adjusted.

As described above, the parallax at each of the observation points 1 and 2 can be adjusted with the same method as that in the above case in which two input images are used even when the display means is a multiple-eye type one for displaying images of 3 viewpoints.

Next, a description will be made for the operation of the 3-D image display unit when each of the 2-D image display modes 1 to 3 is set in the display mode information M'1. At first, any one of the 2-D image display modes 1 to 3 is inputted to the switch controlling means 604. The switch controlling means 604 then turns off the switches 11, 12, and 601 and controls the switch 602 with reference to Table 4 so that an image (any one of the input images X, Y, and Z) required to form a 3-D image in the selected mode is inputted to the 2-D image forming means 6, then controls the switch 603 so that the 2-D image forming means 6 is connected to the frame memory 2. The 2-D image forming means 6 then forms a 3-D image in the same way as that in the 2-D image display mode for the right/left eye set in the display mode information M1 as described in the above case in which the display unit handles two input images, then outputs the formed image to the frame memory 2. Finally, the 2-D image is inputted to the display means 3 from the frame memory 2. The display means 3 thus displays the inputted image data as a 3-D image on its screen.

Next, the operation of the 3-D image display unit when the input image through display mode is set in the display mode information M'1 will be described. At first, the input image through display mode is inputted to the switch controlling means 604. The switch controlling means 604 then turns off the switches 11, 12, and 601, then controls the switches 602 and 603 so that an input image X (any one of the input images X, Y, and Z) is inputted to the frame memory 2. The input image is thus output to the frame memory 2. Finally, the 2-D image is inputted to the display means 3 from the frame memory 2. The display means thus displays the inputted 2-D image as is on its screen.

This completes the description of the operation of the 3-D image display unit in accordance with the data set in the display mode information M'1. And, similarly to the case in which two input images are used, each 3-D image can be displayed by adjusting the parallax in accordance with the degree of the user's eyestrain. At that time, 2-D images can also be displayed as needed.

Even when the number of input images is m (m: an integer 4 or over), each 3-D image can be displayed and the parallax can be adjusted by increasing the number of switches for connecting inputs to the 3-D image forming means 600, the number of contacts between the switch 602 and inputs, and the types of the display mode information M'1 just like in the case in which the number of input images increases from 2 to 3.

The image data part of the 3-D image format data F1 may be configured by n (n≧1). In that connection, the number of viewpoints included in the 3-D image format data F1 may be included in the control information I2. At that time, for example, in the 3-D image decoding means 500 shown in FIG. 7, the number of viewpoints included in the 3-D image format data F1 is transmitted to the separating means 504 from the 3-D image control data analyzing means 501 and the 3-D image W to be output is separated according to the number of viewpoints.

Next, the second embodiment of the present invention will be described.

Figure 14:
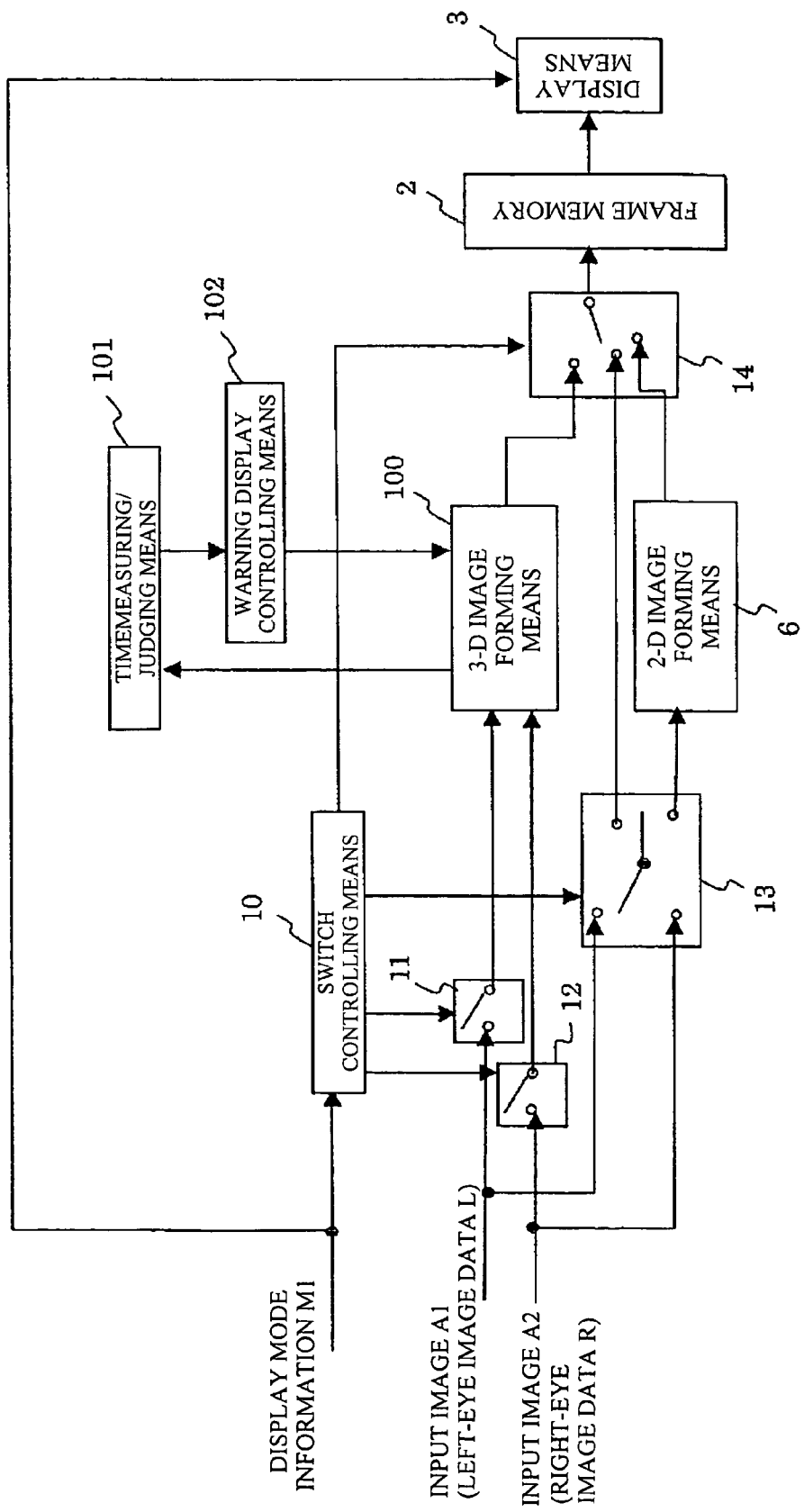
FIG. 14 is a block diagram of a 3-D image display unit in the second embodiment of the present invention.

FIG. 14 shows a block diagram of a 3-D image display unit in the second embodiment of the present invention.

The 3-D image display unit in the second embodiment of the present invention comprises 3-D image forming means 100 for forming a 3-D image with both of inputted right-eye and left-eye images, 2-D image forming means 6 for forming a 2-D image with one of right-eye and left-eye input images, switches 11 to 14 for switching an input/output image to another respectively, switch controlling means 10 for controlling each of those switches 11 to 14 in accordance with the display mode information M1, a frame memory 2 for storing images formed by the 3-D image forming means 100 or 2-D image forming means 6 or input images as are, display means 3 for displaying an image stored in the frame memory 2 as a 3-D or 2-D image in accordance with the display mode information M1, time measuring/judging means 101 for measuring a display time of each 3-D image, and warning display controlling means 102 for instructing the 3-D image forming means 100 to display a warning message on the current displayed 3-D image. In this configuration, the frame memory 2, the display means 3, the 2-D image forming means 6, the switch controlling means 10, the switches 11 to 14 are all the same as those of the 3-D image display unit in the first embodiment, so that the same numerals/characters as those in the first embodiment will be used in FIG. 14.

Similarly to the first embodiment, at first the display mode information M1 is inputted to the switch controlling means 10 from external. The display mode information M1 is the same as that in the first embodiment. And, the operations of the display unit in the input image through display mode and in the 2-D image display mode using the left-eye or right-eye image are also the same as those in the first embodiment.

Next, the operation of the display unit, when the 3-D image display mode is set in the display mode information M1, will be described.

At first, the left-eye image data L and the right-eye image data R are inputted from external to the 3-D image forming means 100 respectively as input images A1 and A2.

In the case where the 3-D image display mode is set in the display mode information M1, the switch controlling means 10 turns on the switches 11 and 12 and controls the switch 14 so that the 3-D image forming means 100 is connected to the frame memory 2. Then, the left-eye image data L and the right-eye image data R are inputted to the 3-D image forming means 100 through the switches 11 and 12 from external respectively. After that, the 3-D image forming means 100 forms 3-D image data, then writes the formed image data into the frame memory 2. Finally, the 3-D image data is inputted to the display means 3 from the frame memory 2. The display means 3 thus displays the inputted 3-D image data as a 3-D image on its screen.

Figure 15:
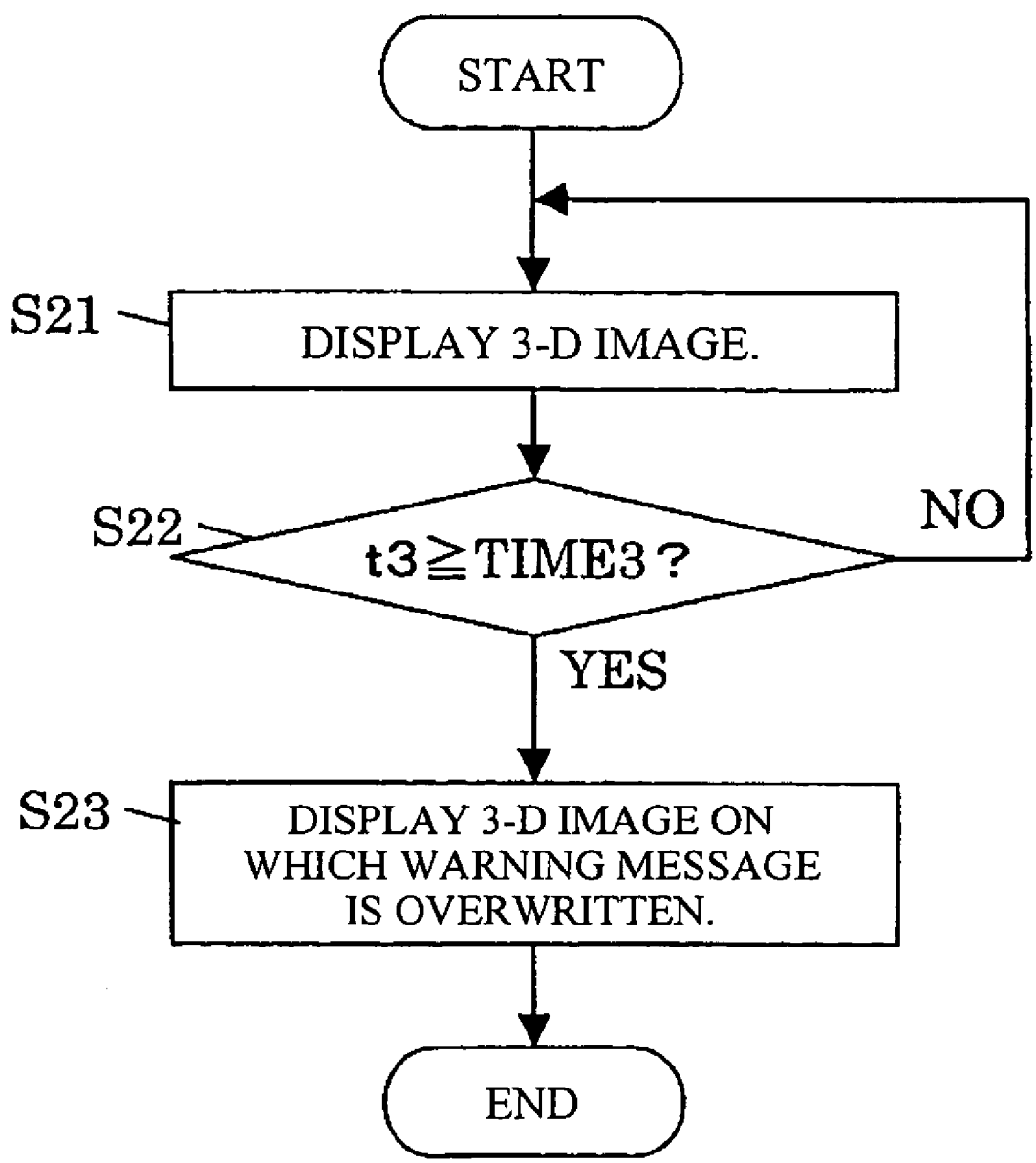
FIG. 15 is a flowchart of the processings to display a 3-D image with use of the 3-D image display unit in the second embodiment of the present invention.

Here, the operation of the 3-D image display unit shown in FIG. 14 for displaying 3-D images will be described with reference to the flowchart shown in FIG. 15.

In the initial state, the 3-D image display unit displays 3-D images (S21). The time measuring/judging means 100 shown in FIG. 14 then measures the display time of the 3-D image during the displaying. And, while the 3-D image is displayed, the 3-D image forming means 100 sends a 3-D image display notification signal to the time measuring/judging means 101. Receiving the signal, the time measuring/judging means 101 starts measuring the time t3. In that connection, the time measuring/judging means 101 starts the time measurement when the 3-D image display begins.

The time measuring/judging means 101 judges whether or not the measured time t3 is over a predetermined time TIME3 (S22). In the case where the judgment result is NO (not over), control returns to step 21 in which the time measuring/judging means 101 continues the 3-D image display. In the case where the judgment result is YES (over), the warning display controlling means 102 instructs the 3-D image forming means 100 to write a warning message on the displayed 3-D image as a 3-D image. Receiving the instruction signal, the 3-D image forming means 100 forms the message 3-D image so that the warning message is overwritten on the displayed 3-D image, then outputs the formed image (S23). The warning message is thus displayed on the forefront of the 3-D image (as if the message were seen at the foremost from the user).

At that time, the 3-D image of the warning message may be formed by overwriting the message to which a parallax is given on the currently displayed 3-D image, then combining those two images so that, for example, the 3-D warning message may be displayed at a limit depth from the screen where the user can recognize the 3-D message with difficulty. The parallax given at that time is defined as a 3-D image display limit one.

Instead of each 3-D image in the above examples, only a left-eye (right-eye) image may be used to form a 2-D image, then a parallax is given to the warning message so that only the warning message is displayed as a 3-D image. After that, the message is overwritten on and combined with the 2-D image into a 3-D image. Otherwise, instead of each 3-D image in the above examples, a predetermined image may be used to form a 2-D image, then a parallax is given to the warning message. After that, the message is overwritten on and combined with the 2-D image into a 3-D image. For example, it is possible to form a black screen, then overwrite the warning message on the screen.

Furthermore, it is also possible to use both left-eye and right-eye images of the current displayed 3-D image to find a parallax vector in each block divided by the predetermined number of pixels. Then, among the obtained vector values, the vector value at which the message has the maximum depth from the screen is determined as the maximum parallax and a parallax larger than this maximum value is given to the warning message. At that time, the parallax to be given should not be over the 3-D image display limit parallax. The parallax vector can also be obtained by block matching or the like. The maximum parallax may also be found from data other than the parallax vector for each block, for example, from such a parallax vector for each pixel.

Next, a description will be made for the signals to be exchanged among the 3-D image forming means 100, the time measuring/judging means 101, and the warning display controlling means 102 with reference to Table 5.

TABLE 5

| Status | Signal Name | | |
|---|---|---|---|
| | Signals output to time measuring/judging means 101 from 3-D image forming means 100 | Signals output to warning display controlling means 102 from time measuring/judging means 101 | Signals output to 3-D image forming means 100 from warning display controlling means 102 |
| [2-1] | 3-D image display notification signal | None | None |
| [2-2] | | Time measurement end signal T3 for notifying that TIME3 is reached | Signal for instructing displaying of a warning message on the 3-D image being formed currently |

The state [2-1] denotes that the time measuring/judging means 101 has started measurement of a 3-D image display time. In this state, the 3-D image forming means 100 outputs a 3-D image display notification signal to the time measuring/judging means 101. The signal denotes that the 3-D image display unit is displaying a 3-D image.

The state [2-2] denotes that the measurement time of the time measuring/judging means 101 has reached a predetermined time TIME3 and the time measuring/judging means 101 outputs a time measurement end signal T3 for denoting that the TIME3 is reached to the warning display controlling means 102 while the warning display controlling means 102 outputs a signal for instructing the 3-D image forming means 100 to display a warning message on the currently displayed 3-D image. Consequently, the user can recognize the warning of the excessively long time observation, thereby the user is protected from eyestrain.

While the warning message itself is formed as a 3-D image and it is overwritten and displayed on the currently displayed 3-D image or on a 2-D image transformed from a 3-D image in the above example, the warning message itself may be a 2-D image. And, the warning message may be replaced with a buzzer sound, lamp, or indicator to be turned on for the warning. The warning message display may stop or display power may be turned off in a predetermined time.

The predetermined time TIME3 described above represents an allowable time for the user to be able to appreciate 3-D images continuously. This TIME3 may be stored in the memory provided in the 3-D image display unit as a preset value. The preset value of the TIME3 may not be just one; for example, the TIME3 may be preset as many as the number of combinations of parameters in the case where a parameter is set for each of elements related to the user's eyestrain at the time of appreciation, such as a screen size of input images, as well as a full reproduction time of video when the input image data is video data. The TIME3 may be changed freely by the user.

Just like the 3-D image display unit shown in FIG. 7, 3-D image decoding means for decoding the 3-D image format data F2 and separating means for separating the 3-D image decoded by the 3-D image decoding means into right-eye and left-eye image data may be disposed just before the 3-D image display unit shown in FIG. 14. In that connection, the 3-D image format data F2 may be configured by a 3-D image control information part and an image data part like the 3-D image format data F1 described in the first embodiment of the present invention. However, the value stored in the control information I2 provided in the 3-D image format data F2 is assumed to be equivalent to the above described time TIME3 and this value may be substituted for the time TIME3 used by the time measuring/judging means 101.

The operations of the 3-D image decoding means and the separating means in that case are the same as those in the first embodiment.

The data in the image date part of the 3-D image format data F2 described above may not be encoded. For example, the data may not be compressed. The 3-D image control information part may be inserted repetitively in the 3-D image format data F2 as part of, for example, the program arrangement information just like in the first embodiment of the present invention.

And, in the 3-D image format data F2, the 3-D image control information part may be inserted in the image data part just like in the first embodiment of the present invention. For example, in the case where the image data part is encoded with the MPEG-4, the 3-D image control information may be inserted in a predetermined place in the data encoded with the MPEG-4.

In the case where the 3-D image display unit includes receiving means for receiving the above broadcast data and recording means for the same. In the case where an external recording device is connected to the display unit and a predetermined time TIME3 is over while broadcast 3-D image data is received, the display means of the 3-D image display unit may display a warning message and starts recording, then keeps recording the subsequent broadcast contents.

As described above, the time measuring/judging means 101 starts a time measurement when 3-D image display begins in the first embodiment of the present invention. In this second embodiment, however, the time measuring/judging means 101 may start a display time measurement when the first data of the 3-D image control information part is received after receiving broadcast contents begins or the first program arrangement information is received in the case where data of the 3-D image control information part is included in the program arrangement information. In the case where time information required to reproduce a program is included in the first received program arrangement information, the time created by using the information may be used by the time measuring/judging means 101 to start a time measurement.

Although the 3-D image format data F2 is transmitted as broadcasting waves in the above first embodiment, any of a cable, such a network as the Internet, and another means may be used as the transmission path. Instead of the transmission, the 3-D image format data F2 may be recorded on such a recording medium as a hard disk, optical disk, or the like.

Such way, the 3-D image display unit enables the time TIME3 determined by the control information value in the 3-D image format data F2 to be substituted and used just like in the first embodiment and the TIME3 used by the time measuring/judging means 101 can be set according to each 3-D image conveniently.

Although the operation of the 3-D image display unit is described with respect to a case in which two input images are used in the above first embodiment, three or more input images may be used in this second embodiment to obtain the same effect as that of the first embodiment.

The image data part of the 3-D image format data F2 may be configured by images of n (n: equal or greater than 1) viewpoints. In that case, the 3-D image decoding means 500 and the separating means 504 may be expanded similarly to the method of the first embodiment.

Next, the third embodiment of the present invention will be described.

Figure 16:
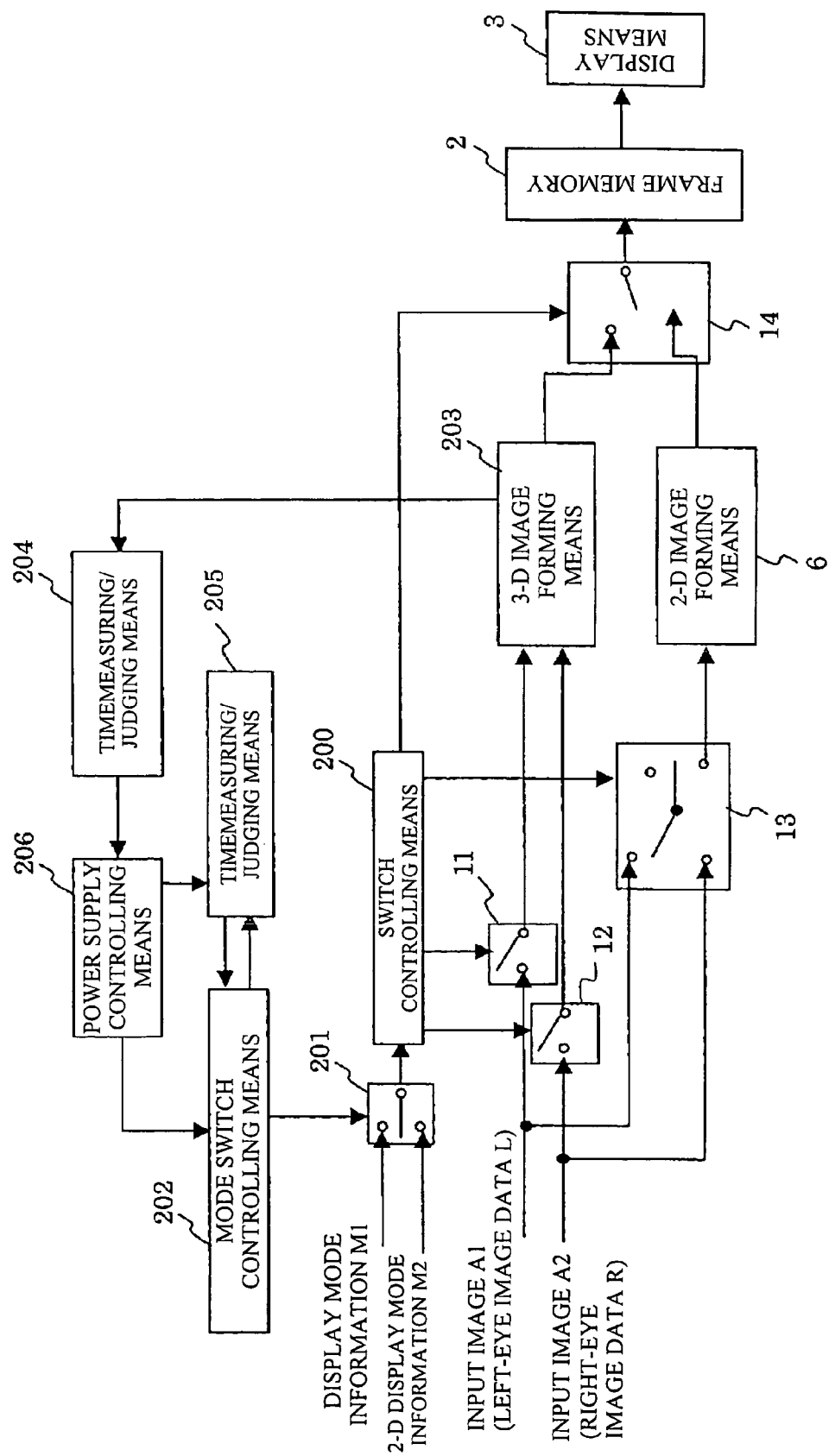
FIG. 16 is a block diagram of a 3-D image display unit in the third embodiment of the present invention.

FIG. 16 shows a block diagram of a 3-D image display unit in the third embodiment of the present invention.

The 3-D image display unit in the third embodiment of the present invention comprises a switch 201 for selecting one of the display mode information M1 denoting whether to enable 3-D or 2-D image display and the 3-D image display mode information M2 denoting that only 2-D images are displayed so as to be transferred to an input of switch controlling means 200, mode switch controlling means 202 provided with a memory for storing a 3-D image display inhibition flag used to turn on/off the switch 201, 3-D image forming means 203 for forming a 3-D image from both right-eye and left-eye image data, 2-D image forming means 6 for forming a 2-D image from any one of the right-eye and left-eye image data, switches 11 to 14 for switching among input/output image data, switch controlling means 200 for controlling those switches 11 to 14, a frame memory 2 for storing images formed by the switch controlling means 200 or 2-D image forming means 6, display means 3 for displaying 3-D images using the image data stored in the frame memory 2, time measuring/judging means 204 for measuring the display time of each 3-D image, power controlling means 206 for turning off all the power supplies except for that of the second time measuring/judging means 205 forcibly in the case where a 3-D image display time exceeds a predetermined time, and time measuring/judging means 205 for measuring a time elapsed after the power supplies are turned off forcibly. The frame memory 2, the display means 3, the 2-D image forming means 6, and the switches 11 to 14 are all the same as those in the first and second embodiments described above. The same numbers/characters as those in those embodiments will thus be used for those in FIG. 16.

The display mode information M1 is the same as that described in the first embodiment. The 2-D display mode information M2 will be described later.

Similarly to the first and second embodiments, at first, the display mode information M1 is inputted to the switch controlling means 200 from external. In the case where the input image through display mode is set in the display mode information M1 and in the case where 2-D image display is made using one of the left-eye and right-eye images, the operations of the display unit image are the same as those of the display unit in the first embodiment.

Next, a description will be made for a case in which the 3-D image display mode is set in the display mode information M1. At first, the display mode information M1 and the 2-D display mode information M2 are inputted to the switch 201 from external. The switch 201 transfers any one of the M1 and M2 to the input of the switch controlling means 200. The switch 201 is turned on/off by the mode switch controlling means.

The mode switch controlling means 202 has an internal memory that stores the 3-D display inhibition flag. The mode switch controlling means 202 controls the switch 201. For example, the mode switch controlling means 202 controls the switch 201 so that the display mode information M1 is inputted to the switch controlling means in the case where 0 is set in the 3-D display inhibition flag and the display mode information M2 is inputted to the switch controlling means 200 in the case where 1 is set in the flag. In the case where 0 is set as the initial value in the 3-D display inhibition flag, the switch 201 is connected to the display mode information M1 when the operation begins.

Next, the 2-D display mode information M2 will be described. The information M2, as shown in Table 6, is configured by only two items; the left-eye 2-D image display mode and the right-eye 2-D image display mode as described above with respect to the display mode information M1.

TABLE 6

| 2-D Display Mode Information M2 | Mode Name | Display Image |
|---|---|---|
| 1 | Left-eye 2-D image display mode | 2-D images formed with left-eye 2-D images included in 3-D images |
| 2 | Right-eye 2-D image display mode | 2-D images formed with right-eye 2-D images included in 3-D images |

Figure 17:
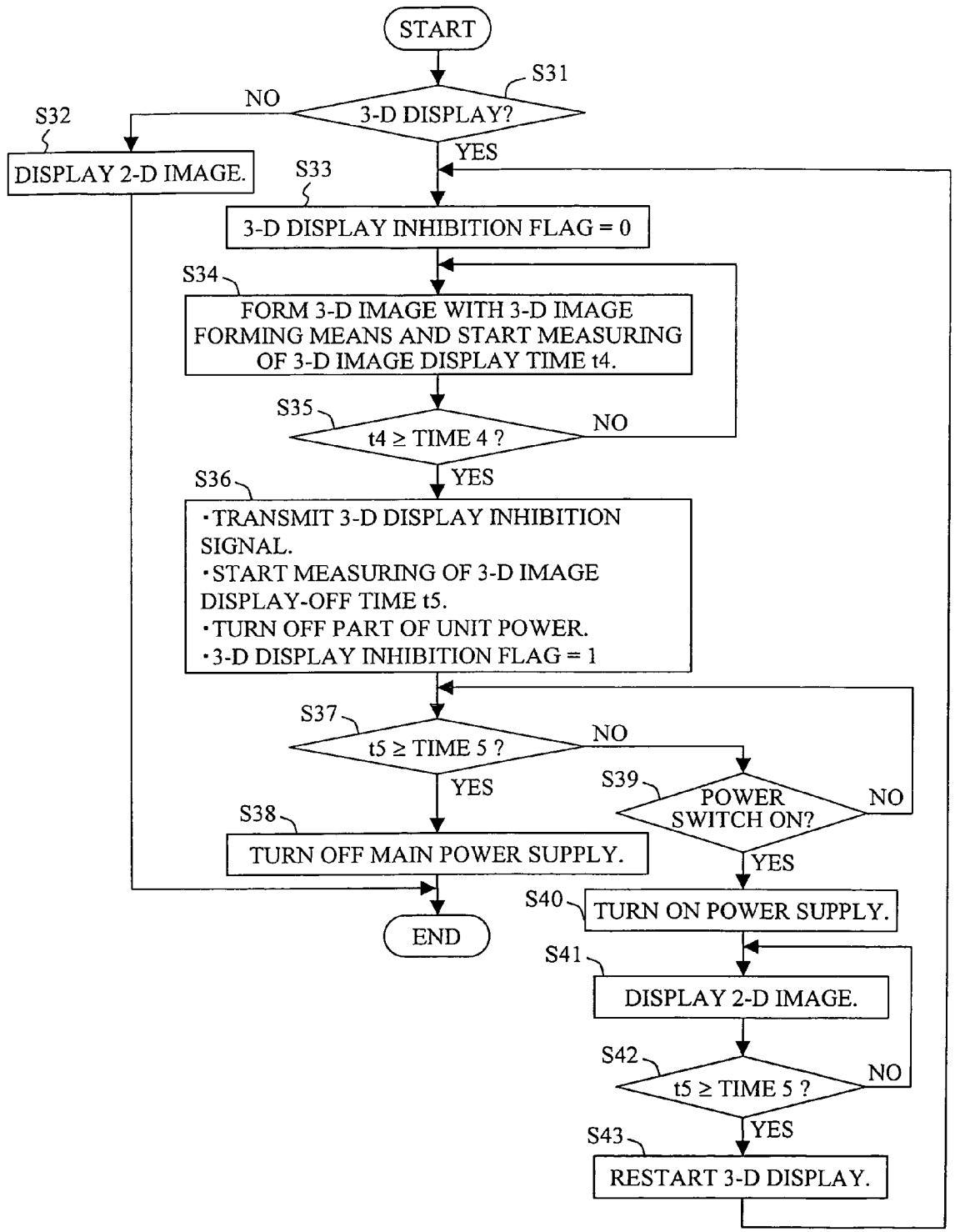
FIG. 17 is a flowchart of the operations of the 3-D image display unit in the third embodiment of the present invention.

FIG. 17 shows a flowchart of the operation of the 3-D image display unit just after 3-D image display begins in the third embodiment of the present invention. Hereinafter, the operation of the display unit in each display mode will be described in detail with reference to FIGS. 16 and 17.

The display unit, when it is powered and ends an initial processing, judges whether to display a 3-D image. This judgment is made according to the value set in the display mode information M1. In the case where a 2-D image display mode is set in the display mode information M1, control goes to step 32 in which the display unit displays a 2-D image according to the value set in the display mode information M1.

In the case where a 3-D image display mode is set in the display mode information M1, control goes from step 31 to step 33 in which 0 is set in the 3-D display inhibition flag stored in the memory provided in the mode switch controlling means 202, then control goes to step 34. In step 34, the 3-D image forming means 203 forms an object 3-D image and the time measuring/judging means 204 measures the display time t4 of the 3-D image. In that connection, the time measuring/judging means 204 starts a measurement when the 3-D image display begins.

The display mode information M1 is inputted to the switch controlling means 200. In the case where a 3-D image display mode is set in the information M1, the switch controlling means 200 turns on the switches 11 and 12 and turns off the switch 13, then controls the switch 14 so that the 3-D image forming means 203 is connected to the frame memory 2. The switches 11 and 13 receive left-eye image data L while the switches 12 and 13 receive right-eye image data R from external respectively. Then, the left-eye image data L and the right-eye image data R are inputted to the 3-D image forming means 203 through the switches 11 and 12 respectively. The 3-D image forming means 203 forms 3-D image data just like in the first embodiment, then the 3-D image data is written in the frame memory 2 through the switch 14. The formed 3-D image data is inputted to the display means 3 from the frame memory 2 and displayed on the screen. While the 3-D image is displayed, the 3-D image forming means 203 sends a 3-D image display notification signal to the time measuring/judging means 204 and the time measuring/judging means 204 measures the 3-D image display time while the 3-D image display notification signal is inputted thereto.

After that, control goes to step 35. The display time t4 measured by the time measuring/judging means 204 is inputted to the power supply controlling means 206. In step 35, the power supply controlling means 206 judges whether or not the measurement time t4 inputted from the time measuring/judging means 204 is over a predetermined time TIME4. In the case where the judgment result is NO (not over), control returns to step 34 in which the 3-D image forming means 203 and the display means 3 are instructed to form a 3-D image and display the formed 3-D image respectively. In the case where the judgment result is YES (over), control goes to step 36.

In step 36, the display unit instructs the following operations. At first, the display unit instructs the power controlling means 206 to send a 3-D display inhibition signal that inhibits displaying 3-D images to the mode switch controlling means 202, then sends a measurement start signal to the second time measuring/judging means 205 to instruct the means 205 to reset the measurement time to 0 and start a measurement. Then, the display unit turns off some of the power supplies therein. For example, the display unit turns off all the power supplies forcibly except for those of the mode switch controlling means 202 and the second time measuring/judging means 205. The mode switch controlling means 202, when receiving the 3-D display inhibition signal, sets 1 in the 3-D display inhibition flag stored in the memory provided in the mode switch controlling means 202 and stores the flag value "1" in the memory.

Here, a description will be made for the signals to be exchanged among the 3-D image forming means 203, the time measuring/judging means 204, the power supply controlling means 206, the second time measuring/judging means 205, and the mode switch controlling means 202 with reference to Table 7.

TABLE 7

| State | Signals output to time measuring/judging means from 3-D image forming means | Signals output to power supply controlling means from time measuring/judging means | Signals output to time measuring/judging means from power supply controlling means | Signals output to mode switch controlling means from power supply controlling means |
|---|---|---|---|---|
| [5-1] | 3-D image display notification signal | None | None | None |
| [5-2] | | Time measurement end signal T4 for notifying that TIME4 is reached | Measurement start signal | 3-D display inhibition signal |

The state [5-1] denotes that the time measuring/judging means 204 has started measurement of a 3-D image display time. In this state, a 3-D image display notification signal for denoting that the display unit is displaying a 3-D image is output to the time measuring/judging means 204 from the 3-D image forming means 203.

The state [5-2] denotes that the measurement time of the time measuring/judging means 204 has reached the predetermined time TIME4. In this state, the time measuring/judging means 204 outputs a time measurement end signal T4 for denoting that the TIME4 is reached to the power supply controlling means 206 and accordingly, the power supply controlling means 206 outputs a measurement start signal for resetting the measurement time to 0 and starting a measurement to the second time measuring/judging means 205 and a 3-D display inhibition signal to the mode switch controlling means 202 respectively.

Receiving the measurement start signal, the second time measuring/judging means 205 starts measurement of the time T5 (3-D image display off-time) after the 3-D display stops.

After that, control goes to step 37. In step 37, the display unit judges whether or not the time t5 measured by the second time measuring/judging means 205 is over a predetermined time TIME5. In the case where the judgment result is YES (over), the mode switch controlling means 202 sets 0 in the 3-D display inhibition flag and stores the flag value in the memory, then sends a measurement stop signal to the second time measuring/judging means 205 and turns off the power to the mode switch controlling means 202. Receiving the measurement stop signal, the second time measuring/judging means 205 resets the measured time t5, thereby the power to the second time measuring/judging means 205 is turned off.

Table 8 shows the signals exchanged between the second time measuring/judging means 205 and the mode switch controlling means 202.

TABLE 8

| State | Signals output to mode switch controlling means from time measuring/judging means | Signals output to time measuring/judging means from mode switch controlling means |
|---|---|---|
| [6-1] | Time measurement end signal T6 for denoting that TIME5 is reached | Measurement stop signal |

The state [6-1] denotes that the time t5 measured by the second time measuring/judging means 205 has reached a predetermined time TIME5. In this state, the second time measuring/judging means 205 outputs a time measurement end signal T5 for denoting that the TIME5 is reached to the mode switch controlling means 202 and the mode switch controlling means 202 outputs a measurement stop signal to the second time measuring/judging means 205.

In the case where some of the unit power supplies are not turned on even when a predetermined time TIME5 is reached after those power supplies are turned off (in the case where the operation for restarting the image display is not done), control goes to step 38 in which the mode switch controlling means 202 sets 0 in the 3-D display inhibition flag and stores the flag value in the memory, then turns off all the power supplies to end the operation.

In the case where the judgment result is NO (not over) in step 37, control goes to step 39. In step 39, the display unit judges whether or not any operation is performed to display an image, that is, whether or not any unit power switch is pressed. If the judgment result is NO (not pressed), control goes back to step 37 in which the display unit continues measuring the time t5. In the case where the judgment result is YES (pressed), control goes to step 40 in which all the display unit power supplies are turned on. After that, control goes to step 41 in which the display unit inhibits 3-D image display, then displays a 2-D image as follows.

For example, in FIG. 16, the display mode information M1 and the 2-D display mode information M2 are inputted to the switch 201 from external. The mode switch controlling means 202 then refers to the 3-D display inhibition flag stored in the memory and finds the flag value to be 1. The mode switch controlling means 202 thus controls the switch 201 so that the 2-D display mode information M2 is inputted to the switch controlling means 200. The switch 201 is connected to the M2 side, so that the information M2 is inputted to the switch controlling means through the switch 201.

In the case where the left-eye 2-D image display mode is set in the information M2, the switch controlling means 200 turns off the switches 11 and 12 and turns on/off the switch 13 so that the left-eye image data L is inputted to the 2-D image forming means 6 and controls the switch 14 so that the 2-D image forming means 6 is connected to the frame memory 2. The 2-D image forming means 6 thus forms a left-eye 2-D image and writes the formed image in the frame memory 2 through the switch 14. The 2-D image is then inputted to the display means 3 from the frame memory 2. The display means 2 thus displays the image data as a 2-D image. The 2-D image is formed at that time just like when the left-eye 2-D image display mode is set in the information M2 as described in the first and second embodiments of the present invention. Therefore, each 2-D image is formed and displayed in accordance with the 2-D display mode information M2 as described above.

Even while a 2-D image is displayed such way, the second time measuring/judging means 205 continues measuring of the time t5 and the measured time t5 is inputted to the mode switch controlling means 202 just like the above 3-D image display case. In step 42, the display unit judges whether or not the measured time t5 reaches a predetermined time TIME5. If not, the display unit continues displaying of the 2-D images until the time t5 reaches the predetermined time TIME5. When the measured time t5 reaches the TIME5, control goes to step 43 in which the mode switch controlling means 202 restarts the 3-D display, for example, to send a measurement stop signal to the second time measuring/judging means 205. The second time measuring/judging means 205, when receiving the measurement stop signal, resets the measurement time and stops the time measurement. After that, control goes back to step 33 in which the mode switch controlling means 202 resets the 3-D display inhibition flag to 0 and stores the flag value in the memory. Hereinafter, because 0 is set in the 3-D display inhibition flag, the display unit displays 3-D images on the screen in accordance with the display mode information M1.

At that time, a 3-D image display enabling message may be displayed on the screen in the case where a 3-D display enable signal for enabling 3-D image display is inputted to the mode switch controlling means 202.

In the case where 3-D images are displayed continuously for a long time as described above, it is possible to turn off the power forcibly and inhibit the 3-D image display even when the user makes an attempt to turn on the power supply until a predetermined time TIME5 is reached, thereby the user is protected from eyestrain. In the case where the power to the 3-D image display unit is turned off, then the power is turned on again before the predetermined time TIME5 is reached, the display unit can continue displaying 2-D images that requires less burden on the eyes of the user continuously.

When the display time t4 of the 3-D image reaches the predetermined time TIME4, only the power supply of the display means 3 may be turned off. After such a power-off operation, the power supply of the display means 3 may be turned on again by pressing the button. For example, the power button may be pressed to power the display means 3.

The predetermined time TIME4 described above represents a continuous appreciation time in which the user can appreciate the object images as 3-D images. Each of the times TIME4 and TIME5 may be stored as a predetermined value in the memory provided in the 3-D image display unit. The predetermined value of the TIME4/TIME5 may not be just one. For example, elements related to appreciation time eyestrain, such as an input image screen size, as well as a full reproduction time in the case where object input image data is video data may be used as parameters and the TIME4/TIME5 may have a plurality of values according to the number of combinations of those parameters. The user may be enabled to change the values of the TIME4/TIME5.

Just like the configuration shown in FIG. 7, 3-D image decoding means for decoding the 3-D image format data F3 and separating means for separating the 3-D image data decoded by the 3-D image decoding means into right-eye and left-eye image data may be disposed just before the 3-D image display unit shown in FIG. 16. In that connection, the 3-D image format data F3 is configured by a 3-D image control information part and an image data part just like the F1 and F2 described in the first and second embodiments. The values stored in the control information I2 set in the 3-D image format data F3 are equivalent to the above-described TIME4 and TIME5 values. The 3-D image display unit may obtain those values from the F3 for use.

The control information I2 in the 3-D image format data F3 may have any one of the TIME4 and TIME5 and a preset value in the control information I2 may be used for any data that is not stored in the control information I2.

The operations of the 3-D image decoding means and the separating means are the same as those in the first and second embodiments. The data in the image data part of the 3-D image format data F4 described above may not be encoded; for example, the data may not be compressed.

The 3-D image control information part of the 3-D image format data F3 described above may be inserted repetitively in the F3 as part of, for example, the program arrangement information similarly to any of those described in the first and second embodiments of the present invention.

In the 3-D image format data F3, the 3-D image control information part may be inserted in the image data part similarly to any of those described in the first and second embodiments of the present invention. For example, in the case where data encoded with the MPEG-4 is set in the image data part, the 3-D image control information part may be inserted in a predetermined place specified in the data encoded with the MPEG-4.

As described above, the time measuring/judging means 204 starts a measurement when a 3-D image display begins. In the case of broadcasting, however, the time measuring/judging means 204 may start a display time measurement when the first data of the 3-D image control information part is received after receiving broadcast contents begins or when the first program arrangement information is received in the case where any data of the 3-D image control information part is included in the program arrangement information just like in the first and second embodiments of the present invention. In the case where time information required to reproduce a program is included in the first received program arrangement information, a time generated using the information may be used to start any measurement to be performed by the time measuring/judging means 204.

Although the 3-D image format data F3 is broadcast in the above description, the format data may be transmitted through a cable or such a network as the Internet. Instead of the transmission, the information may be recorded on a recording medium such as a hard disk, optical disk, or the like.

As described above, the 3-D image display unit can obtain TIME4 and TIME5 values from the values set in the control information of the 3-D image format data F3 used just like in the first and second embodiments of the present invention. The TIME4/TIME5 can thus be set conveniently according to each data to be displayed as a 3-D image. And, as described above, in the case where 3-D images are displayed continuously for a long time, thereby the power to the 3-D image display unit is turned off forcibly, then the display unit is powered again by the user, the 3-D image display unit may be enabled to resume the displaying just before the forcible power-off. For example, in the case where the power to the display unit is turned off while a file is reproduced, the display unit can resume the displaying just before the power-off. In the case where the power to the display unit is turned off while the user is watching a program of a broadcasting channel, the user may resume the broadcasting of the same channel immediately after the forcible power-off.

In the case where the display unit is provided with receiving means for the above broadcasting and recording means or provided with the receiving means and connected to an external recording device and the user observes 3-D images continuously over the predetermined time TIME4, the display unit power may be turned off while receiving 3-D image broadcasting and begin recording immediately while both of the receiving means and the recording means may keep receiving and recording the broadcasting by keeping their power supplies turned on. Consequently, the 3-D images broadcast recorded while their power supplies are off can be reproduced later.

While the operation of the 3-D image display unit is described with respect to a case in which two input images are used, this embodiment may be expanded to cope with a case in which three input images are used with the same method as any of those described in the first and second embodiments of the present invention.

The image data part of the 3-D image format data F3 may include images of n (n≧1) viewpoints. In such a case, the 3-D image decoding means 500 and the separating means 504 may be expanded with the same method as any of those in the first and second embodiments of the present invention.

The 3-D image display unit in the first and second embodiments of the present invention described above is provided with means for storing passwords and a password input part for inputting the passwords and requests a password input each time the display unit is used by the user. In that connection, the display unit may distinguish the user for each password and manage the 3-D image display time for each user.

Because each user is distinguished for his/her password and the 3-D image display time is managed for each user such way, each user can use the 3-D image display unit regardless of the conditions under which other observes have used the display unit. In other words, because the display unit requests each user for his/her password to use the display unit and distinguishes each user to manage the 3-D image display time such way, even after an user uses the display unit in a 3-D image display mode for a long time, thereby the power supply is turned off forcibly, another user can use the display unit in the 3-D image display mode.

This third embodiment of the present invention can also apply to any multiple-eye type display unit with respect to the shifting to any of 3-D image display, warning display, and 2-D image display by adjusting the parallax according to the present invention, as well as the use of each user's password.

Next, the fourth embodiment of the present invention will be described.

As described in the first embodiment, each 3-D image has a parallax and the user senses each image as a 3-D one due to this parallax. Although the parallax differs among pixels of each 3-D image, a 3-D image having many pixels having large parallaxes is seen as a clearer 3-D image and a 3-D image having less pixels having large parallaxes is not seen so clearly as a 3-D image. An index that denotes such a scale of the sense of solidity is referred to as "3-D effect intensity". This fourth embodiment handles how to limit the 3-D image display method when a plurality of 3-D images have different 3-D effect intensity values.

The 3-D effect intensity may be determined objectively by the average value of parallax values of pixels (an average value of those values of a full screen for a still image and average value of those values of a full video image) or may be determined through a subjective evaluation. The 3-D effect intensity may also be determined by a weighted average of the both. As an objective evaluation, any of a weighted average value, a median, a maximum value, etc. may be used instead of the average value. In case of video, the maximum value is obtained from each frame and any of an average value of the maximum values in all the frames, a median value, a maximum value, etc. may be used as an objective evaluation value.

Generally, when observing 3-D images having large 3-D effect intensity values, the user comes to have eyestrain earlier than when observing 3-D images having small 3-D effect intensity values, so that the allowable 3-D image display time should be varied according to the 3-D effect intensity.

Figure 19:
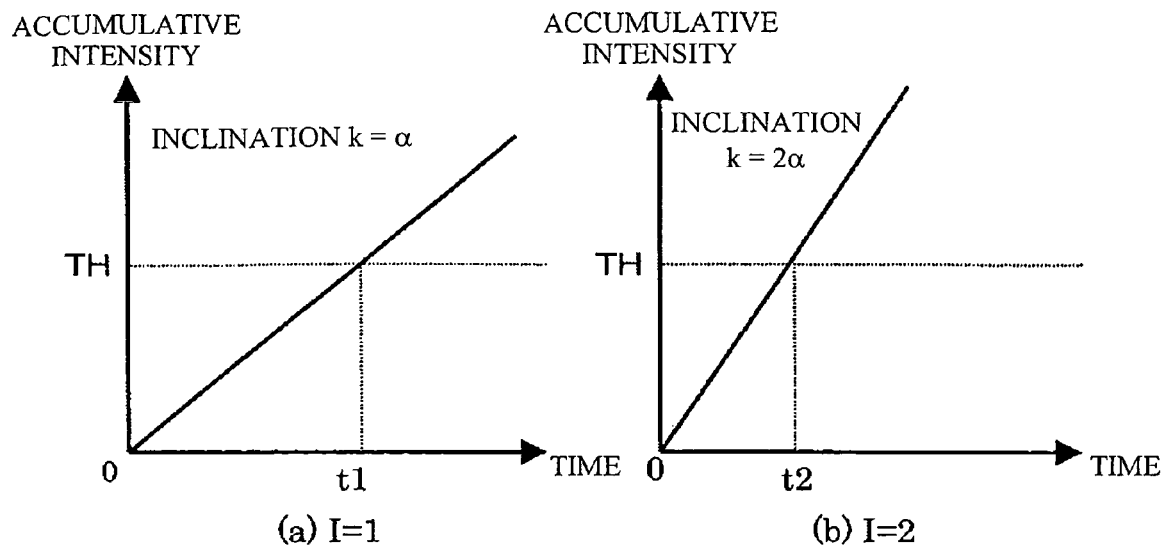
FIG. 19 is an example of a relationship between the 3-D effect intensity and the 3-D display allowable time.

FIG. 19 shows a relationship between the 3-D effect intensity (I) and the 3-D image display allowable time. FIG. 19A shows a case of I=1, in which the "accumulative intensity" (vertical axis) that increases at a certain rate (k=α) together with a 3-D image display time (horizontal axis) is assumed to be calculated. The accumulative intensity value is 0 at time 0 and TH at time t1. The TH denotes a predetermined threshold value and the 3-D image display unit of the present invention comes to perform the following processings at time (t1) when the accumulative intensity reaches the TH.

(1) Changes over the display mode from 3-D image display to 2-D image display.

(2) Continues the 3-D image display by reducing the parallax.

(3) Displays a warning message on the screen.

When employing the method (1), the t1 denotes an allowable time (3-D image display time) of continuing the current 3-D image display. The message in (3) denotes that the subject 3-D image display time is over the allowable time and prompting the user to go to the 2-D image display. Those processings may be replaced with any one of the processings or some of those processings may be combined. For example, (1) and (2) may be combined and when the current display mode is changed over to a 2-D image display, the change-over message is displayed on the screen.

FIG. 19B shows a case of I=2, in which the accumulative intensity is calculated just like in the above case while a certain rate k is assumed to be double (k=2α) of that in FIG. 19A. Consequently, the time (t2) at which the accumulative intensity reaches the threshold value becomes a half of t1. In the case where the method (1) is employed, the 3-D image display allowable time becomes a half of that shown in FIG. 19A.

Generally, the accumulative intensity (AI) is represented as follows using both 3-D effect intensity I and 3-D image display time t.

$$AI=f(I,t)$$

Here, the f(I, t) is assumed to be a function of I and t. In FIG. 19, f(I, t)=k(I)·t is satisfied. However, k(I) is a function of I and in FIG. 19, k(I)=α·I (α: an integer) is assumed.

Other functions may be used for f and k as follows; for example, a primary function, secondary or over function, or any other function may be used. The constants m, α, β are determined by tests. In the case where the a is true, the k(I) in the above expression becomes a monotone increasing function of I. In the case where the k(I) is positive, the f(I,t) in the above expression becomes a monotone increasing function of t.

In the case where the accumulative intensity increases together with a time as shown in FIG. 19, the 3-D image display unit of the present invention adds up a certain amount (s·I) to the accumulative intensity at each certain time interval. The "s" denotes a predetermined constant and the relationship between "s" and α becomes as follows.

$$\alpha=(s/d)$$

Figure 20:
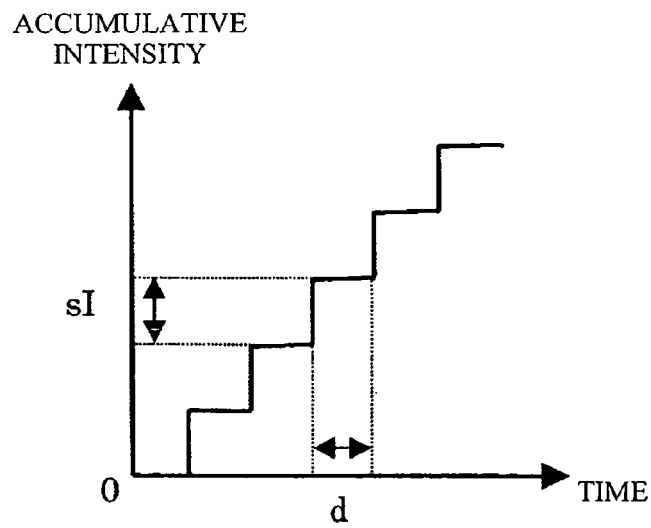
FIG. 20 is an example of a relationship between the accumulative intensity and the time.

FIG. 20 shows a relationship between the accumulative intensity and the time in such a case. For example, in the case where the time is represented by seconds and the 3-D effect intensity I increases just by 3 every second with respect to a 3-D image having a 3-D effect intensity I=1, d=1 and s=3 are assumed.

Each time the accumulative intensity increases just by a value of s·I, the accumulative intensity is compared with the threshold value TH in the 3-D image display unit of the present invention. In the case where the accumulative intensity is smaller than TH, the current 3-D image display is continued. In the case where the accumulative intensity is over TH, any of the processings (1) to (3) is performed.

In other words, the display mode of the 3-D image display unit can be changed over according to the relationship in size between the threshold value and the accumulative intensity. For example, assume now that the threshold value to be inputted to the 3-D image display unit is changed from TH0 to TH1 at the time t1. In the case where TH1=0 is assumed, the display mode of the 3-D image display unit can be changed to any of the (1) to (3) described above at t1 regardless of the accumulative intensity value.

As shown in FIG. 8, the 3-D image format data of 3-D image contents is configured by a 3-D image control information part that includes both 3-D image identification information I1 and control information I2, as well as an image data part configured by encoded data D. The control information I2 includes information of 3-D_intensity, 3-D_threshold, display_mode, and 2-D_picture_select. The display mode mentioned here means information for denoting a display mode in which the 3-D image display unit displays image data when the accumulative intensity exceeds the threshold value. For example, there are the modes described in (1) to (3) described above.

For example, in the case where the accumulative intensity is under the threshold value (TH>0), the current display mode is kept as is. In the case where the accumulative intensity is over the threshold value (TH≧0), the current display mode is switched to another. At TH>0, none of the 3-D image data creator, the image data provider, etc. can control the time at which the accumulative intensity exceeds the threshold value. In the case where the threshold value TH is 0, however, the accumulative intensity always exceeds the threshold value when the display unit receives the threshold value 0. Any of the 3-D image data creator, the image data provider, etc. can thus control the display mode of the 3-D image display unit in such a case. In other words, a proper display mode can be selected from the following modes.

(1) Switches the current display mode from 3-D display mode to 2-D display mode.

(2) Reduces the parallax to ease the eyestrain of the user while keeping the current 3-D image display.

(3) Displays a warning message such as "Stop the 3-D image display quickly to protect you from eyestrain." on the screen.

The 3-D image data creator, image data provider, or the like can specify any of the modes (1) to (3) in the 3-D image control information part for the 3-D image display unit. For example, in the case where (1) is specified beforehand, the mode is switched to a 2-D image display mode when the display unit receives the threshold value TH=0.

In the case where no display mode is specified in the 3-D image control information part or a user's request is inputted to the unit, the display unit uses the preset display mode or display mode specified by the user to display object image data.

In the case where a 2-D display mode is selected at that time and the 2-D display image selection information denotes right-eye image data, the right-eye image data is used to display the object 2-D image. In the case where the selection information denotes left-eye image data, the left-eye image data is used to display the 2-D image.

As described in the first embodiment of the present invention, the 3-D image control information part may be inserted repetitively at any place in the 3-D image format data, so that the 3-D image data creator, image data provider, or the like can reset the threshold value TH to 0 (to change over the display mode) at any position in the 3-D image format data.

For example, FIG. 9 shows an example of receiving broadcast waves of 3-D image contents. In broadcast contents configured by a plurality of pieces of program arrangement information and a plurality of 3-D image contents, the program arrangement information includes the 3-D image control information part (control information I2) and the threshold value TH can be inserted in the format data each time program arrangement information is inserted therein. The threshold value TH can thus be reset to 0 at that timing. For example, in the case where the display mode is (1), the 3-D image display unit can switch the display mode to a 2-D display one.

And, as described in the first embodiment of the present invention, the 3-D image control information part may be inserted in the image data part shown in FIG. 8. In that case, the display mode of the 3-D image display unit can be changed over for each frame.

The 3-D image control information can also be inserted not only in broadcast waves, but also in 3-D image contents exchanged through a cable, such a network as the Internet, or the like, as well as in the 3-D image contents recorded on a hard disk, optical disk, or the like.

Figure 21:
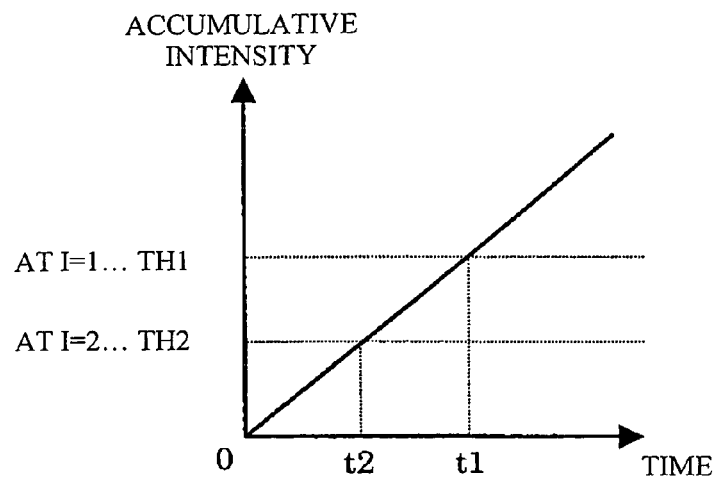
FIG. 21 is another example of the relationship between the display time and the accumulative intensity.

FIG. 21 shows another example of the relationship among the 3-D effect intensity, the accumulative intensity, and the 3-D display allowable time. In this example, it is premised that the increment rate of the accumulative intensity is the same between when the 3-D effect intensity I is 1 and when it is 2 while the threshold value TH differs between those cases. In other words, TH=1 is used at I=1 and TH2 (a half of the TH1) is used at I=2. Consequently, in case of I=1, the accumulative intensity I reaches the threshold value TH at t1. In case of I=2, the accumulative intensity reaches the threshold value TH at t2, which is a half of the t1. When the accumulative intensity reaches the threshold value TH, the 3-D image display unit performs any one of the processings (1) to (3).

The present invention can thus achieve the object of this embodiment even when different threshold values are used for different 3-D effect intensity values.

Next, a description will be made for how to limit 3-D display in the case where a plurality of 3-D images having different 3-D effect intensity values are displayed continuously.

Figure 22:
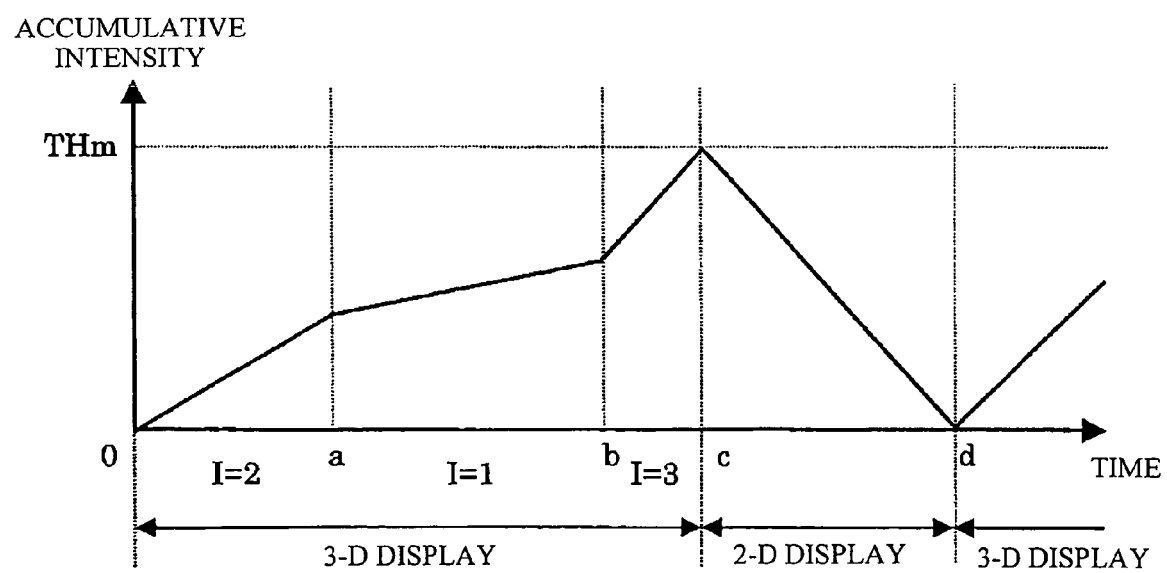
FIG. 22 is a first example of the relationship between the display time and the accumulative intensity.

FIG. 22 shows a relationship between the display time and the accumulative intensity. In this example, 3-D images having 3-D effect intensity I=1 respectively are displayed between time 0 and time a. Then, 3-D images having 3-D effect intensity I=3 respectively are displayed between time a and time b and 3-D images having 3-D effect intensity I=3 respectively are displayed at and after time b. In that connection, the accumulative intensity increases at an inclination k=2α between times 0 and a, increases at an inclination k=α at between times a and b, and increases at an inclination k=3α at and after time b. The THm denotes a threshold value and any one of the processings (1) to (3) described above may be performed at time c at which the accumulative intensity reaches the THm.

In the case where the processing (1) is selected, the 3-D image display unit switches the display mode to a 2-D display at time c. After that, although not described in detail here, in this embodiment, the display unit reduces the accumulative intensity at a certain rate at and after time c as shown in FIG. 22 and resumes the initial 3-D display when the accumulative intensity reaches 0.

Figure 23:
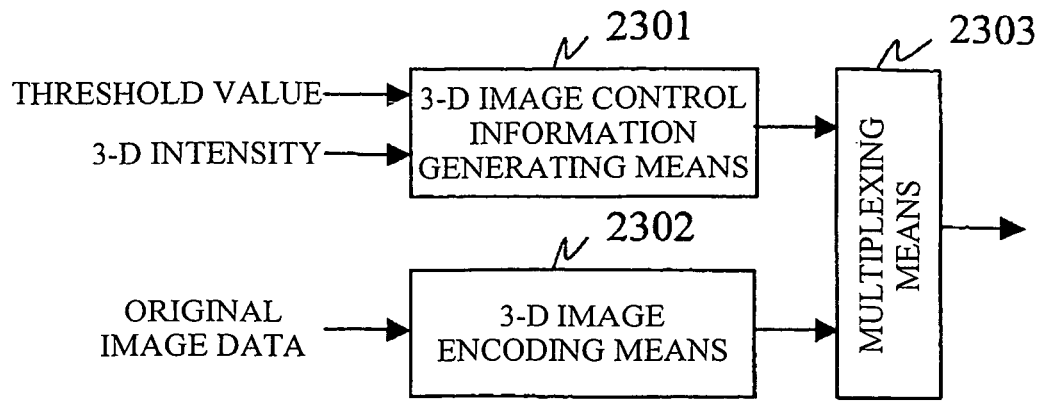
FIG. 23 is a block diagram of a 3-D image encoding device in the fourth embodiment of the present invention.

FIG. 23 shows a block diagram of the 3-D image display unit in this embodiment.

The 3-D image control information generating means 2301 generates a 3-D image control information part shown in FIG. 8 from both 3-D effect intensity and threshold value. For example, the 3-D effect intensity takes an integer within 1 to 4 and it is represented by a 2-bit variable "3-D_intensity". The threshold value takes a variable within 0 to 65535 and it is represented by a 16-bit variable "3-D_threshold". Those information items are premised to be encoded in a fixed or variable length. And, in the case where they are encoded into variables, the haffman encoding method, the arithmetic encoding method, or the like is premised to be used.

The 3-D image encoding means 2302 uses such a still encoding method as the JPEG or the like or such a video encoding method as the MPEG or the like to encode original image data. The original image data is assumed to be configured by right-eye image data and left-eye image data. The right-eye image data and the left-eye image data are thinned respectively, then combined to obtain object right and left image data. Those processings are performed as pre-processings here. In addition to the image compression by JPEG, MPEG, etc., as well as representation by bit maps and computer graphics are also included in the encoding processing mentioned here.

Multiplexing means 2303 obtains 3-D image format data by multiplexing both of the object encoded data and the 3-D image control information part. In that connection, the 3-D image control information is also inserted in the 3-D image format data. This insertion method is already described with reference to FIGS. 8 and 9, so that the details will be omitted here. The multiplexed 3-D image format data is stored in a recording medium or transmitted to a transmission medium.

Thus, the information denoting both 3-D effect intensity and threshold value of each 3-D image is stored or transmitted together with the encoded data of the 3-D image.

Figure 24:
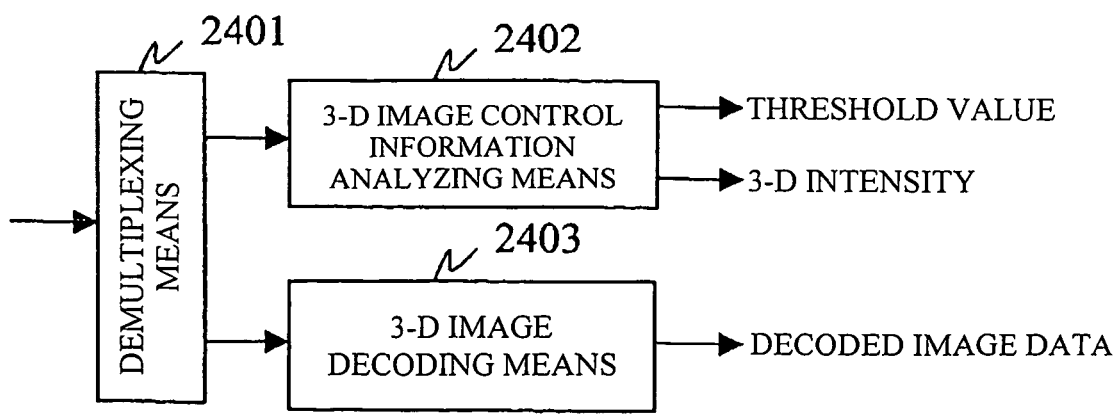
FIG. 24 is a block diagram of a 3-D image decoding device in the fourth embodiment of the present invention.

FIG. 24 shows a block diagram of the 3-D image display unit in this embodiment.

Demultiplexing means 2401 inputs 3-D image format data stored in a recording medium or sent to a transmission medium and separates the data into encoded data and the 3-D image control information part.

The 3-D image decoding means 2403 decodes encoded data to obtain object decoded image data. The decoded image data is assumed to be configured by right-eye image data and left-eye image data. The 3-D image decoding means also performs the separation into right-eye image data and left-eye image data here as described above.

3-D image control information analyzing means 2402 analyzes the 3-D image control information part to decode both 3-D effect intensity and threshold value. For example, the display unit obtains a 2-bit variable "3-D_intensity" as a 3-D effect intensity value and a 16-bit variable "3-D_threshold" as a threshold value.

The means 2402 then decodes the information for denoting both 3-D effect intensity and threshold values stored or received together with the encoded data of each 3-D image as described above.

Figure 25:
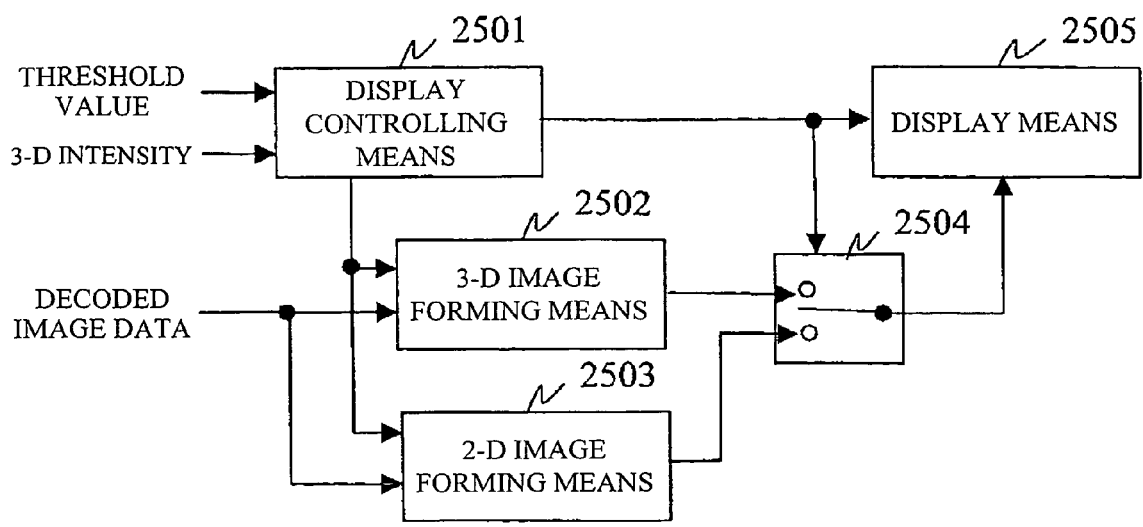
FIG. 25 is a block diagram of a 3-D image display unit in the fourth embodiment of the present invention.
Figure 25:
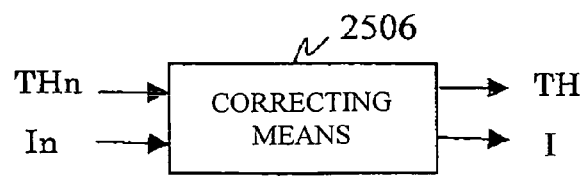

FIG. 25A shows a block diagram of the 3-D image display unit in this embodiment. The display unit uses both 3-D effect intensity and threshold value to limit 3-D display using the above method just like in the processings (1) to (3).

Display controlling means 2501 calculates the accumulative intensity according to the 3-D effect intensity and controls 3-D image forming means 2502, 2-D image forming means 2503, switch 2504, and display means 2505 according to the result of comparison between the accumulative intensity and the threshold value as follows.

In the case where the accumulative intensity value is under the threshold value, the display unit operates the 3-D image forming means 2502 to form a 3-D image to be displayed and stops the 2-D image forming means 2503. The switch 2504 is connected to the 3-D image forming means 2502, thereby the 3-D display image is sent to the display means 2502. The display unit then sets the display means 2505 in the 3-D display mode to display 3-D display images.

In the case wherein the accumulative intensity is over the threshold value and the 3-D display is limited just like in (1), the display unit operates the 2-D image forming means 2503 to form a 2-D display image and exits the operation of the 3-D image forming means 2502. The switch 2504 is connected to the 2-D image forming means 2503, thereby the 2-D display image is sent to the display means 2505. The display unit then sets the display means 2505 in the 2-D display mode to display 2-D display images.

In the case where the 3-D effect intensity is over the threshold value and the 3-D display is limited just like in the processing (2), the operation of the 3-D image forming means 2502 is the same as that when the accumulative intensity is under the threshold value. The display means 2501 changes over the operation mode of the 3-D image forming means 2502 and the 3-D image forming means 2502 forms a 3-D image having a lower parallax with use of the above-described method.

While the same display mode is used for the two threshold values TH>0 and TH=0 as described above, the display mode can be controlled flexibly as follows according to the degree of the user's eyestrain caused by 3-D image data.

In the case where the 3-D image data creator or image data provider judges that the user's eyes are not affected by 3-D image data so much, the threshold TH>0 may be used and the display mode may be any of the (1) to (3). In the case where the 3-D image data creator or image data provider judges that the user's eyes might be much affected by 3-D image data, the threshold value TH=0 may be employed and the display mode is limited only to (1) and changed over to a 2-D display mode immediately. Such a controlling method is also enabled by a combination of both threshold value and display mode.

In the above example, the image data used in the 2-D image forming means 2503 is switched between right-eye image data and left-eye image data according to the 2-D display image selection information. However, in the case where the use of either right-eye image data or left-eye image data is set in the display unit beforehand, the set image data may be used. The image data that has been used in a 2-D image display mode may also be used here.

When changing the 3-D image display mode set currently in the 3-D image display unit, the image data creator, image data provider, or the like can change the mode by setting 0 for the threshold value TH in the control information I2 of the 3-D image control information part at any intended timing regardless of the state of the 3-D image display unit.

In the case where the 3-D effect intensity is over the threshold value and the 3-D display is limited just like in the above processing (3), the display means 2505 displays a warning message basically just like when the accumulative intensity is under the threshold value.

How to form 3-D display images and 2-D display images is the same as those described in the first to third embodiments of the present invention, so that the description will be omitted here.

While any one of the processings (1) to (3) is performed when the accumulative intensity reaches the threshold value in the above example, it is also possible to prepare a plurality of sets of processing contents beforehand and employ any one of those sets properly. For example, the following processing sets may be defined beforehand.

A: Performs the processing (1).

B: Performs the processing (2).

C: Performs the processing (3).

D: Performs the processings (1) and (3).

E: Performs the processings (2) and (3).

And, the information for specifying any one of the sets A to E is included in the 3-D image control information part.

Consequently, the information S for denoting the above processing sets is stored or transmitted together with encoded data of each 3-D image in the 3-D image display unit and the 3-D image display unit, then decodes the information S to select a processing to be performed when the accumulative intensity reaches the threshold value according to the information S.

Next, a method for correcting both accumulative intensity and threshold values in the 3-D image display unit will be described. The above method uses the same 3-D effect intensity and threshold values regardless of the characteristics of the display means even when the same 3-D image is displayed on the display means having different characteristics (display size, observation distance, etc.). Actually, however, it is considered to be natural that the eyestrain of the user increases in proportion to, for example, the display screen size or observation distance. Both 3-D effect intensity and threshold values should preferably be corrected according to the characteristics of the display means. For example, both 3-D effect intensity and threshold values stored or transmitted together with 3-D encoded image data should be determined optimally (standard 3-D effect intensity and standard threshold value) for the display means provided with such standard characteristics as a standard display screen size, an observation distance, etc. Each display unit thus comes to correct the standard 3-D effect intensity and the standard threshold values according to the characteristics of the display means.

In order to realize such a correcting method, correcting means 2506 shown in FIG. 25B is connected to an input part of display controlling means 2501 in the 3-D image display unit shown in FIG. 25A. The correcting means 2506 corrects the standard 3-D effect intensity (In) and the standard threshold (THn) and outputs the corrected standard 3-D effect intensity (I) and the corrected standard threshold value (TH) respectively. Both I and TH are generally given as follows by the correction functions G and H according to the characteristics of the display means.

$I = G(\text{In})$ $TH = H(THn)$

The correction functions can be represented by primary functions, for example, as follows.

$G(\text{In}) = N1 \cdot \text{In} + N2$ $H(THn) = N3 \cdot THn + N3$

N1 to N3 are values found by tests, etc. More simply, it is possible to correct only the THn to find I and THn as follows.

$I = \text{In}$ $TH = N \cdot THn$

It is also possible to correct only the In.

In the above expressions, the observation distance of the display means of the display unit is the same as the standard observation distance. In the case where the display screen is larger than the standard display screen in size, N takes a value smaller than 1. In the case where the display screen is larger than the standard display screen in size, N takes a value larger than 1.

As described above, although 2-viewpoint image data configured by left-eye image data and right-eye image data is used in this fourth embodiment, it is apparent that this fourth embodiment can also apply to multiple-viewpoint image data configured by image data of three or more viewpoints just like in the first embodiment.

Next, the processings to be performed when the accumulative intensity (AI) reaches the threshold value THm will be described in detail. The processings (1) to (3) are also object processings to be performed here. At first, the processing (1) that is how to change a 3-D display mode to a 2-D display mode will be described first here.

In the case where a 3-D display mode is changed to a 2-D display mode, the eyestrain of the user is eased. The 3-D display can thus be resumed when the user is recovered enough from eyestrain.

Switching to a 2-D image display may be done automatically or the method (3) (to be described later) may be used together with the method (1) to go to the new display mode automatically or manually by the user after a warning message is displayed. In the following description, it is premised that the display mode is switched to a 2-D image display mode automatically.

The 3-D image display unit of the present invention can restart 3-D image display as follows.

(a) Restarts object 3-D image display after a predetermined time (Tm) is reached.

(b) Reduces the accumulative intensity (AI) at every fixed time interval while 2-D images are displayed. Restarts 3-D image display when the accumulative intensity (AI) goes down to a predetermined value.

(c) Restarts 3-D image display when the user switches between 2-D image display and 3-D image display manually.

In any of the above cases, the initial value of the accumulative intensity (AI) when 3-D image display begins may be the same as that when the above 3-D image display begins (f0: f0=f(I,0)). Otherwise, the initial value should take a predetermined threshold value (THs: f0<THs) and the restarted 3-D display time may be limited to make the 3-D display time shorter after the display is restarted. The THs value is determined by tests. In the case where switching between 3-D image display and 2-D image display is repeated, the THs value may be changed in accordance with the number of repeating times.

In the case where the method (a) is employed, the Tm value also comes to be determined by tests. In the case where switching between 3-D image display and 2-D image display is repeated, the Tm value may be changed in accordance with the number of repeating times. In the case where the Tm takes a large value, long time 3-D image display is disabled, although the user is recovered enough from eyestrain. In the case where the Tm takes a small value to quicken the restart of the original 3-D image display, the user cannot be recovered enough from eyestrain. The THs must thus take a large value to make the 3-D image display shorter after the 3-D image display is restarted. This is why the combination of the Tm and THs values can be changed according to the taste of the user.

Next, a case in which the method (b) is employed will be described. The accumulative intensity (AI), while 2-D images are displayed, is represented as follows using the following expression and the 2-D image display time T.

$AI = THm \cdot g(t, THm)$

The THm is a function that denotes the accumulative intensity when 2-D image display begins and the g is a function that denotes a decremental value of the accumulative intensity.

While the function g denotes a decremental value of the accumulative intensity as described above, the value, in other words, denotes how much the user is recovered from eyestrain. The function g is also determined by tests. In the following description, the following monotone increasing function of the 2-D image display time t is assumed to be used.

$g(t, THm) = \gamma \cdot t$ ($\gamma$: positive constant)

In the case of $T > THm/\gamma$, the following is assumed.

$g(t, THm) = THm$

Figure 26:
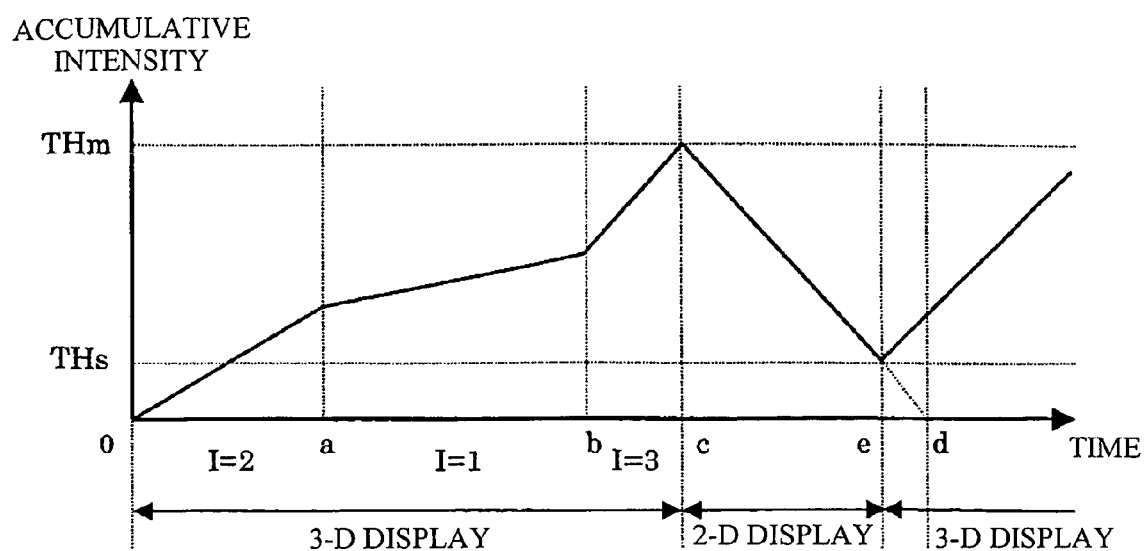
FIG. 26 is the second example of the relationship between the display time and the accumulative intensity.

In the case of the example shown in FIG. 22, the accumulative intensity (AI) reaches the threshold value THm for denoting a 3-D display allowable limit, thereby the display mode is changed to a 2-D image display mode. In the 2-D display mode, the accumulative intensity (AI) decreases at a fixed speed and the 2-D image display is continued until the accumulative intensity (AI) reaches 0, which is the same as the initial value of the first 3-D image display (between times 0 to c). After that, 3-D image display is restarted at time d when the accumulative intensity AI reaches 0. Similarly to the example shown in FIG. 26, 3-D image display is restarted at time "e" when the accumulative intensity (AI) reaches the threshold value THs, the 3-D image display allowable time, after the restarting, can be shortened and the time required until the 3-D image display is restarted can be shortened just by a time of the section between e and d.

The function g for denoting the above accumulative intensity decremental value may also be used to calculate the accumulative intensity (AI) during 2-D image display not only when the accumulative intensity (AI) reaches the 3-D image display allowable limit, but also when the 2-D image display is switched from 3-D image display apparently by the user, as well as for the displayed contents.

Next, a case in which the above method (c) is employed will be described. In that case, the user switches the display mode from 2-D display to 3-D display apparently using a remote control device or the like. This method has an advantage that the user is protected from eyestrain flexibly, since the user judges the eyestrain by him/herself. This is because how much eyes are strained and recovered differs among users. In the case where this method is employed in a wrong way, however, the method might come to affect the user's eyes badly. In order to prevent such a problem, the display mode may be switched to 3-D display only when the 2-D display time exceeds a predetermined time or the accumulative intensity (AI) calculated during 2-D display with the same method as that (B) goes under a predetermined threshold value. And, in the case where an elapsed time is still under a predetermined time or the accumulative intensity (AI) is over a predetermined threshold value, a warning message may be displayed on the screen to notify the user of an effect that switching to 3-D display is disabled.

Figure 27:
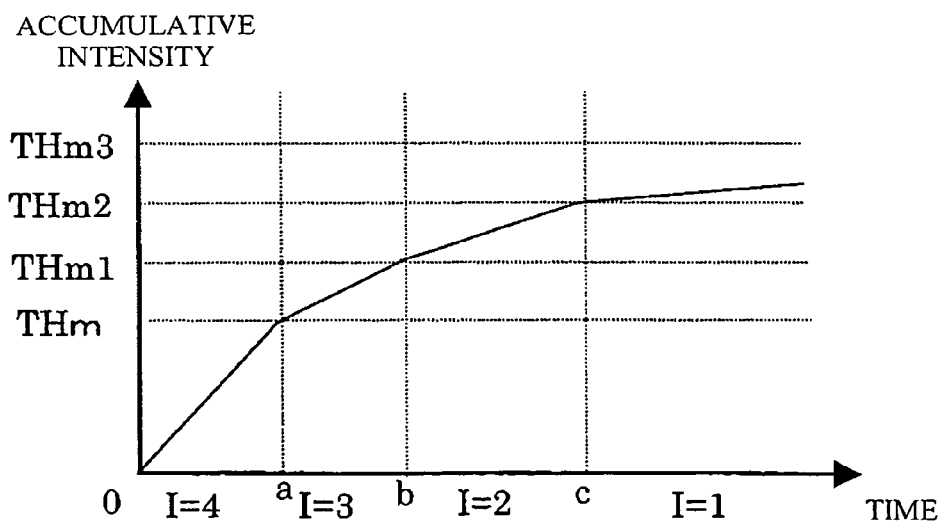
FIG. 27 is the third example of the relationship between the display time and the accumulative intensity.

Next, a description will be made in detail for how to continue the 3-D display for which the parallax in the above (2) are reduced as a processing to be performed when the accumulative (AI) reaches the threshold value THm. In that case, the parallax is reduced to ease the burden on the user's eyes, thereby enabling the 3-D display to be continued. The above method (2) is used to adjust the parallax. The parallax adjustment may be done automatically or it is possible to use above method (3) together with the method (2) to display a warning message once, then do the adjustment automatically or manually by the user. The parallax adjustment may also be done just once when the accumulative intensity (AI) reaches the threshold value THm or may be done so that new threshold values THm1, THm2, ..., THmn are set for the accumulative intensity (AI) the parallax and the parallax is reduced step by step in accordance with each of those new threshold values. As shown in the example in FIG. 27, the 3-D effect intensity value after such parallax adjustment may be reduced in accordance with the adjusted parallax value, then used to calculate the accumulative intensity (AI). For example, in FIG. 27, the parallax is adjusted step by step for the displayed contents of the 3-D effect intensity I=4 each time the accumulative intensity (AI) reaches to one of the THm, THm1, THm2, ..., and THmn. And, the 3-D effect intensity (I) is also changed step by step like I=3, I=2, and I=1 sequentially. Because the parallax adjustment is done step by step such way, a sense of incompatibility the user might have is suppressed.

Next, a description will be made in detail for how to display a warning message of the (3) when the accumulative intensity (AI) reaches the threshold value THm. In that case, the warning may be notified not only with a message for denoting that a 3-D display allowable limit is over, but also by turning on a warning LED light or the like provided on the display unit. A warning sound may also be used to notify the user of such a warning case. The warning may be done only when the accumulative intensity (AI) reaches the threshold value THm or it may be done continuously or intermittently until the 3-D display stops, for example, when the user switches the display mode from 3-D to 2-D apparently or when the display mode of displayed contents is switched to 2-D image display after a channel is switched to another. It is also possible to display how much the 3-D display allowable limit THm is reached (for example, 100·AI/THm) before the accumulative intensity (AI) reaches the threshold value THm. In addition, the warning may be done in a case where the current 3-D display stops once, then restarts before a predetermined time is reached. An apparent user's operation for switching to a 3-D display mode may be invalidated until a predetermined time is reached and the remaining time until the 3-D display is resumed may be displayed. Similarly, the warning may be done even when the initial 3-D display restarts in a state in which the accumulative intensity (AI) calculated in the preceding 2-D display mode exceeds a predetermined threshold value. It is also possible that the user's apparent switching to the 3-D display mode is invalidated in the case where the accumulative intensity (AI) is over a predetermined threshold value and the remaining time until the 3-D display is enabled is displayed.

While the processings (1) to (3) performed when the accumulative intensity (AI) reaches the threshold value THm are described above in detail, only one of the processings (1) to (3) may be performed or the processings (1) to (3) may be combined to obtain the same effect. In the case where the processings (1) to (3) are combined, the threshold value THm of the accumulative intensity (AI) may be a common value among all the processings (1) to (3) or it may be an independent value in each processing.

As described above, 2-viewpoint image data configured by right-eye and left-eye image data is used for describing the fourth embodiment. It is apparent, however, that the fourth embodiment can also apply to multiple-viewpoint image data configured by three or more viewpoints of image data just like the first embodiment.

Next, the fifth embodiment of the present invention will be described. The 3-D image display unit in the fourth embodiment uses both 3-D effect intensity and threshold value of an accumulative intensity value as 3-D image control information associated with 3-D images to be reproduced. The 3-D image format data F1 used in the first embodiment includes continuous looking and listening times TIME1 and TIME2. This fifth embodiment handles a recording unit for recording both 3-D video images and 3-D image control information in a digital video tape as one of the recording methods for recording 3-D image control information that includes those times TIME1 and TIME2.

Figure 28:
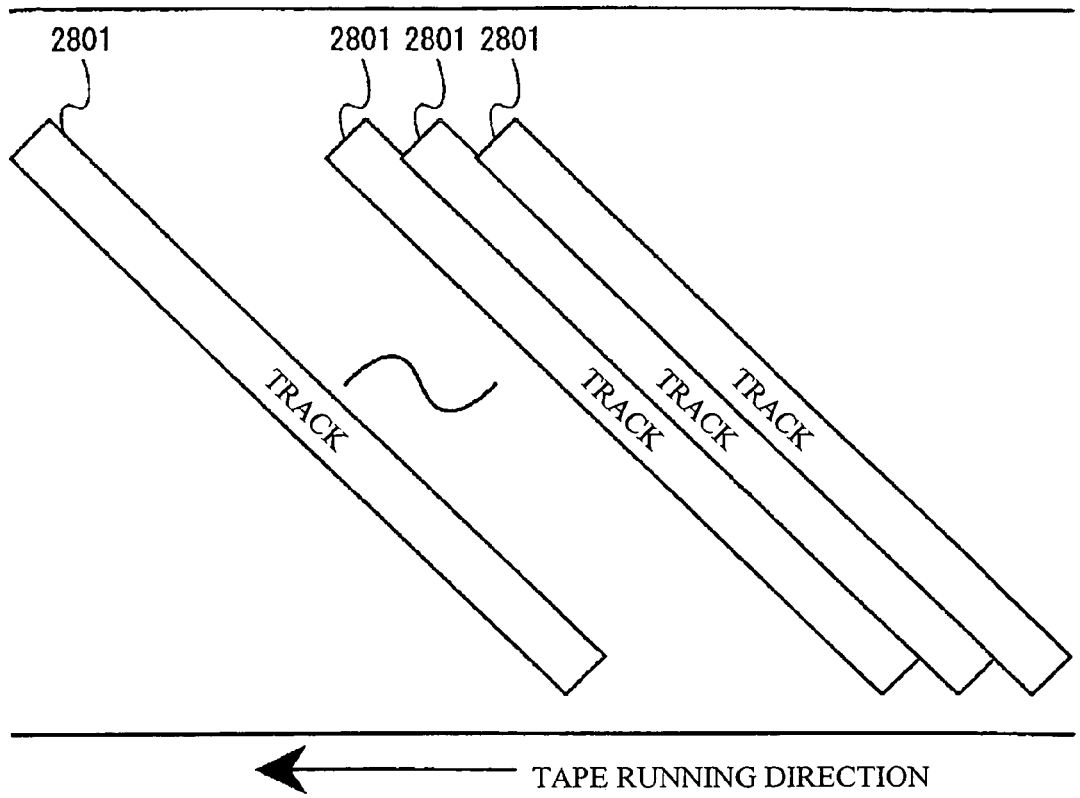
FIG. 28 is an example of a format of a digital video tape having data recorded with use of a 3-D image display unit in the fifth embodiment of the present invention.

At first, a description will be made for how the tracks of the digital video tape used for recording data in this fifth embodiment is formatted. Generally, each digital VTR that is spreading now employs a so-called helical scanning method. This method records data on discontinuous tracks on tape. FIG. 28 shows how data is recorded in such discontinuous tracks. The tape has a plurality of tracks 2801 and one 3-D image is divided and recorded on a plurality of tracks.

Figure 29:
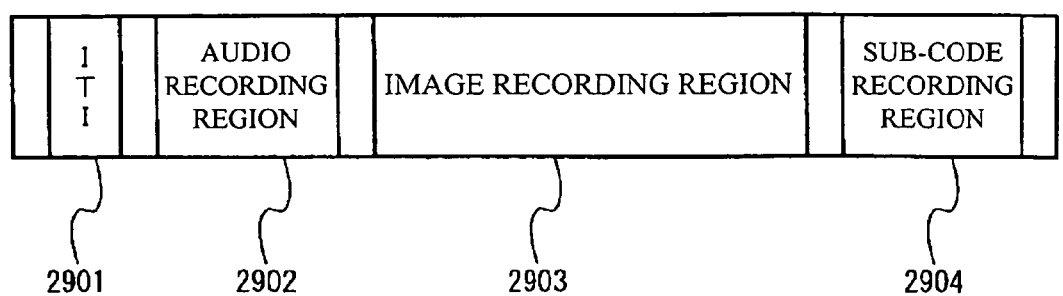
FIG. 29 is another example of the format of the digital video tape having data recorded with use of a 3-D image display unit in the fifth embodiment of the present invention.

FIG. 29 shows an expanded view of one of the tracks 2801 and an example of the track format of the digital VTR used for recording data in this fifth embodiment. Each track 2801 includes an ITI (Insert and Track Information) region 2901, an audio recording region 2902 for recording audio data, an image recording region 2903 for recording image data, and a sub-code recording region 2904 for recording associated information such as a time code, etc. The image recording region 2903 can record not only 3-D images, but also information associated with those 3-D images. Similarly, the audio recording region 2902 can record not only audio data, but also information associated with the audio data. In addition to those two regions, the sub-code recording region 2904 can record associated information as described above. And, a margin is provided between those regions, so that each region is enabled for postrecording.

Figure 30:
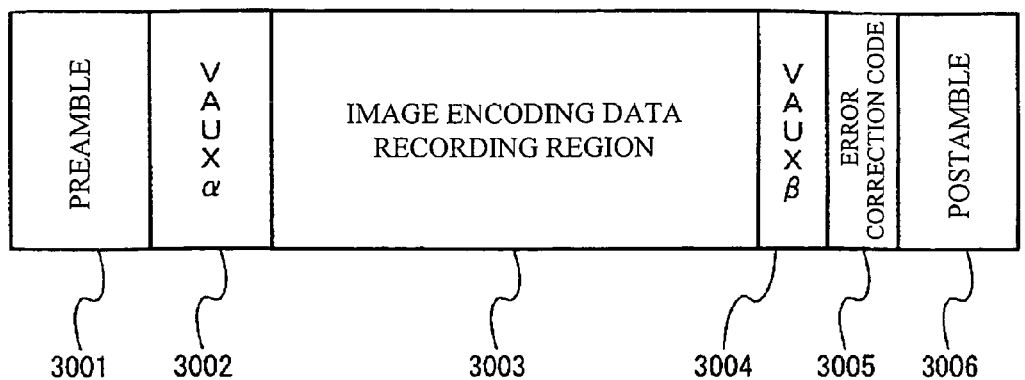
FIG. 30 is still another example of the format of the digital video tape having data recorded with use of a 3-D image display unit in the fifth embodiment of the present invention.

FIG. 30 shows an expanded view of the image recording region 2903. The image recording region 2903 includes a pre-amble 3001 for recording a synchronous pattern, etc., VAUX (Video AUXiliary data) α3002 and VAUX β3004 for recording information associated with images, encoded image data recording region 3003 for recording encoded image data, an error correction code 3005, and a post-amble 3006 having a function to obtain a margin. Although the region for recording information associated with images is divided into VAUXα3002 and VAUXβ3004 in this fifth embodiment, those two regions are combined into one VAUX region and hereinafter and the combined region will be referred to as a VAUX region.

Although not shown here, the audio recording region 2902 also has an AAUX (Audio AUXiliary data) region for recording information associated with audio data.

Figure 31:
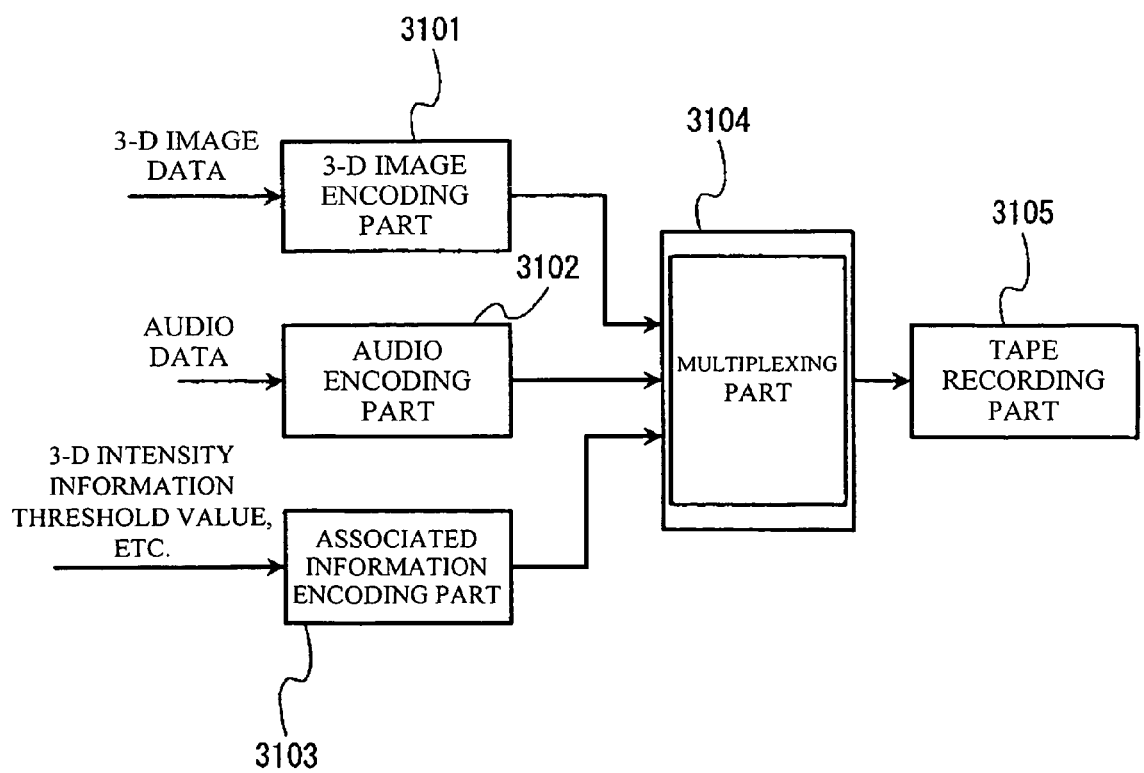
FIG. 31 is a block diagram of a 3-D image recording unit in the fifth embodiment of the present invention.

Next, a recording unit in this fifth embodiment will be described with reference to FIG. 31. FIG. 31 shows a block diagram of the recording unit in this fifth embodiment. As shown in FIG. 31, the recording unit includes a 3-D image encoding part 3101, an audio encoding part 3102, an associated information encoding part 3103, a multiplexing part 3104, and a tape recording part 3105.

The 3-D image encoding part 3101 inputs 3-D image data. Although 3-D image data is configured by image data of a plurality of channels, the 3-D image encoding part 3101 inputs image data of just two channels for left-eye image data (left image) and right-eye image data (right image) in this fifth embodiment. The 3-D image encoding part 3101 combines the left-eye image and the right-eye image and encodes the combined image with a predetermined method, then outputs the encoded 3-D image data.

The audio encoding part 3102 inputs audio data and encodes the data, then outputs the encoded audio data.

The associated information encoding part 3103 encodes associated information such as the information of a combining method used for combining left and right images in the 3-D image encoding part 3101, 3-D effect intensity information, accumulative intensity threshold value, the continuous looking and listening enabling time, etc., then outputs encoded data of associated information. The above encoding method is used here to convert data to a fixed length value corresponding to each piece of the above information.

The multiplexing part 3104 inputs 3-D encoded image data, information of a combining method selected for a combining operation, encoded audio data, and encoded data of associated information, then multiplexes data so as to be recorded on tape, then outputs multiplexed data to be recorded on tape.

The tape recording part 3105 records tape recording data on tape that is a recording medium in accordance with the above format.

Figure 32:
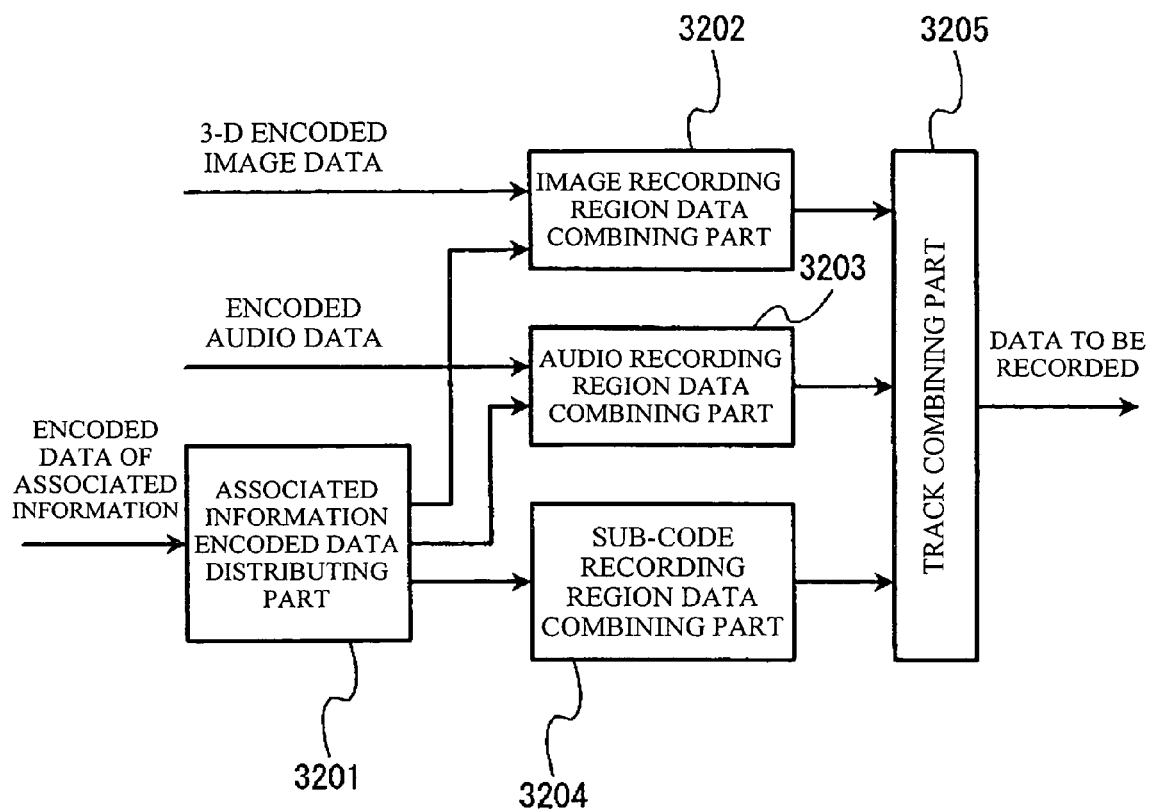
FIG. 32 is a block diagram of the 3-D image recording unit in the fifth embodiment of the present invention.

Next, the multiplexing part 3104 will be described more in detail with reference to FIG. 32. As shown in FIG. 32, the multiplexing part 3104 includes an associated information encoded data distributing part 3201, an image recording region data combining part 3202, an audio recording region data combining part 3203, a sub-code recording region data combining part 3204, and a track combining part 3205.

The associated information encoded data distributing part 3201 inputs encoded data of associated information and determines a target region among the VAUX region, the AAUX region, and the sub-code region, then distributes the data to the determined one. In this fifth embodiment, the encoded data of the information associated with the combining method of right and left images is distributed to the VAUX region and information associated with 3-D effect intensity, accumulative intensity threshold value, continuous looking and listening allowable time are distributed to the sub-code region.

The image recording region data combining part 3202 inputs 3-D encoded image data output from the 3-D image encoding part 3101 and the VAUX region associated information encoded data output from the associated information encoded data distributing part 3201. The image recording region data combining part 3202 combines those data into one piece of data formatted as shown in FIG. 30. The associated information includes information of a combining method selected for right and left images, output from, for example, the 3-D image encoding part 3101. Then, the pre-amble 3001, the error correction code 3005, and the post-amble 3006 are added to the associated information, so that the image recording region data is output.

The audio recording region data combining part 3203 inputs encoded audio data output from the audio encoding part 3102 and encoded data of AAUX region associated information output from the associated information encoded data distributing part 3201 and combines those data into predetermined formatted data to be output to the audio recording region.

The sub-code recording region data combining part 3204 inputs encoded data of sub-code region associated information output from the associated information encoded data distributing part 3201 and combines the data into predetermined formatted data to be output to the sub-code recording region.

The track combining part 3205 inputs data from the image recording region, the audio recording region, and the sub-code recording region and combines those data into formatted data as shown in FIG. 29, then adds ITI information 2901 and an inter-region margin to the combined data to be output and recorded.

As described above, in this embodiment, data is recorded in all of the audio recording region, the image recording region, and the sub-code recording region at the same time. However, data may not be recorded necessarily in all of those regions at the same time. Data may be recorded only in some of the regions, for example, only the audio recording region and the image recording region first, then the data may be recorded in the sub-code recording region by postrecording. Even after data is recorded in all of those regions, other data may be overwritten in each of the regions independently by postrecording.

3-D effect intensity information, accumulative intensity threshold value, and continuous looking and listening allowable time might be determined in an editing process after ending the photographing according to the result of the final contents, which are usually determined finally at the photographing time. For example, image data might be recorded at 3-D effect intensity=1 as a default value when in photographing, then the image data is postrecorded at I=2 in the case where the 3-D effect intensity is judged higher than the default value in the subjective evaluation in the editing process. In the recording unit in this fifth embodiment, 3-D effect intensity information, accumulative intensity threshold value, and continuous looking and listening allowable time are recorded in the sub-code region in which postrecording can be done more easily, so that those information items can be modified easily even in the editing process.

While 3-D effect intensity information, accumulative intensity threshold value, and continuous looking and listening allowable time are recorded in the sub-code region in this fifth embodiment as described above, those information items may be combined into one and recorded in the VAUX region, since all those information items are considered to be associated with images.

In order to realize such a method, the operation of the associated information encoded data distributing part 3201 shown in FIG. 32 is modified so that encoded data of all of the above information items are output to the VAUX region. In that connection, information associated with images comes to be collected in a place, so that those information items can be handled more easily, although the postrecording easiness is lost at that time. For example, when copying image data to a medium having a different recording format, in the case where only the contents in the image recording region are to be copied, all the information items associated with images are obtained, thereby the sub-code region can be omitted. And, in order to prevent image data from being overwritten by postrecording, image data may be recorded in both of the sub-code region and the VAUX region.

The sub-code region and the VAUX region are limited in storage capacity respectively. In the case where image data cannot be recorded completely in any of those regions, therefore, information associated with 3-D images can be recorded in the AAUX region.

Some digital VTR machines are provided with a cassette memory for recording associated information respectively. The above associated information can thus be recorded in the memory.

Associated information may also be recorded in the memory of the subject unit. In that connection, just like in the above description, the recording area may include an image recording region, an audio recording region, and a sub-code recording region and 3-D image display control information or photographing condition information may be recorded in those regions.

The configuration of the recording unit in this fifth embodiment also conforms to the digital VTR method employed for household recorders except for the portions specific to 3-D images. Consequently, among the associated information items to be recorded in this fifth embodiment, the associated information items specific to 3-D images, for example, information items related to how to combine right and left images, 3-D effect intensity values, accumulative intensity threshold values, continuous looking and listening allowable times, etc. may be recorded in the household digital VTR format. Both 2-D and 3-D images can thus be recorded in the same tape.

In the fifth embodiment of the present invention, however, the data sender, for example, the 3-D image data creator, broadcasting station, or contents provider (hereinafter, to be referred to simply as a provider, etc.) specifies forcibly the timing for starting 2-D display in the subject 3-D image data. Hereinafter, the specifying method will be described.

Figure 33:
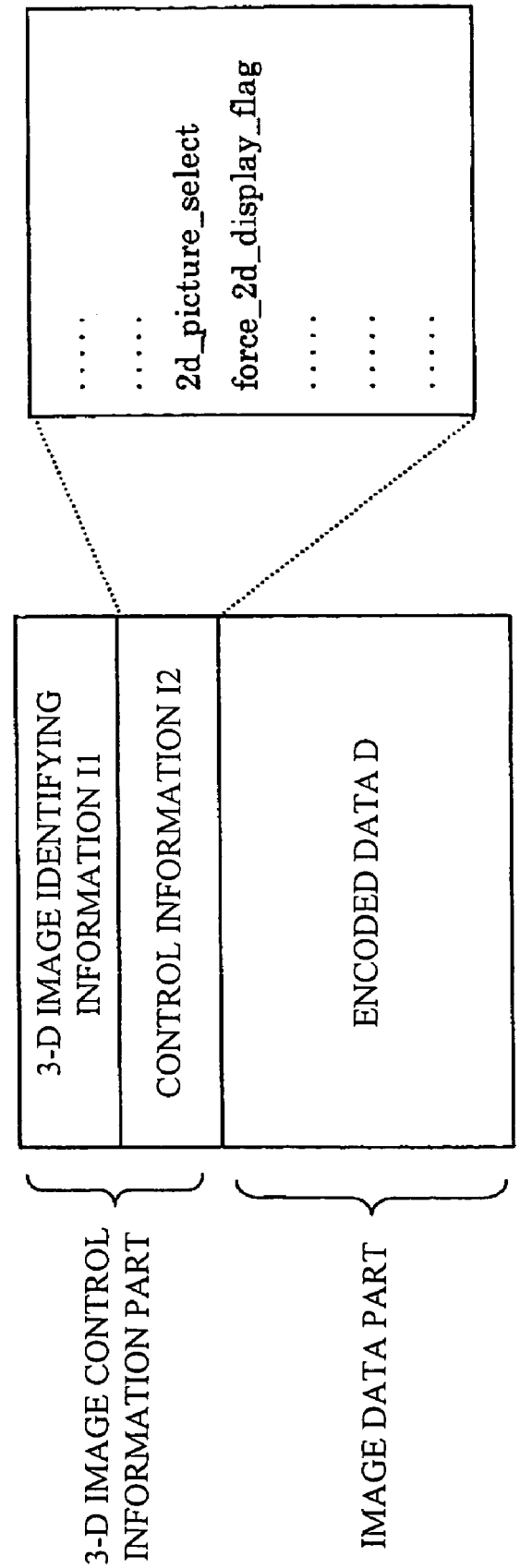
FIG. 33 is an example of 3-D image format data F1 in the sixth embodiment of the present invention.

As shown in FIG. 8, the 3-D image format data F1 of 3-D image contents is configured by a 3-D image control information part that includes both 3-D image identification information I1 and control information I2, as well as an image data part configured by encoded data D. In this embodiment, as shown in FIG. 33, the control information I2 includes a forcible 2-D display flag (force_2-D_display_flag) and 2-D display image selection information (2-D_picture_select). The forcible 2-D display flag denotes whether to instruct the 3-D image display means to go to a 2-D display mode forcibly while displaying 3-D image data. The 2-D display image selection information denotes which of right-eye image data and left-eye image data is to be displayed when the display mode is switched forcibly to 2-D images in accordance with the value set in the forcible 2-D display flag. In the case where 3-D image data is to be displayed, the 2-D display image selection information is ignored.

For example, in the case where 1 is set in the forcible 2-D display flag, the display mode is switched to 2-D image display forcibly. In the case where the 2-D display image selection information denotes right-eye image data at that time, the right-eye image data is used to display the object 2-D image. In the case where the 2-D display image selection information denotes left-eye image data, the left-eye image data is used to display the object 2-D image.

In the case where 0 is set in the forcible 2-D display flag, the display mode is not switched to 2-D image display forcibly. There are plural methods as follows to realize this operation. The first method is to continue the current display mode as is. For example, in the case where the 3-D image display mode is set currently, the mode is kept as is. In the case where a 2-D image display mode is set currently, the mode is kept as is. The second method is to specify the 3-D image display mode regardless of the current display mode. The third method is used to select the 3-D or 2-D image display mode on other conditions. For example, in the case where the 3-D image display allowable time is not reached yet, the 3-D image display mode is set. In the case where the 3-D image display allowable time is already reached, the 2-D image display mode is set. In the case where the user presses a button to switch the display mode to another, the selected display mode is set. Which of the methods is to be employed may be determined beforehand between the 3-D image encoding device and the decoding device.

As described in the first embodiment, the 3-D image control information part may be inserted repetitively in any place in the 3-D image format data F1. The 3-D image data creator, image data provider, or the like can set 1 (to switch to 2-D image display) in the forcible 2-D display flag at any place in the 3-D image format data F1.

For example, while FIG. 9 shows an example of broadcasting 3-D image contents, in the case where the broadcasting contents configured by a plurality of pieces of program arrangement information and a plurality of 3-D image contents, the 3-D image control information part is included in the program arrangement information. At that time, in the case where 1 is set in the forcible 2-D display flag when the program arrangement information is inserted in the 3-D image format data F1, the 2-D image display mode is set for the display means at the receiving side.

And, as described in the above embodiments of the present invention, the 3-D image control information part may be inserted in the image data part shown in FIG. 33. In that connection, the 3-D image display means can be set in a 2-D image display mode forcibly for each frame.

Such 3-D image control information can also be inserted in 3-D image contents exchanged through a cable and such a network as the Internet, as well as in the 3-D image contents recorded on such recording media as hard disks, optical disks, etc.

Figure 34:
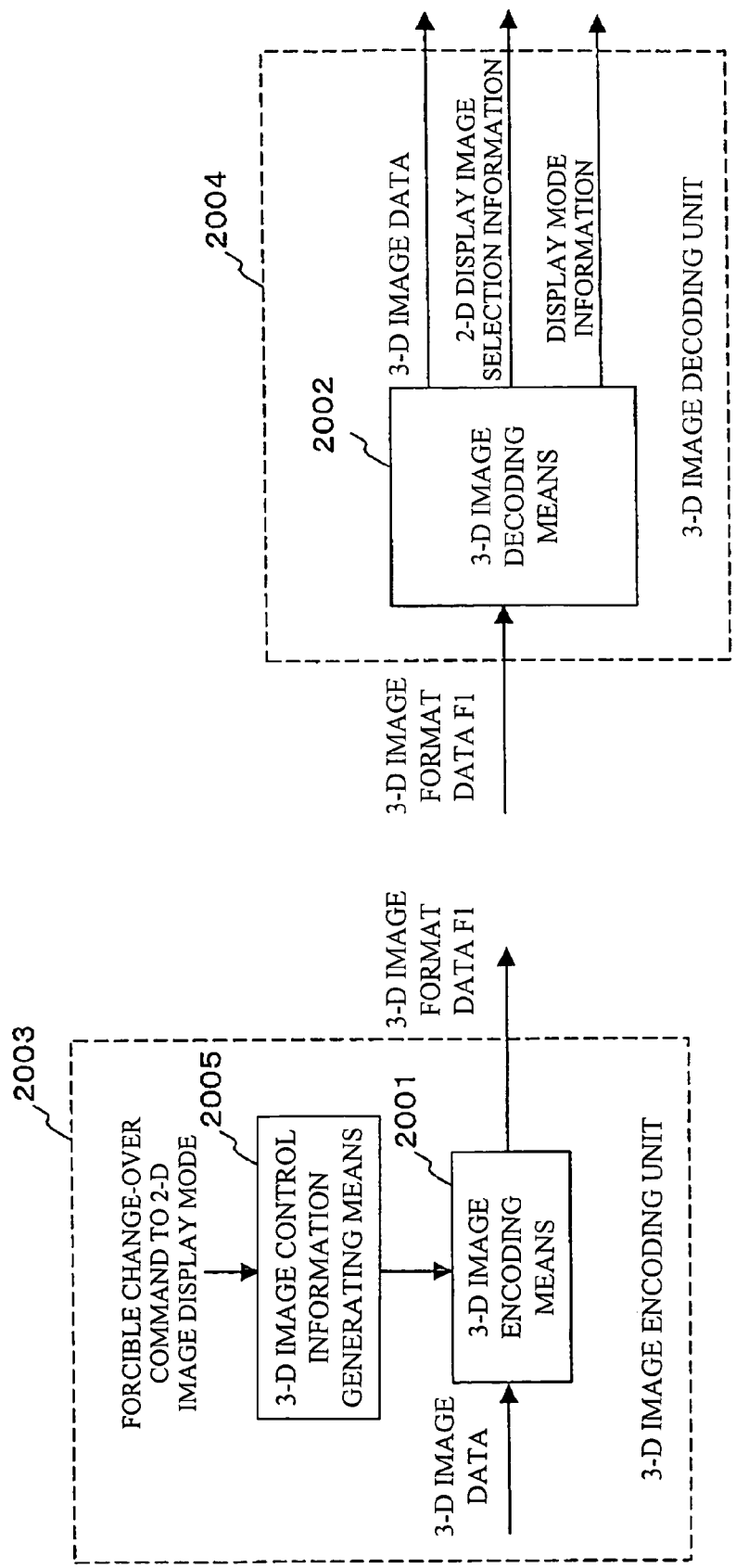
FIG. 34 is an example of a flow of the 3-D image format data F1 in the sixth embodiment of the present invention.

FIG. 34 shows an example of a 3-D image encoding device 2003 for forming 3-D image format data F1 and decoding device 2004 for decoding the information.

In FIG. 34, the 3-D image data creator or image data provider instructs the 3-D image control information forming means 2005 to go to a 2-D image display mode forcibly at a timing specified in the inputted 3-D image data and sets 1 in the forcible 2-D display flag provided in the 3-D image control information part corresponding to the image data. At the same time, the 3-D image data creator or image data provider writes which of the right-eye image data and left-eye image data is used to display object 2-D image data in the 2-D display image selection information. And, separately from that writing, the 3-D image data creator or image data provider instructs the 3-D image encoding means 2001 to encode the 3-D image data. The 3-D image data creator or provider then stores the 3-D image control information part in which 1 is set in the forcible 2-D display flag in the image data part in which encoded 3-D image data is to be stored or stores the information part separately from the image data part, thereby forming the 3-D image format data F1. The 3-D image format data F1 is sent to the 3-D image decoding means 2004 with use of a recording medium, through a network, or with broadcast waves.

In the 3-D image decoding device 2004, the 3-D image decoding means 2002 decodes received 3-D image format data F1 to 3-D image data, then decodes the forcible 2-D display flag and the 2-D display image selection information set in the 3-D image control information part respectively. If 1 is set in the display flag, the 3-D image decoding means 2002 sets an object 2-D image display mode in the display mode information, then outputs the mode information. The display mode information is used to instruct the 3-D image display unit (to be described later) to switch between 3-D image display and 2-D image display.

If 0 is set in the forcible 2-D display flag, as described above, the display mode information might be output as is, output by setting the 3-D image display mode therein, or output by setting 2-D image display mode or 2-D image display mode therein in accordance with other conditions.

Figure 35:
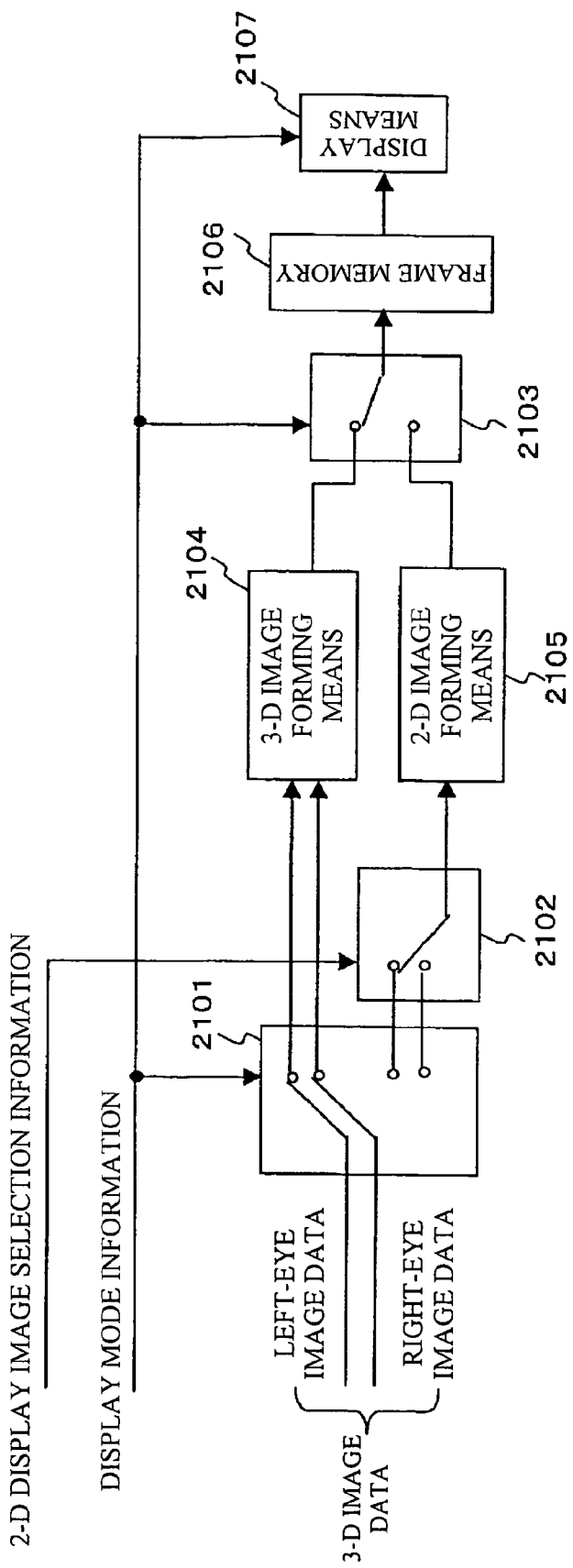
FIG. 35 is a block diagram of a 3-D image display unit in the sixth embodiment of the present invention.

The 3-D image data decoded by the 3-D image decoding means 2004 is displayed on the screen of the 3-D image display unit shown in FIG. 35. The 3-D image data decoded by the 3-D image decoding means 2004 is separated into right-eye image data and left-eye image data by a separating means (not shown), then inputted to the 3-D image display unit shown in FIG. 35 respectively. Those image data are inputted to the 3-D image decoding means 2004 as right-eye and left-eye image data according to the display mode information. In the case where the 3-D image display mode is set in the display mode information, the switch 2101 is pushed up. In the case where the 2-D image display mode is set in the display mode information, the switch 2101 is pushed down at that time. The image data inputted to the 2-D image forming means 2105 is switched to right-eye image data or left-eye image data by the switch 2102 according to the 2-D display image selection information. The operations of the 3-D image decoding means 2004 and the 2-D image forming means 2105 are the same as those of the 3-D image forming means 100 and the 2-D image forming means 6 shown in FIG. 14, so that the description for them will be omitted here.

The 3-D or 2-D image data formed as described above is changed over to 2-D or 3-D image data by the switch 23 according to the display mode information, then output to the frame memory 2106. The display means 2107 displays the image data read from the frame memory 2106 as 3-D or 2-D images according to the display mode information. At that time, the operations of the frame memory 2106 and the display means 2107 are the same as those of the frame memory 2 and the display means 3 shown in FIG. 14, so that the description for them will be omitted here.

In the above example, the image data inputted to the 2-D image forming means 2105 is switched between right-eye image data and left-eye image data by the switch 2102 according to the 2-D display image selection information. In the case where the use of either right-eye image data and left-eye image data is set by the 3-D image display unit beforehand, the set image data may be inputted to the 2-D image forming means 2105. The image data inputted in the 2-D image display mode in the past may also be used here.

The 3-D image data creator or provider, when switching from 3-D image data display to 2-D image data display forcibly, can switch the display at his/her intended timing by setting 1 in the forcible 2-D display flag provided in the control information I2 of the 3-D image control information part regardless of the state of the 3-D image display unit.

INDUSTRIAL APPLICABILITY

As described above, according to the present invention, it is possible to adjust the parallax of each 3-D image to be displayed according to the eyestrain of the user, display a warning message on the screen or stop the display itself in the case where 3-D images are displayed continuously or intermittently for a long time, and inhibit the display of 3-D images until a predetermined time is reached regardless of the user's operation for restarting the display, thereby the 3-D image display unit can be simplified in configuration to protect the user from eyestrain.

It is also possible to represent a difference between a clear 3-D image and a not-so-clear 3-D image using a 3-D effect intensity value, thereby limiting the 3-D image according to the 3-D effect intensity value. In addition, when the user is observing a plurality of 3-D images continuously, it is possible to limit 3-D image display easily even when the user watches 3-D images having different 3-D effect intensity values continuously by calculating the accumulative intensity of the 3-D image display and limit the 3-D image display according to the result of comparison between the accumulative intensity and a predetermined threshold value, thereby, for example, changing channels of digital broadcasting.

According to the present invention, therefore, 3-D images can be recorded in the household digital VTR format and record control information configured by 3-D effect intensity, accumulative intensity threshold value, continuous looking and listening allowable time, etc. can be recorded similarly. Existing digital VTR hardware resources can thus be used for the 3-D image display unit, thereby the price of the display unit is reduced.

Furthermore, it is possible to rewrite both information items of 3-D effect intensity and accumulative intensity threshold values, as well as information of the continuous looking and listening allowable time easily by postrecording.

Furthermore, the present invention enables image data to be copied easily.

The 3-D image data creator, provider, or the like, when inhibiting display of 3-D images forcibly, can use a flag for modifying the display mode information so as to set the 2-D image display mode to control the switching at any timing, thereby protecting the user from eyestrain while taking consideration to the 3-D image data contents.

The 3-D image data creator, provider, etc. can use the threshold value TH for switching the display mode according to the level of the relationship with the accumulative intensity to protect the user's eyes while taking consideration to the subject 3-D image data contents, thereby switching the display mode of the 3-D image display unit. Particularly, when inhibiting display of 3-D images forcibly, the 3-D image creator, provider, or the like can set 0 for the threshold value TH to control the display mode switching at any intended timing.

The 3-D image creator, provider, or the like can also select a display modes at each of the threshold values TH=0 and TH>0 to enable the user to watch image data in the display mode specified by the 3-D image creator or provider, or the like.

The invention claimed is:

1. A 3-D image display unit for displaying a 3-D image configured by a plurality of images, including:
    an input part for inputting control information required to display said 3-D image, wherein said control information includes information that denotes the 3-D effect intensity of said 3-D image;
    a calculation part for calculating an accumulative intensity value that increases together with a display time of said 3-D image according to said 3-D effect intensity; and
    a display control part for making a predetermined display operation when said accumulative intensity is over a first threshold value.

2. The 3-D image display unit according to claim 1; wherein said display operation includes display of a warning message.

3. The 3-D image display unit according to claim 1; wherein said display operation includes a parallax adjustment for said 3-D image so as to be reduce a parallax of the 3-D image.

4. The 3-D image display unit according to claim 1; wherein said display operation includes forming of a 2-D image from said 3-D image to display said 2-D image instead of said 3-D image.

5. The 3-D image display unit according to claim 4; wherein said display operation includes resuming display of said 3-D image instead of said 2-D image after a predetermined time.

6. The 3-D image display unit according to claim 5; wherein said unit further includes an input part for inputting an external signal that includes a request signal for switching display between 3-D image display and 2-D image display;
    wherein said request signal is invalidated between when said 2-D image is displayed due to said display operation and when said resuming operation is made.

7. The 3-D image display unit according to claim 5; wherein said predetermined time is included in said control information.

8. The 3-D image display unit according to claim 4; wherein said calculation part calculates an accumulative intensity value that decreases together with a time during 2-D image display and said display operation, when said accumulative intensity is under a second threshold value, includes resuming display of said 3-D image instead of said 2-D image.

9. The 3-D image display unit according to claim 8;
wherein said second threshold value is included in said control information.

10. The 3-D image display unit according to claim 1;
wherein said unit further includes an input part for inputting an external signal that includes a request signal for switching display between 3-D image display and 2-D image display;
wherein said unit selects either of said 3-D image display or forming a 2-D image from said 3-D image to display said formed 2-D image instead of said 3-D image according to said request signal.

11. The 3-D image display unit according to claim 1;
wherein said first threshold value is included in said control information.

12. A 3-D image display unit for displaying a 3-D image configured by a plurality of images, including:
an input part for inputting control information required to display said 3-D image; and
a display control part for controlling display of said 3-D image;
wherein said display control part forms a 2-D image from said 3-D image according to a predetermined first condition, displays said formed 2-D image instead of said 3-D image, and displays said 3-D image instead of said 2-D image according to a predetermined second condition,
wherein said predetermined first condition comprises one of a 3-D image display time or an accumulative intensity value of a 3-D effect intensity of the 3-D image being greater than or equal to a predetermined threshold value.

13. A 3-D image display unit for displaying a right-eye image and a left-eye image of a user separately;
wherein said unit includes:
3-D image forming means for forming a 3-D image from a plurality of images; and
warning display controlling means for forming a warning display for said 3-D image forming means;
wherein said warning display controlling means, in the case where the display time of said 3-D image exceeds a first predetermined time, forms said warning display for said 3-D image forming means.

14. The 3-D image display unit according to claim 13;
wherein said warning display is made as a 3-D image.

15. The 3-D image display unit according to claim 13;
wherein said warning display is made as a 3-D image and other displays are made as 2-D images.

16. The 3-D image display unit according to claim 13;
wherein said warning display is made as a 3-D image that is displayed at a limiting place within which the user can recognize the image with difficulty.

17. The 3-D image display unit according to claim 13;
wherein said unit further includes:
3-D image decoding means for decoding 3-D image format data; and
separating means for separating said 3-D image data decoded by said 3-D image decoding means into right-eye image data and left-eye image data.

18. The 3-D image display unit according to claim 17;
wherein the format of said 3-D image format data includes at least a single piece of 3-D image identification information for denoting whether or not object data is used to display a 3-D image, at least a single piece of control information that includes a first predetermined time, and at least a single piece of image data.

19. The 3-D image display unit according to claim 18;
wherein said 3-D image decoding means includes 3-D image control information analyzing means for analyzing 3-D image control information included in said 3-D image format data and image data decoding means for decoding said 3-D image data included in said 3-D image format data.

20. A 3-D image display unit for displaying a right-eye image and a left-eye image of a user separately;
wherein said unit includes:
3-D image forming means for forming a 3-D image from a plurality of images;
2-D image forming means for forming a 2-D image from said plurality of images; and
display means for displaying a 3-D image formed by said 3-D image forming means or 2-D image formed by said 2-D image forming means; and
wherein a power supply that includes at least the power of said display means is shut off automatically in the case where a 3-D image display time exceeds said first predetermined time; and
wherein said display means displays said 2-D image formed by said 2-D image forming means in the case where said shut-off power supply is restored before the 3-D image display off-time exceeds said second predetermined time after the power of said display means is shut off automatically.

21. The 3-D image display unit according to claim 20;
wherein said unit further includes 3-D image decoding means for decoding 3-D image format data and separating means for separating 3-D image data decoded by said 3-D image decoding means into right-eye image data and left-eye image data.

22. The 3-D image display unit according to claim 21;
wherein the format of said 3-D image format data includes at least a single piece of 3-D image identification information for denoting whether or not object data is used to display a 3-D image, at least a single piece of control information that includes at least one of a first predetermined time and a second predetermined time, and a single piece of image data.

23. The 3-D image display unit according to claim 22;
wherein said 3-D image decoding means includes 3-D image control information analyzing means for analyzing 3-D image control information included in said 3-D image format data and image data decoding means for decoding said 3-D image data included in said 3-D image format data.

24. A 3-D image transmitting method for transmitting a 3-D image configured by a plurality of images, including:
transmitting control information required to control display of said 3-D image, wherein said control information includes information for denoting the 3-D effect intensity of said 3-D image;
calculating an accumulative intensity value that increases together with a display time of said 3-D image according to said 3-D effect intensity, and
making a predetermined display operation when said accumulative intensity is over a first threshold value.

25. A 3-D image transmitting method for transmitting a 3-D image configured by a plurality of images, including:
a step of transmitting control information required to control display of said 3-D image;
wherein said control information includes a threshold value related to an accumulative intensity value that increases together with a 3-D display time of said 3-D image according to a 3-D effect intensity of said 3-D image.

26. A 3-D image transmitting method for transmitting a 3-D image configured by a plurality of images, including:
a recording step of recording control information required to control display of said 3-D image;
wherein said control information includes information that can take at least two values; and
wherein said control information denotes that a 3-D image is displayed as a 2-D image in the case where said information takes a first value and a 3-D image is displayed as a 2-D image or 3-D image in the case where said information takes a second value,
wherein said control information includes information for denoting which of said plurality of images is to be used to form a display image in the case where a 3-D image is displayed as a 2-D image.

27. A 3-D image display unit for displaying a 3-D image configured by a plurality of images, including:
an input part for inputting control information required to display said 3-D image;
wherein said control information includes display information that can take at least two values; and
wherein said display information denotes that a 3-D image is displayed as a 2-D image in the case where said information takes a first value and a 3-D image is displayed as a 2-D image or 3-D image in the case where said information takes a second value,
wherein said first value indicates that one of a 3-D image display time or an accumulative intensity value of a 3-D effect intensity of the 3-D image is greater than or equal to a predetermined threshold value.

28. The 3-D image display unit according to claim 27;
wherein said control information includes information for denoting which of said plurality of images is to be used to form a display image in the case where said 3-D image is displayed as a 2-D image.

29. A 3-D image transmitting method for transmitting a 3-D image configured by a plurality of images, including:
a recording step of recording control information required to control display of said 3-D image;
wherein said control information includes a threshold value related to an accumulative value that increases together with a 3-D display time;
wherein said threshold value, when it is a predetermined value, denotes that a 3-D image is displayed as a 2-D image; and
wherein said threshold value, when it is not said predetermined value, denotes that a 3-D image is displayed as either a 2-D image or 3-D image.

30. The 3-D image transmitting method according to claim 29;
wherein said predetermined value is 0.

31. A 3-D image transmitting method for transmitting a 3-D image configured by a plurality of images, including:
a recording step of recording control information required to control display of said 3-D image;
wherein said control information includes a threshold value required to control display of said 3-D image;
wherein said threshold value, when it is a predetermined value, denotes that a 3-D image is displayed as a 2-D image; and
wherein said threshold value, when it is not said predetermined value, denotes that a 3-D image is displayed as either a 2-D image or 3-D image.

32. A 3-D image display unit for displaying a 3-D image configured by a plurality of images, including:
an input part for inputting control information required to display said 3-D image;
wherein said control information includes a threshold value related to an accumulative value that increases together with a 3-D display time;
wherein said threshold value, when it is a predetermined value, denotes that a 3-D image is displayed as a 2-D image; and
wherein said threshold value, when it is not said predetermined value, denotes that a 3-D image is displayed as either a 2-D image or 3-D image.

33. The 3-D image display unit according to claim 32;
wherein said predetermined value is 0.

34. A 3-D image display unit for displaying a 3-D image configured by a plurality of images, including:
an input part for inputting control information required to display said 3-D image;
wherein said control information includes a threshold value required to control 3-D image display;
wherein said threshold value, when it is a predetermined value, denotes that a 3-D image is displayed as a 2-D image; and
wherein said threshold value, when it is not said predetermined value, denotes that a 3-D image is displayed as either a 2-D image or 3-D image.

* * * * *